(12) United States Patent
Ying et al.

(10) Patent No.: US 10,924,030 B2
(45) Date of Patent: Feb. 16, 2021

(54) MODULAR POWER SUPPLY SYSTEM

(71) Applicant: Delta Electronics (Shanghai) CO., LTD, Shanghai (CN)

(72) Inventors: Jianping Ying, Shanghai (CN); Ming Wang, Shanghai (CN); Xiaobo Huang, Shanghai (CN); Jun Liu, Shanghai (CN); Zhiming Hu, Shanghai (CN)

(73) Assignee: Delta Electronics (Shanghai) CO., LTD, Shanghai (CN)

( * ) Notice: Subject to any disclaimer, the term of this patent is extended or adjusted under 35 U.S.C. 154(b) by 0 days.

(21) Appl. No.: 16/464,882

(22) PCT Filed: Dec. 15, 2017

(86) PCT No.: PCT/CN2017/116351
§ 371 (c)(1),
(2) Date: May 29, 2019

(87) PCT Pub. No.: WO2018/108140
PCT Pub. Date: Jun. 21, 2018

(65) Prior Publication Data
US 2019/0326831 A1    Oct. 24, 2019

(30) Foreign Application Priority Data

Dec. 16, 2016   (CN) .......................... 2016 1 1170857
Dec. 21, 2016   (CN) .......................... 2016 1 1191912
(Continued)

(51) Int. Cl.
*H02M 7/483*   (2007.01)
*H02M 7/49*    (2007.01)

(52) U.S. Cl.
CPC ............ *H02M 7/483* (2013.01); *H02M 7/49* (2013.01); *H02M 2007/4835* (2013.01)

(58) Field of Classification Search
CPC ........ H02M 7/483; H02M 7/49; H02M 7/521; H02M 7/53871; H02M 2007/4835
See application file for complete search history.

(56) References Cited

U.S. PATENT DOCUMENTS

| 7,705,705 B2 | 4/2010 | Zeng et al. |
| 8,686,746 B2 | 4/2014 | Zhou et al. |

(Continued)

FOREIGN PATENT DOCUMENTS

| CN | 101158701 B | 6/2010 |
| CN | 101719727 A | 6/2010 |

(Continued)

OTHER PUBLICATIONS

The Non-final OA dated Mar. 9, 2018 by the USPTO.
(Continued)

*Primary Examiner* — Jue Zhang
(74) *Attorney, Agent, or Firm* — Yunling Ren

(57) ABSTRACT

A modular power supply system, includes: a main controller, configured to output a main control signal; N local controllers, wherein each of the local controllers is configured to receive the main control signal to output at least one local control signal; and N power units, in one-to-one correspondence with the N local controllers, wherein each of the power units includes a first end and a second end, the second end of each of the power units is connected to the first end of an adjacent one of the power units, each of the power units includes M power converters, and each of the power converters is configured to operate according to the local control signal output by a corresponding local controller, wherein each of the power units further includes: M sampling circuits, configured to sample positive DC bus voltages and negative DC bus voltages of the M power converters respectively.

19 Claims, 40 Drawing Sheets

(30) Foreign Application Priority Data

Feb. 27, 2017 (CN) .......................... 2017 1 0106946
Dec. 12, 2017 (CN) .......................... 2017 1 1319865

(56) References Cited

U.S. PATENT DOCUMENTS

| | | |
|---|---|---|
| 2005/0237010 A1 | 10/2005 | Ying et al. |
| 2009/0268496 A1 | 10/2009 | Tan et al. |
| 2012/0032512 A1 | 2/2012 | Aiello |
| 2013/0148390 A1 | 6/2013 | Na |
| 2013/0229838 A1 | 9/2013 | Wang |
| 2014/0015322 A1 | 1/2014 | Milavec |
| 2015/0340890 A1 | 11/2015 | Yao et al. |
| 2016/0072395 A1 | 3/2016 | Deboy et al. |
| 2016/0190846 A1* | 6/2016 | Eckel .................. H02M 7/483 |
| | | 320/118 |
| 2016/0277071 A1 | 9/2016 | Dzung et al. |
| 2017/0029242 A1 | 2/2017 | Agirman et al. |
| 2017/0033703 A1 | 2/2017 | Kikuchi et al. |
| 2017/0187234 A1 | 6/2017 | Harada et al. |

FOREIGN PATENT DOCUMENTS

| | | |
|---|---|---|
| CN | 101795072 A | 8/2010 |
| CN | 101917126 A | 12/2010 |
| CN | 201864877 U | 6/2011 |
| CN | 102148579 A | 8/2011 |
| CN | 101262178 B | 5/2012 |
| CN | 102545675 A | 7/2012 |
| CN | 102593859 A | 7/2012 |
| CN | 102611345 A | 7/2012 |
| CN | 102684543 A | 9/2012 |
| CN | 202616988 U | 12/2012 |
| CN | 102967748 A | 3/2013 |
| CN | 103280952 A | 9/2013 |
| CN | 103314517 A | 9/2013 |
| CN | 103546024 A * | 1/2014 |
| CN | 103546024 A | 1/2014 |
| CN | 203522498 U | 4/2014 |
| CN | 203562783 U | 4/2014 |
| CN | 103856091 A | 6/2014 |
| CN | 203775065 U | 8/2014 |
| CN | 104272589 A | 1/2015 |
| CN | 104410101 A | 3/2015 |
| CN | 103311932 B | 5/2015 |
| CN | 105071403 A | 11/2015 |
| CN | 204858577 U | 12/2015 |
| CN | 103580050 B | 1/2016 |
| CN | 204967648 U | 1/2016 |
| CN | 105356770 A | 2/2016 |
| CN | 103762596 B | 3/2016 |
| CN | 105391313 A | 3/2016 |
| CN | 105406705 A | 3/2016 |
| CN | 105429476 A | 3/2016 |
| CN | 105453405 A | 3/2016 |
| CN | 105490285 A | 4/2016 |
| CN | 106160463 A | 11/2016 |
| CN | 106505896 A | 3/2017 |
| CN | 206332626 U | 7/2017 |
| DE | 102012213055 A1 | 1/2014 |
| EP | 2595302 A1 | 5/2013 |
| EP | 2905889 A1 | 8/2015 |
| EP | 2945273 A1 | 11/2015 |
| FR | 3015146 A1 | 6/2015 |
| TW | 265484 B | 12/1995 |
| TW | 201218604 A | 5/2012 |
| TW | 201306470 A | 2/2013 |
| TW | 201528666 A | 7/2015 |
| TW | 201633691 A | 9/2016 |
| WO | 2009027520 A2 | 3/2009 |
| WO | 2012028640 A2 | 3/2012 |
| WO | 2014037406 A1 | 3/2014 |
| WO | 2018050256 A1 | 3/2018 |

OTHER PUBLICATIONS

The CN1OA dated Aug. 27, 2019 by the CNIPA.
The IN1OA dated Oct. 29, 2019 by the IN Office.
The First Office Action for CN application No. 201711322795.8 dated Mar. 29, 2019.
The First Office Action for CN application No. 201711322794.3 dated Mar. 29, 2019.
The First Office Action for TW application No. 106144104 dated Aug. 3, 2018.
The First Office Action for TW application No. 106144105 dated Aug. 3, 2018.
The First Office Action for TW application No. 106144106 dated Aug. 6, 2018.
The Second Office Action for TW application No. 10721146190 dated Dec. 5, 2018.
International Search Report for PCT application No. PCT/CN2017/116354 dated Mar. 16, 2018.
International Search Report for PCT application No. PCT/CN2017/116353 dated Mar. 21, 2018.
The IN1OA dated Mar. 18, 2020 by the IN Office.
The EESR dated Aug. 7, 2020 by the EPO.
Yuebin Zhou et al: "A control system for large-scale modular multilevel converters", Nov. 10, 2013 (Nov. 10, 2013), pp. 163-168, XP032539357,[retrieved on Dec. 30, 2013].
Xiaotian Zhang et al: "Study of Multisampled Multilevel Inverters to Improve Control Performance", Nov. 1, 2012 (Nov. 1, 2012), pp. 4409-4416, XP011448271 .
Wu Haibo et al: "Research on energy feedback topologies using in CBB multilevel converter for PMSM drives", Dec. 11, 2013 (Dec. 11, 2013), pp. 1-6,XP032605658.
The EESR dated Aug. 13, 2020 by the EPO.
The Non-Final OA dated Oct. 2, 2020 by the USPTO from U.S. Appl. No. 16/465,741.
The CN4OA dated Dec. 14, 2020 by the CNIPA.
The IN1OA dated Dec. 25, 2020 by the IN Office.

* cited by examiner

MODULAR POWER SUPPLY SYSTEM

CROSS-REFERENCE TO RELATED APPLICATIONS

This application is a continuation application of Intentional Application No. PCT/CN2017/116351, filed on Dec. 15, 2017, which is based upon and claims priority to Chinese Patent Application No. 201611170857.3, filed on Dec. 16, 2016. Chinese Patent Application No. 201611191912.7, filed on Dec. 21, 2016, Chinese Patent Application No. 201710106946.X, filed on Feb. 27, 2017, and Chinese Patent Application No. 201711319865.4, filed on Dec. 12, 2017, the entire content of all of which is incorporated herein by reference.

TECHNICAL FIELD

The present disclosure relates to the field of power electronics, and particularly to a modular power supply system.

BACKGROUND

Currently, in some applications of high voltage level (such as above 10 kV), such as Static Var Generator (SVG), Medium Variable-frequency Drive (MVD), and High Voltage Direct Current Transmission Light (HVDC-Light), etc., the systems are of high voltage level, and limited by the withstanding voltage level and cost of semiconductor devices, so the systems often adopt a circuit topology of cascaded power units.

The traditional topology of cascaded power units needs to equip a set of optical fiber, auxiliary power supply and local controller for each power unit, i.e., power converter. In such topology of cascaded power units, the number of power units that need to be cascaded increases with the increase of the voltage level, resulting in an increase in the number of optical fibers, auxiliary power supplies and local controllers. Therefore, the design of such a topology is complex, the cost is expensive, and its reliability is low.

FIG. 1 is a schematic structural view of a three-phase SVG system in the prior art. FIG. 2 is a schematic diagram of a more specific three-phase SVG system in the prior art. Each of the SVG systems in FIGS. 1 and 2 includes a three-phase circuit, and power units in each phase of circuit are connected in cascade.

As shown in FIG. 1, each phase of circuit of the SVG system is formed by cascading a plurality of power units 1. The term "cascade" as used herein is well-known in the art. That is, each power unit includes a first end $T_1$ and a second end $T_2$. A second end $T_2$ of one of adjacent two power units is connected to a first end $T_1$ of the other one of the adjacent two power units. The first end $T_1$ of the first power unit of each phase of circuit is connected to a corresponding phase of three-phase lines $U_A$, $U_B$ and $U_C$ of the three-phase power grid via a filter inductor L, and the second ends of the last power units of the three phase of circuit are mutually connected.

As shown in FIG. 2, each phase of circuit of the SVG system is formed by cascading eight power units $P_1$ to $P_8$. Each power unit includes a first end and a second end as shown in FIG. 1, wherein a second end of one of adjacent two power units is connected to the first end of the other one of adjacent two power units. For example, the second end of the power unit $P_1$ is connected to the first end of the power unit $P_2$, the second end of the power unit $P_2$ is connected to the first end of the power unit $P_3$, and so on, and the second end of the power unit $P_7$ is connected to the first end of the power unit $P_8$. Each of the first ends of the three power units $P_1$ in the three-phase circuit is connected to a corresponding phase of phases $U_A$, $U_B$ and $U_C$ of the three-phase grid G by a filter circuit (composed of an inductor L, a resistor R and a capacitor C), wherein the phases $U_A$, $U_B$ and $U_C$ of the three-phase power grid G are connected to a load $R_{load}$. The second ends of the three power units $P_8$ in the three-phase circuit are connected to each other. Each power unit includes four power switch devices 2. Each power switch device 2 consists of a power semiconductor switch S and an anti-parallel body diode D or external diode D. A collector of the power semiconductor switch S is connected to a cathode of the diode D, and an emitter of the power semiconductor switch S is connected to an anode of the diode D. Since the power semiconductor switch S and the anti-parallel body diode D or external diode D are generally used as a whole, for the sake of brevity, the anti-parallel body diode or external diode D will not be separately mentioned in the following description.

The power unit 1 shown in FIG. 1 may be a full-bridge (H-bridge) circuit, or may be other circuit topology structures, such as a half-bridge circuit, a rectifier-inverter circuit, and the like. FIG. 3 is a schematic diagram of an H-bridge circuit (topology) in the prior art. For example, taking the power unit being an H-bridge circuit as an example, the H-bridge circuit, as shown in FIG. 3, includes power semiconductor switches $S_1$ to $S_4$ and a DC bus capacitor $C_B$. A first end of the power semiconductor switch $S_1$ is connected to a positive end of the DC bus capacitor $C_B$ and a first end of the power semiconductor switch $S_3$. A second end of the power semiconductor switch $S_1$ is connected to a first end of the power semiconductor switch $S_2$. A second end of the power semiconductor switch $S_2$ is connected to a negative end of the DC bus capacitor $C_B$ and a second end of the power semiconductor switch $S_4$. A second end of the power semiconductor switch $S_3$ is connected to a first end of the power semiconductor switch $S_4$. The second end of the power semiconductor switch $S_1$ serves as a first output end of the H-bridge circuit, that is, a first end $T_1$ of the power unit 1. A second end of the power semiconductor switch $S_3$ serves as a second output end of the H-bridge circuit, that is, a second end $T_2$ of the power unit 1.

FIG. 4 is a schematic diagram of a single phase SVG in the prior art. As shown in FIG. 4, the single phase SVG includes a charging portion 3, a power portion 4 and a control portion 5. The single phase SVG includes a plurality of power units 40. Each of the power units 40 includes a first end and a second end as shown in FIG. 1. A first end of one of adjacent two power units 40 is connected to a second end of the other one of the adjacent two power units 40. FIG. 4 is a conventional cascaded solution applied to a 25 kV single phase SVG. Each phase of the SVG is formed by cascading a plurality of power units and then connected to the grid via filters and contactors, respectively. Each power unit 40 of the SVG typically employs one H-bridge circuit. The topology of the H-bridge circuit is shown in FIG. 3 and will not be repeatedly described here. Each power unit 40 of the SVG system further includes a DC bus capacitor $C_B$, and the connection relationship thereof is as shown in FIG. 4, wherein the charging portion 3 is used to precharge the DC bus capacitor $C_B$, and the control portion 5 is used to control the operation of the power portion 4.

As that can be seen from FIG. 4, in the conventional cascaded topology, in addition to including a main controller 50, each power unit 40, as a power converter, such as an H-bridge circuit, needs to be separately provided with a set of local controller 51, drive circuit 52, auxiliary power supply 53 and optical fiber 54, and the connection relationship thereof is as shown in FIG. 4. The main controller 50 outputs a main control signal to the local controller 51, and the local nm m-controller 51 generates a local control signal of the corresponding power unit according to the main control signal and output it to the drive circuit 52. The drive circuit 52 outputs a driving signal according to the local control signal to control the corresponding power unit to operate. For example, a 25 kV single phase SVG may often be implemented by the following two schemes. The first scheme: all power switch devices in the H-bridge circuit use common 1700V Insulated Gate Bipolar Transistors (IGBT), then a DC bus voltage of the single power unit 40 is 1000V. In consideration of redundancy, a total of 55 stages of power units are needed to be cascaded, so a total of 55 sets of local control controllers 51, 55 sets of optical fibers 54 and 55 sets of auxiliary power supplies 53 are required. Such a large number of local controllers 51, optical fibers 54 and auxiliary power supplies 53 will result in extremely complicated structural design of the SVG, and the cost is extremely high, and its reliability is low.

The second scheme: the power switch devices in the H-bridge circuit use high voltage IGBTs, such as 3300V IGBTs or even 6500V IGBTs, to increase the voltage level of the single power unit 40. In order to reduce the number of cascaded power units 40, local controllers 51, optical fibers 54 and auxiliary power supplies 53, the second scheme may often be employed. In the second scheme, if the 3300V IGBT is adopted, the voltage level of each power unit 40 is doubled of the 1700V IGBT scheme, and the number of cascaded power units 40 may be reduced from 55 to 28, and the number of local controllers 51, optical fibers 54 and auxiliary power supplies 53 and the cost may be reduced by half as well. However, limited to the current level of semiconductor technology development, the cost of 3300V IGBT is still high. Under the same current level, the cost of 3300V IGBT is far expensive than twice the cost of 1700V IGBT. Therefore, the cost of the second scheme will far exceed the cost of the first scheme. If a 6500V IGBT is adopted, the cost pressure will be even high.

Therefore, either a power unit cascading scheme using a low voltage IGBT or a power unit cascading scheme using a high voltage IGBT has significant disadvantages.

FIG. 5 is a schematic diagram of an HVDC-Light system in the prior art. As shown in FIG. 5, the HVDC-Light includes a three-phase circuit, and each phase of circuit includes an upper half-bridge arm and a lower half-bridge arm. Each of the upper half-bridge arm and the lower half-bridge arm of each phase of circuit includes a plurality of cascaded power units 40 and an inductor L. Each power unit 40 includes a first end and a second end as shown in FIG. 1 as well. A first end of one of the adjacent two power units 40 is connected to a second end of the other one of the adjacent two power units 40. The inductor L of each upper half-bridge arm is connected to the inductor L of the corresponding lower half-bridge arm, and connection points between the two inductors L are respectively connected to the grid. The connection relationship is as shown in FIG. 5. Each power unit 40 of the HVDC-Light employs a half-bridge converter. Each power unit 40 of the HVDC-Light further includes a DC bus capacitor. Each power unit 40 of the HVDC-Light further needs to be connected to a drive circuit 52. The power unit 40 operates according to a driving signal output by the drive circuit 52. In addition to the main controller 50, each power unit 40 further needs to be provided with a set of local controller 51, optical fiber 54 and auxiliary power supply 53 as well, the connection relationship of which is shown in FIG. 5.

The DC voltage of HVDC-Light is as high as hundreds of kilovolts, and the number of power units 40 that needs to be cascaded is extremely large, so the above-mentioned problems are more serious. That is, the overall structure of HVDC-Light in the prior art is complicated, the cost is expensive, and the reliability is low.

At the same time, the sampling circuit for the DC bus voltage needs to be further considered and improved.

In addition, the power supplying manners of the local controller and auxiliary power supply need to be further considered and improved as well.

SUMMARY

It is an object of the present disclosure to provide a modular power supply system, to simplify the structure of a power electronic system, reduce cost, and improve reliability.

According to a first aspect of the disclosure, a modular power supply system is provided and configured to include: a main controller, configured to output a main control signal; N local controllers, wherein each of the local controllers is configured to receive the main control signal to output at least one local control signal: and N power units, in one-to-one correspondence with the N local controllers, wherein each of the power units includes a first end and a second end, the second end of each of the power units is connected to the first end of an adjacent one of the power units, and each of the power units is configured to include M power converters, wherein each of the power converters includes a third end and a fourth end, the fourth end of each of the power converters is connected to the third end of an adjacent one of the power converters, the third end of the first one of the power converters is connected to the first end of the power unit, the fourth end of the M-th one of the power converters is connected to the second end of the power unit, and each of the power converters is configured to operate according to the local control signal output by a corresponding local controller, wherein both N and M are natural numbers greater than one, wherein each of the power units further includes: M sampling circuits, configured to sample positive DC bus voltages and negative DC bus voltages of the M power converters respectively, and the local controller corresponding to the power unit is configured to include: M sampling conditioning circuits, configured to convert the sampled positive DC bus voltages and negative DC bus voltages of the M power converters to digital signals.

According to a second aspect of the disclosure, a modular power supply system is provided and configured to include: a main controller, configured to output a main control signal: N local controllers, wherein each of the local controllers is configured to receive the main control signal to output at least one local control signal; and N power units, in one-to-one correspondence with the N local controllers, wherein each of the power units includes a first end and a second end, the second end of each of the power units is connected to the first end of an adjacent one of the power units, and each of the power units is configured to include M power converters, wherein each of the power converters includes a third end and a fourth end, the fourth end of each of the power converters is connected to the third end of an adjacent one of the power converters, and the third end of the first one of the power converters is connected to the first end of the power unit, the fourth end of the M-th one of the power converters is connected to the second end of the power unit, and each of the power converters is configured to operate according to the local control signal output by a corresponding local controller, wherein both N and M are natural numbers greater than one, wherein at least one of the M power converters is a master power converter, at least one of the M power converters is a slave power converter, and the local control signals for controlling power semiconductor switches at the same position of the slave power converters to be turned on and off are the same, each of the power units further includes: a master sampling circuit, configured to sample a positive DC bus voltage and a negative DC bus voltage of the master power converter respectively, or a sum of positive DC bus voltages and a sum of negative bus voltages of the master power converters; and a slave sampling circuit, configured to sample a sum of positive DC bus voltages and a sum of negative bus voltages of the slave power converters respectively, and the local controller corresponding to the power unit is configured to include: a sampling conditioning circuit, configured to convert the sampled positive DC bus voltage and negative DC bus voltage of the master power converter, or the sum of positive DC bus voltages and the sum of negative bus voltages of the master power converters, and the sum of positive DC bus voltages and the sum of negative bus voltages of the slave power converters into digital signals.

According to a third aspect of the disclosure, a modular power supply system is provided and configured to include: a main controller, configured to output a main control signal; N local controllers, wherein each of the local controllers is configured to receive the main control signal to output at least one local control signal; and N power units, in one-to-one correspondence with the N local controllers, wherein each of the power units includes a first end and a second end, the second end of each of the power units is connected to the first end of an adjacent one of the power units, and each of the power units is configured to include M power converters, wherein each of the power converters includes a third end and a fourth end, the fourth end of each of the power converters is connected to the third end of an adjacent one of the power converters, and the third end of the first one of the power converters is connected to the first end of the power unit, the fourth end of the M-th one of the power converters is connected to the second end of the power unit, and each of the power converters is configured to operate according to the local control signal output by a corresponding local controller, wherein both N and M are natural numbers greater than one, wherein the local control signals for controlling power semiconductor switches at the same position of the M power converters to be turned on and off are the same, each of the power units further includes: M sampling circuits, configured to sample a sum of positive DC bus voltages and a sum of negative DC bus voltages of the power converter respectively, and the local controller corresponding to the power unit is configured to includes: a sampling conditioning circuit, configured to convert the sampled sum of positive DC bus voltages and sum of negative DC bus voltages of the power converter into digital signals.

In the present disclosure, by constituting a plurality of power converters as one power unit and adopting a set of local controller, optical fiber and auxiliary power supply to control the plurality of power converters, the number of local controllers, optical fibers and auxiliary power supplies may be greatly reduced, the structural design may be simplified, the cost may be reduced, and the reliability may be improved.

In the present disclosure, power semiconductor switches at the same position of the respective cascaded power converters in the power unit share one local control signal, which may simplify the control circuit.

The present disclosure may improve the sampling accuracy of the DC bus voltage as well.

The present disclosure is applicable to all topology structures connected by AC/DC, DC/AC, DC/DC power converters, and may be widely used.

BRIEF DESCRIPTION OF THE DRAWINGS

The above and other objects, features and advantages of the present disclosure will become more distinct from exemplary embodiments described in detail with reference to accompanying drawings.

DETAILED DESCRIPTION

Figure 1:
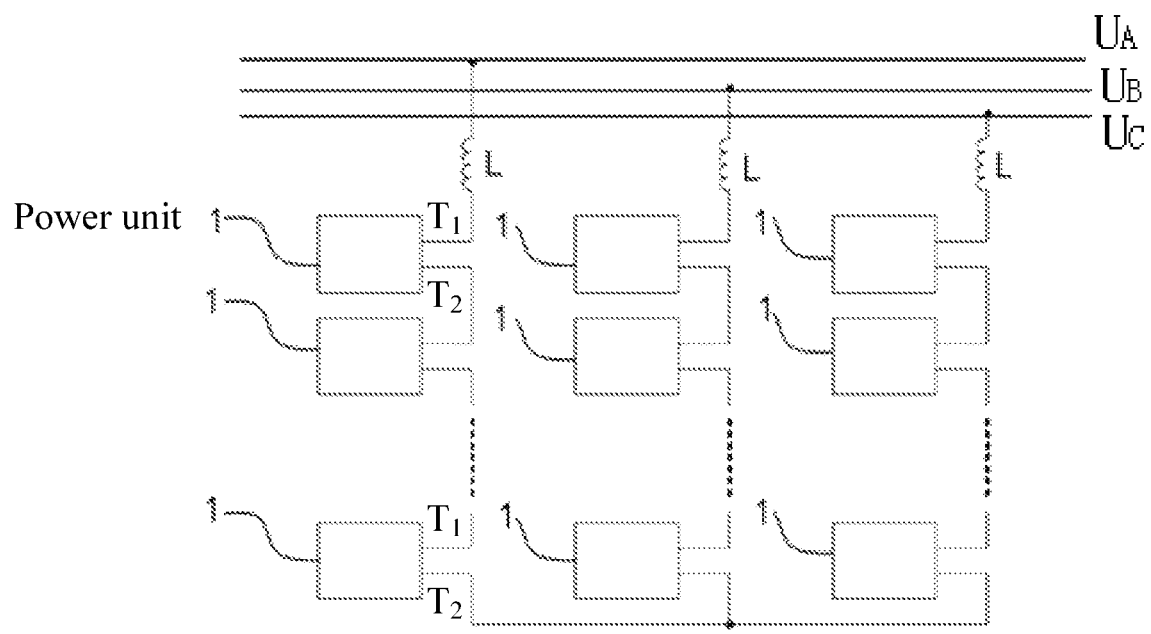
FIG. 1 is a schematic structural view of a three-phase SVG system in the prior art.
Figure 2:
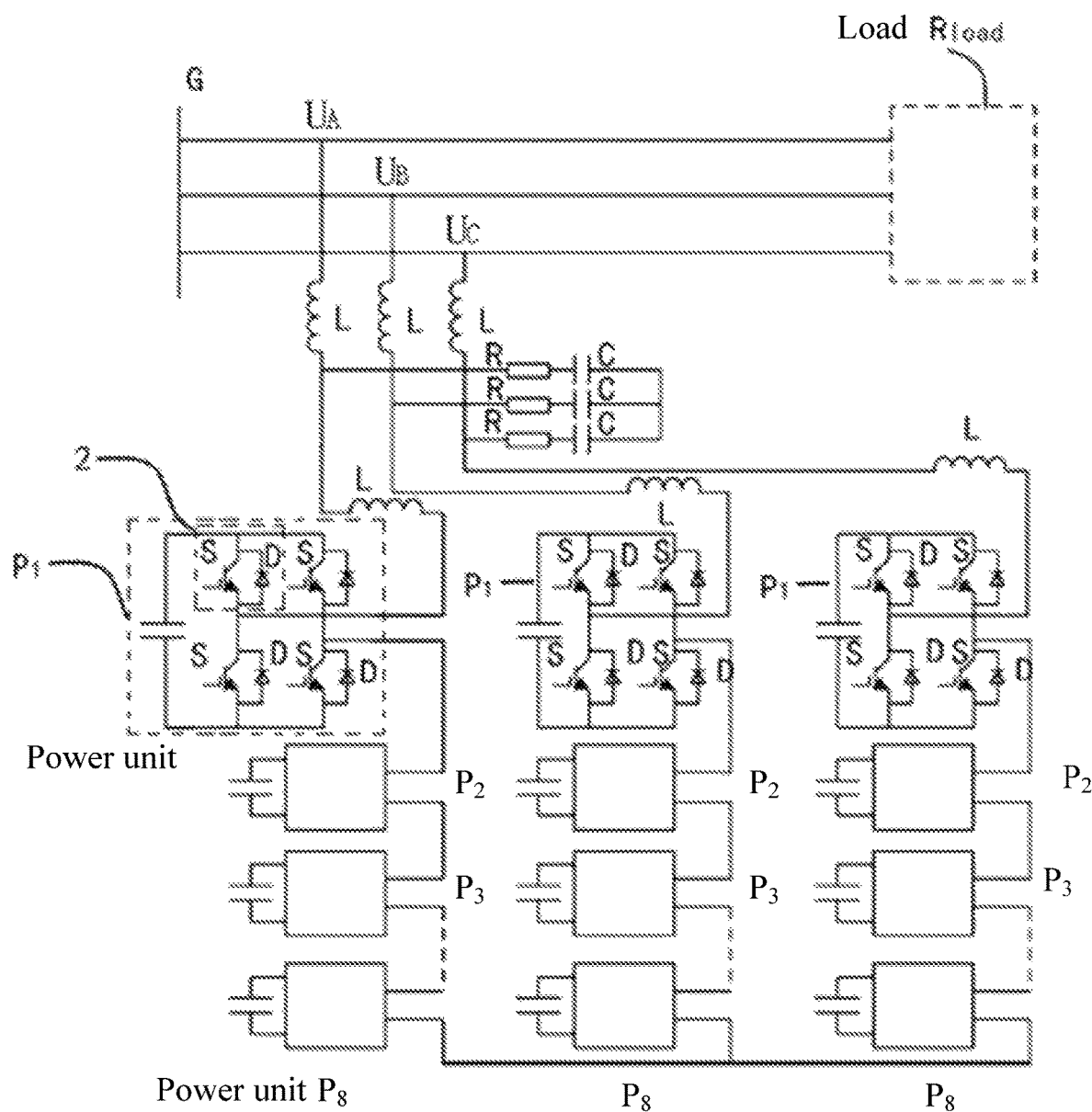
FIG. 2 is a schematic diagram of a more specific three-phase SVG system in the prior art.
Figure 3:
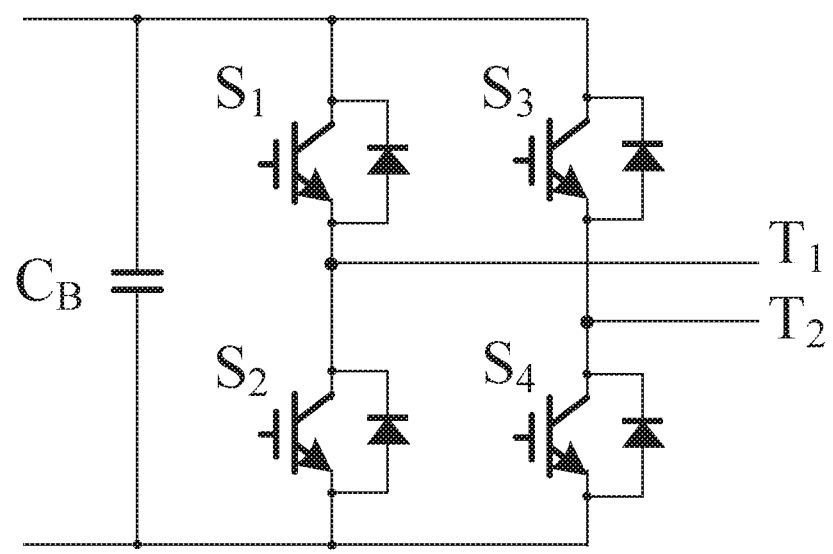
FIG. 3 is a schematic diagram of an H-bridge circuit (topology) in the prior art.
Figure 4:
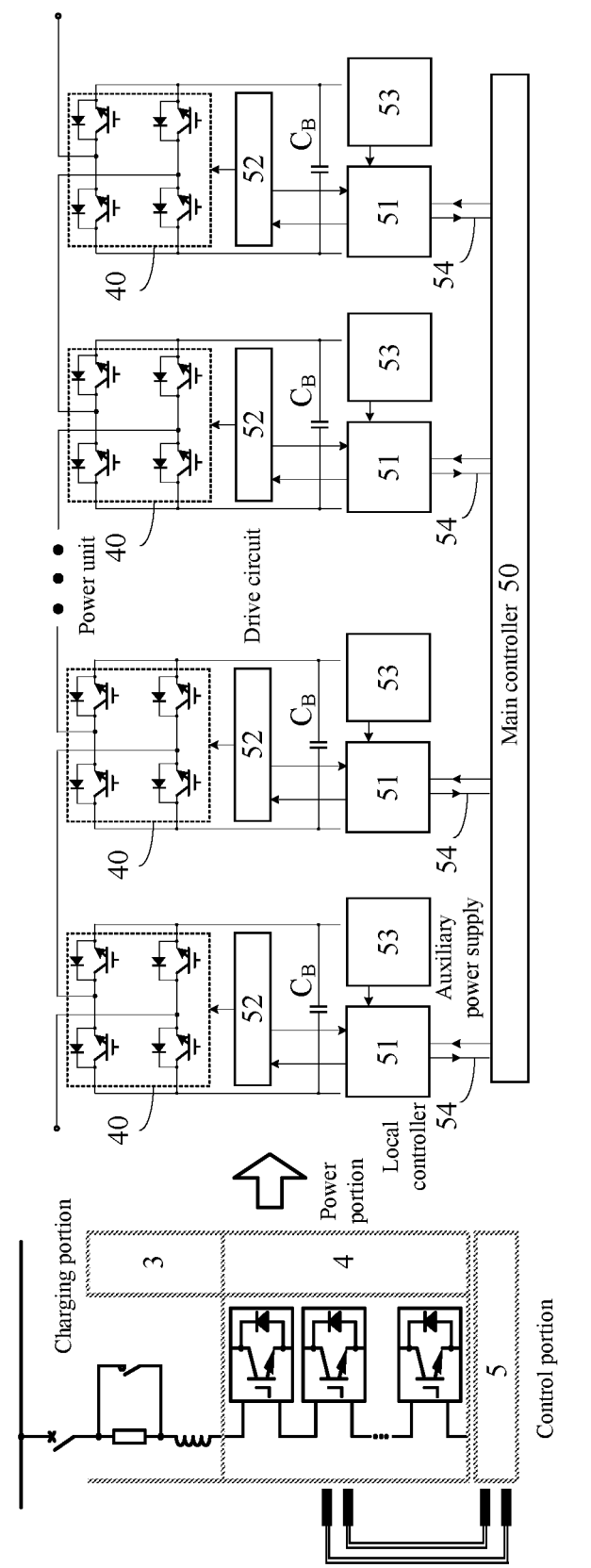
FIG. 4 is a schematic diagram of a single phase SVG in the prior art.
Figure 5:
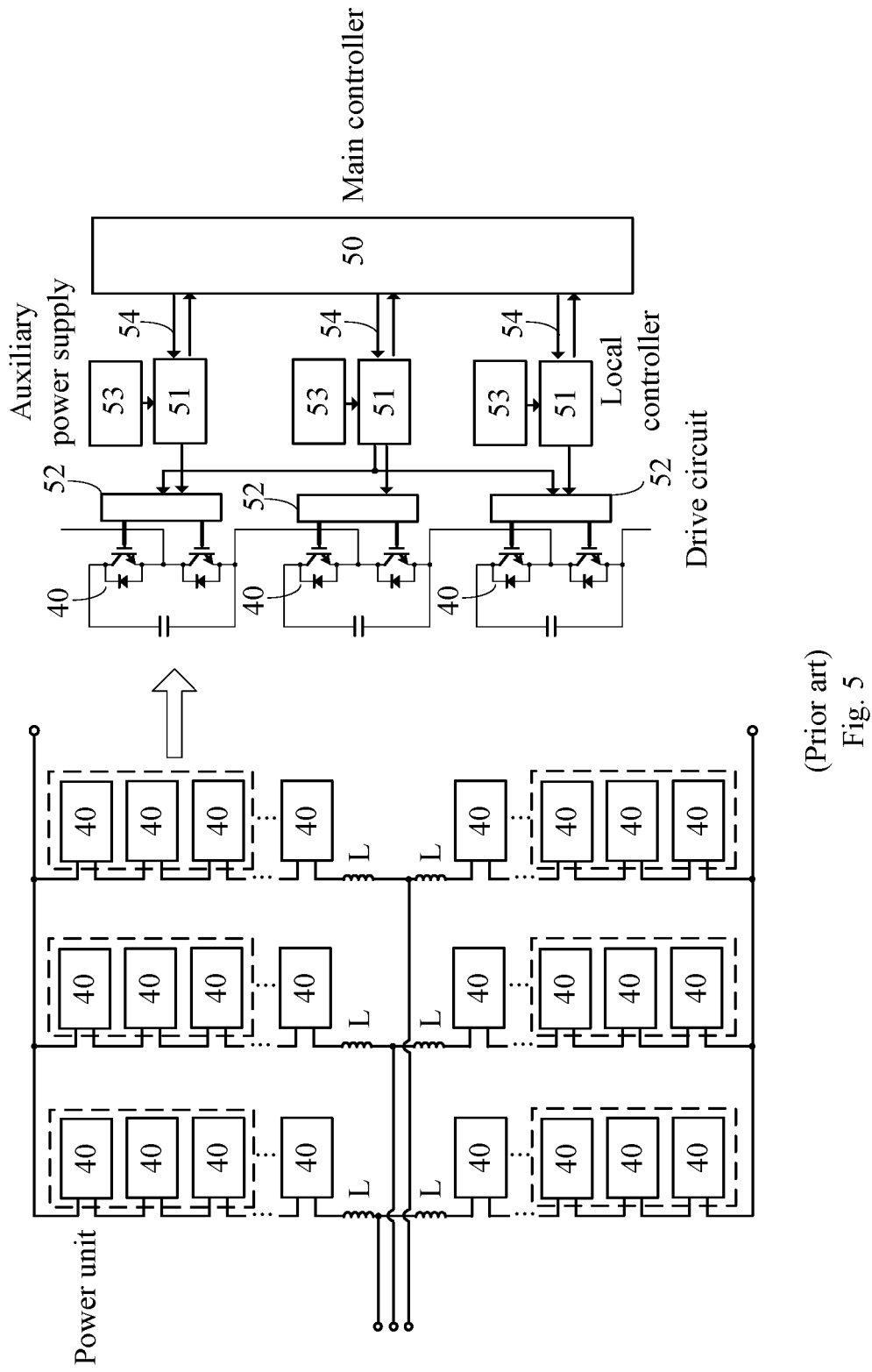
FIG. 5 is a schematic diagram of an HVDC-Light system in the prior art.

Example embodiments will now be described more fully with reference to the accompanying drawings. However, the example embodiments may be embodied in a variety of forms and should not be construed as being limited to the examples set forth herein; rather, these embodiments are provided to make the present disclosure more comprehensive and complete, and fully convey the concept of the example embodiments to those skilled in the art. The drawings are only schematic representations of the disclosure and are not necessarily drawn to scale. The same reference numerals in the drawings denote the same or similar parts, and the repeated description thereof will be omitted.

Furthermore, the described features, structures, or characteristics may be combined in any suitable manner in one or more embodiments. In the following description, numerous specific details are provided to give full understanding of embodiments of the present disclosure. However, one skilled in the art will appreciate that the technical solution of the present disclosure may be practiced, and one or more of the specific details may be omitted, or other methods, components, devices, steps, and the like may be employed. In other instances, well-known structures, methods, devices, implementations, or operations are not shown or described in detail to avoid obscuring aspects of the present disclosure.

Figure 6:
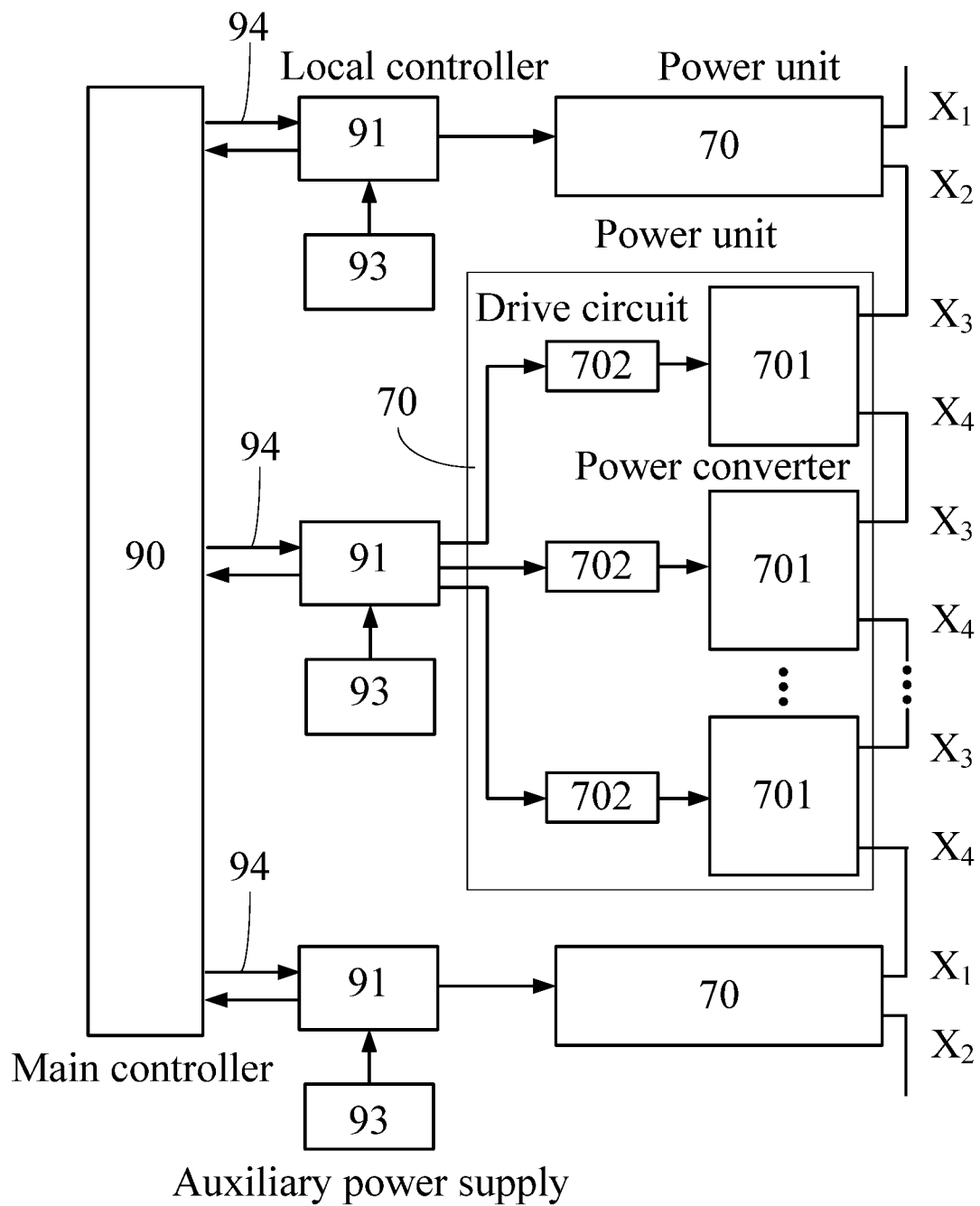
FIG. 6 is a block diagram of a modular power supply system in accordance with one embodiment of the present disclosure.

FIG. 6 is a block diagram of a modular power supply system in accordance with one embodiment of the present disclosure. As shown in FIG. 6, a power electronic converter of the present disclosure is configured to include: a main controller 90, N local controllers 91, N auxiliary power supplies 93 and N power units 70, wherein N is a natural number greater than one.

The main controller 90 is configured to output a main control signal. The main control signal is, for example, one or more parameters set to control the overall operational state of the modular power supply system.

Each local controller 91 is configured to receive the aforementioned main control signal to output at least one local control signal. The local control signal is, for example, one or more parameters set to control the overall operational state of the corresponding power unit 70, or the local control signal is used to control the operational state of a portion of the power converters in the corresponding power unit 70.

N auxiliary power supplies 93 are in one-to-one correspondence with N local controllers 91. Each auxiliary power supply 93 is configured to provide power supply for a corresponding local controller 91.

The N power units 70 are in one-to-one correspondence with the N local controllers 91. Each power unit 70 includes a first end $X_1$ and a second end $X_2$. The second end $X_2$ of each power unit 70 is connected to the first end $X_1$ of an adjacent power unit 70. That is, the second end $X_2$ of one of the adjacent two power units 70 is connected to the first end $X_1$ of the other one of the adjacent two power units 70.

Each power unit 70 is configured to include M power converters 701, wherein each power converter 701 includes a third end $X_3$ and a fourth end $X_4$. The fourth end $X_4$ of each power converter is connected to the third end $X_3$ of an adjacent power converter 701. That is, the fourth end $X_4$ of one of the adjacent two power converters 701 is connected to the third end $X_3$ of the other one of the adjacent two power converters 701. M is a natural number greater than one. Thus, the third end $X_3$ of the first power converter 701 is connected to the first end $X_1$ of the power unit 70, and the fourth end $X_4$ of the M-th power converter 701 is connected to the second end $X_1$ of the power unit 70. Each power converter 701 is configured to operate in accordance with a local control signal output by a corresponding local controller 91.

As an embodiment of the present disclosure, the aforementioned main control signal may be transmitted between the main controller 90 and each of the local controllers 91 via an optical isolation device, such as an optical fiber 94. In other embodiments, the main controller 90 and each local controller 91 may be connected by a magnetic isolation device, such as an isolation transformer. The connection manner between the main controller 90 and each local controller 91 is not limited to the above connection manner.

The power electronic device of the present disclosure may be applied to fields such as SVG, MVD, HVDC-Light, and wind power generation systems.

As shown in FIG. 6, the present disclosure proposes to combine M power converters 701 into one power unit 70. One power unit 70 is provided with a set of local controller 91, optical fiber 94 and auxiliary power supply 93. That is, only one set of local controller 91, optical fiber 94 and auxiliary power supply 93 controls the M power converters 701. However, in the conventional solution, each power unit 40, that is, each power converter, needs to be configured with a set of local controller 51, optical fiber 54 and auxiliary power supply 53. Compared with the conventional solution, the number of local controllers 91, optical fibers 94 and auxiliary power supplies 93 required for the modular power supply system proposed by the present disclosure will be reduced to 1/M of the conventional solution. The present disclosure greatly simplifies the structural design of the modular power supply system, the cost is significantly reduced, and the reliability is greatly improved as well.

Figure 7:
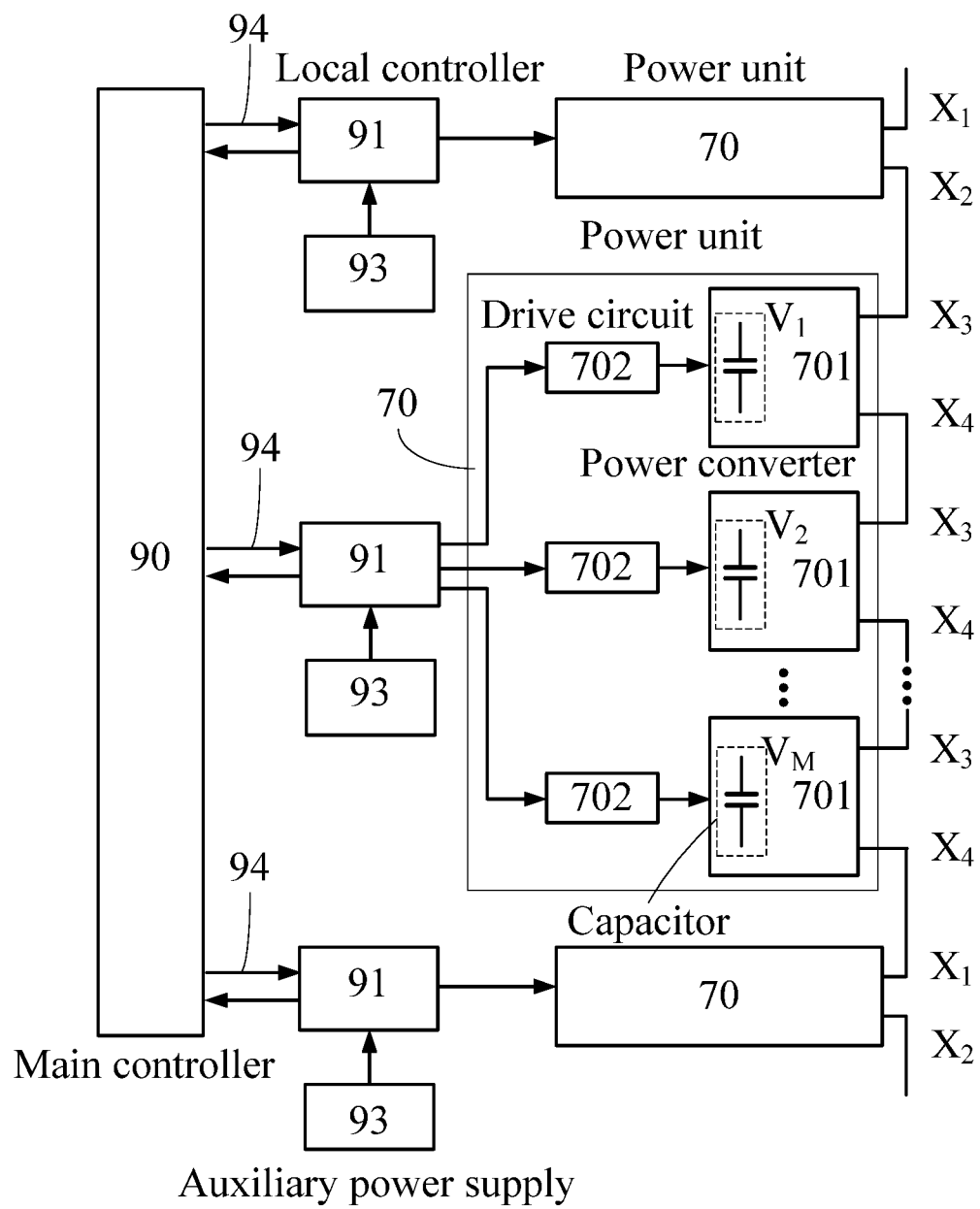
FIG. 7 is a block diagram of a modular power supply system in accordance with another embodiment of the present disclosure.

The present disclosure does not limit the DC bus voltage of each power converter 701. The DC bus voltages of the M power converters 701 in the modular power supply system of the present disclosure may be all identical, partially identical, or all different from each other. Based on FIG. 6, FIG. 7 is a block diagram of a modular power supply system in accordance with another embodiment of the present disclosure. As shown in FIG. 7, the DC bus voltages of the M power converters 701 in the power unit 70 may be $V_1$, $V_2$, . . . , and $V_M$, respectively, where $V_1$, $V_2$, . . . and $V_M$ may be all the same, i.e., $V_1=V_2=\ldots=V_M$, or may be partially the same $V_1=V_2$, $V_1 \neq V_M$, or all different from each other, i.e., $V_1 \neq V_2 \ldots \neq V_M$.

The present disclosure does not limit the topology used in each power converter 701 either. The M power converters 701 in the modular power supply system of the present disclosure may be any one kind of AC/DC converters, DC/AC converters and DC/DC converters. A power converter 701 in FIG. 7 represents any one kind of the applicable AC/DC, DC/AC and DC/DC topology structures. The feature that the present disclosure does not limit the topology structure used in the M power converters 701 further lies in that the topology structures of the M power converters may be all identical, or partially identical. For example, the topology structures of all of the M power converters 701 in each power unit 70 of the modular power supply system of the present disclosure may be any one kind of full-bridge converters, half-bridge converters, neutral point clamped three-level converters, diode clamping three-level converters, flying capacitor three-level converters, full-bridge resonant converters and half-bridge resonant converters. Alternatively, for example, the topology structures of the M power converters 701 in each power unit 70 of the modular power supply system of the present disclosure may be a combination of two or more kinds of full-bridge converters, half-bridge converters, neutral point clamped three-level converters, diode clamping three-level converters, flying capacitor three-level converters, full-bridge resonant converters and half-bridge resonant converters.

As shown in FIG. 6 and FIG. 7, each power unit 70 in the modular power supply system of the present embodiment may include: M drive circuits 702, in one-to-one correspondence with the M power converters 701, wherein each of the drive circuits 702 is configured to be connected to the power semiconductor switch of the corresponding power converter 701, and receive at least one local control signal output by the corresponding local controller 91, and output at least one driving signal according to the at least one local control signal to control turn-on and turn-off of the power semiconductor switches in the corresponding M power converters 701.

In other embodiments, each power unit in the modular power supply system may include: a plurality of drive circuits, wherein the number of the plurality of drive circuits is equal to the number of the power semiconductor switches in the power unit. Each of the drive circuits is configured to be connected to the corresponding power semiconductor switch, to receive a corresponding local control signal and output a driving signal according to the corresponding local control signal to control turn-on and turn-off of the corresponding power semiconductor switch.

Figure 8:
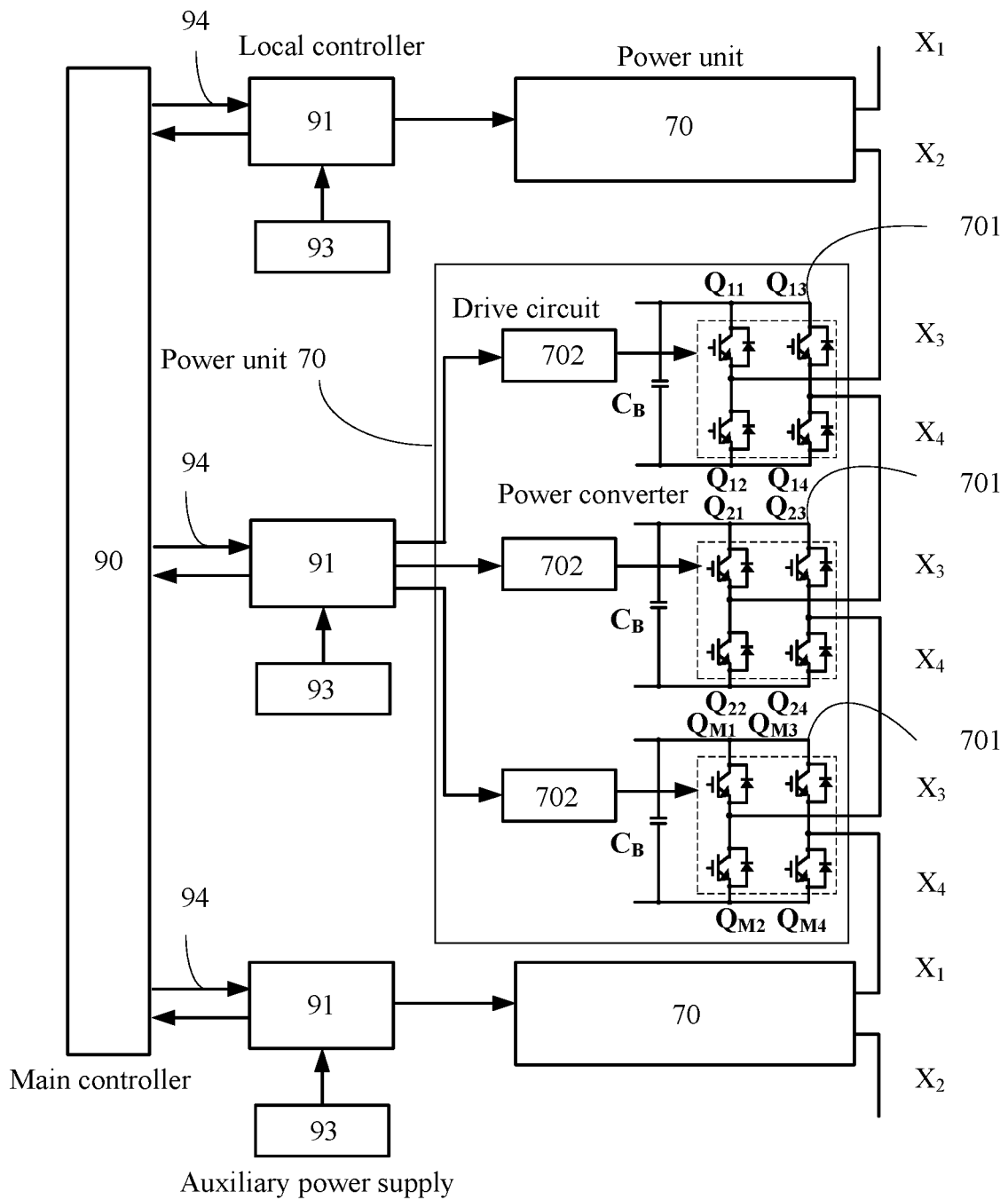
FIG. 8 is a block diagram of a modular power supply system in accordance with another embodiment of the present disclosure.

FIG. 8 is a block diagram of a modular power supply system in accordance with another embodiment of the present disclosure. As shown in FIG. 8, the topology structures of all of the M power converters 701 of each power unit 70 in the modular power supply system of the present embodiment employ full-bridge converters, such as an H-bridge circuit. Each H-bridge circuit 701 includes four power semiconductor switches and a DC bus capacitor. The four power semiconductor switches form two bridge arms. For convenience of explanation, the four power semiconductor switches are respectively defined as an upper power semiconductor switch of one bridge arm, a lower power semiconductor switch of the one bridge arm, an upper power semiconductor switch of the other bridge arm and a lower power semiconductor switch of the said the other bridge arm. In the embodiment, one end of the upper power semiconductor switch of the one bridge arms is connected to one end of the upper power semiconductor switch of the said the other bridge arm and one end of the DC bus capacitor. The other end of the lower power semiconductor switch of the one bridge arm is connected to the other end of the lower power semiconductor switch of the said the other bridge arm and the other end of the DC bus capacitor. The upper power semiconductor switch and the lower power semiconductor switch of the one bridge arm are connected at a third end $X_3$. The upper power semiconductor switch and the lower power semiconductor switch of the said the other bridge arm are connected at the fourth end $X_4$. Taking the M-th power converter 701 as an example, the power converter 701 includes two bridge arms and a DC bus capacitor. One end of the upper power semiconductor switch $Q_{M1}$ of one bridge arm is connected to one end of the upper power semiconductor switch $Q_{M3}$ of the other bridge arm and one end of the DC bus capacitor $C_B$. The other end of the lower power semiconductor switch $Q_{M2}$ of the one bridge arm is connected to the other end of the lower power semiconductor switch $Q_{M4}$ of the said the other bridge arm and the other end of the DC bus capacitor $C_B$. A connection point of the upper power semiconductor switch $Q_{M1}$ and the lower power semiconductor switch $Q_{M2}$ of one bridge arm is the third end $X_3$. A connection point of the upper power semiconductor switch $Q_{M3}$ and the lower power semiconductor switch $Q_{M4}$ of the other bridge arm is the fourth end $X_4$.

In this embodiment, the third end $X_3$ of the first H-bridge circuit 701 in each power unit 70 is connected to the first end $X_1$ of the power unit 70, and the fourth end $X_4$ of the first H-bridge circuit 701 is connected to the third end $X_3$ of the second H-bridge circuits 701, and so on, the fourth end $X_4$ of the (M−1)-th H-bridge circuit 701 is connected to the third end $X_3$ of the M-th H-bridge circuit 701, and the fourth end $X_4$ of the M-th power converter is connected to the second end $X_2$ of the power unit 70.

The local controller 91 corresponding to each power unit 70 outputs at least one local control signal for controlling the turn-on and turn-off of the power semiconductor switches in the corresponding H-bridge circuit 701. In this embodiment, each H-bridge circuit 701 needs four local control signals to respectively control the corresponding power semiconductor switches to be turned on and off. Each power unit 70 needs 4*M local control signals. That is, the local controller needs to output 4*M local control signals, to control the turn-on and turn-off of the corresponding power semiconductor switches. That is, each of the power semiconductor switches $Q_{11}$-$Q_{M4}$ needs a corresponding local control signal.

As shown in FIG. 8, each power unit 70 further includes M drive circuits 702. The drive circuits 702 are in one-to-one correspondence with M H-bridge circuits 701. Each drive circuit 702 receives a corresponding local control signal and outputs at least one driving signal to respectively control the turn-on and turn-off of the corresponding power semiconductor switches. Specifically, each drive circuit 702 receives the corresponding four local control signals, and outputs four driving signals to respectively control the turn-on and turn-off of the corresponding power semiconductor switches. Taking the drive circuit 702 corresponding to the first H-bridge circuit 701 as an example, the drive circuit outputs four driving signals to respectively control the turn-on and turn-off of the power semiconductor switches $Q_{11}$-$Q_{14}$.

In other embodiments, each power unit 70 includes a plurality of drive circuits. The number of drive circuits is equal to 4*M. Each drive circuit is connected to a corresponding power semiconductor switch, and receives a corresponding local control signal to output a driving signal for controlling the turn-on and turn-off of the corresponding power semiconductor switch. Taking the four drive circuits corresponding to the first H-bridge circuit 701 as an example, the four drive circuits are respectively connected to the power semiconductor switches $Q_{11}$-$Q_{14}$. Each drive circuit outputs a driving signal to control the turn-on and turn-off of the corresponding one of the power semiconductor switches $Q_{M1}$-$Q_{M4}$.

Figure 9:
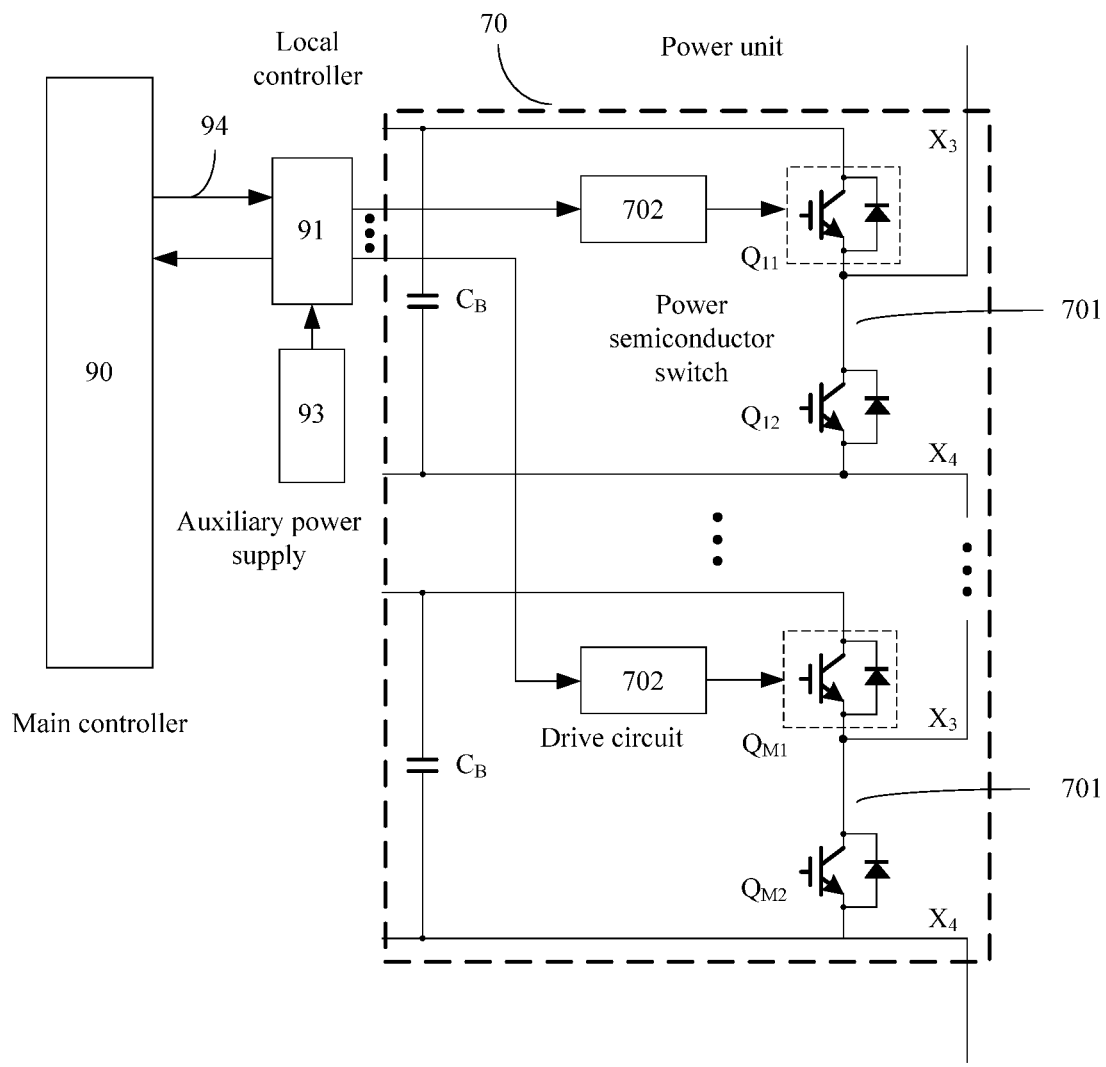
FIG. 9 is a block diagram of a modular power supply system in accordance with another embodiment of the present disclosure.

FIG. 9 is a block diagram of a modular power supply system in accordance with another embodiment of the present disclosure. As shown in FIG. 9, the topology structures of all of the M power converters 701 of each power unit 70 in the modular power supply system of the present embodiment employ half-bridge converters. Each of the half-bridge converters 701 includes two power semiconductor switches and a DC bus capacitor $C_B$, the connection relationship of which is shown in FIG. 9. One end of one power semiconductor is connected to one end of the DC bus capacitor $C_B$, the other end of the one power semiconductor is connected to one end of the other power semiconductor switch, and the other end of the said the other power semiconductor switch is connected to the other end of the DC bus capacitor $C_B$. A connection point at which the two power semiconductor switches are connected to each other is the third end $X_3$, and the other end of the said the other power semiconductor switch is the fourth end $X_4$. Taking the first power converter 701 as an example, the power converter 701 includes two power semiconductor switches $Q_{11}$, $Q_{12}$ and a DC bus capacitor $C_B$. One end of the power semiconductor switch $Q_{11}$ is connected to one end of the DC bus capacitor $C_B$, the other end of the power semiconductor switch $Q_{11}$ is connected to one end of the power semiconductor switch $Q_{12}$, and the other end of the power semiconductor switch $Q_{12}$ is connected to the other end of the DC bus capacitor $C_B$. The connection point of the power semiconductor switch $Q_{11}$ and the power semiconductor switch $Q_{12}$ is the third end $X_3$ of the first power converter 701, and the other end of the power semiconductor switch $Q_{12}$ is the fourth end $X_4$ of the first power converter 701.

In this embodiment, the third end $X_3$ of the first half-bridge converter in each power unit 70 is connected to the first end $X_1$ of the power unit 70, the fourth end $X_4$ of the first half-bridge converter is connected to the third end $X_3$ of the second half-bridge converter, and so on, the fourth end $X_4$ of the (M−1)-th half-bridge converter is connected to the third end $X_3$ of the M-th half-bridge converter, and the four end $X_4$ of the M-th half-bridge converter is connected to the second end $X_2$ of the power unit 70.

In this embodiment, the local controller corresponding to each power unit 70 may output 2*M local control signals, for controlling the turn-on and turn-off of the power semiconductor switches $Q_{11}$-$Q_{M2}$ in the half-bridge converter 701. That is, each of the power semiconductor switches $Q_{11}$-$Q_{M2}$ needs a local control signal.

As shown in FIG. 9, each power unit 70 includes M drive circuits 702. The drive circuits 702 are in one-to-one correspondence with the M half-bridge converters 701. Each drive circuit 702 receives a corresponding local control signal and outputs at least one driving signal to respectively control the turn-on and turn-off of the corresponding power semiconductor switches. Specifically, each drive circuit 702 receives two corresponding local control signals, and outputs two driving signals to respectively control the turn-on and turn-off of the corresponding power semiconductor switches. Taking the drive circuit 702 corresponding to the first half-bridge converter 701 as an example, the drive circuit outputs two driving signals for controlling the turn-on and turn-off of the power semiconductor switches $Q_{11}$-$Q_{12}$ respectively.

In other embodiments, each power unit 70 further includes a plurality of drive circuits. The number of the drive circuits is equal to 2*M. Each drive circuit is connected to a corresponding one of the power semiconductor switches, and receives a corresponding local control signal to output a driving signal to control the turn-on and turn-off of the corresponding power semiconductor switch. Taking the two drive circuits corresponding to the first half-bridge converter 701 as an example, the two drive circuits are respectively connected to the power semiconductor switches $Q_{11}$-$Q_{12}$, and each drive circuit outputs a driving signal to control the turn-on and turn-off of the corresponding one of the power semiconductor switches $Q_{11}$-$Q_{12}$.

Figure 10:
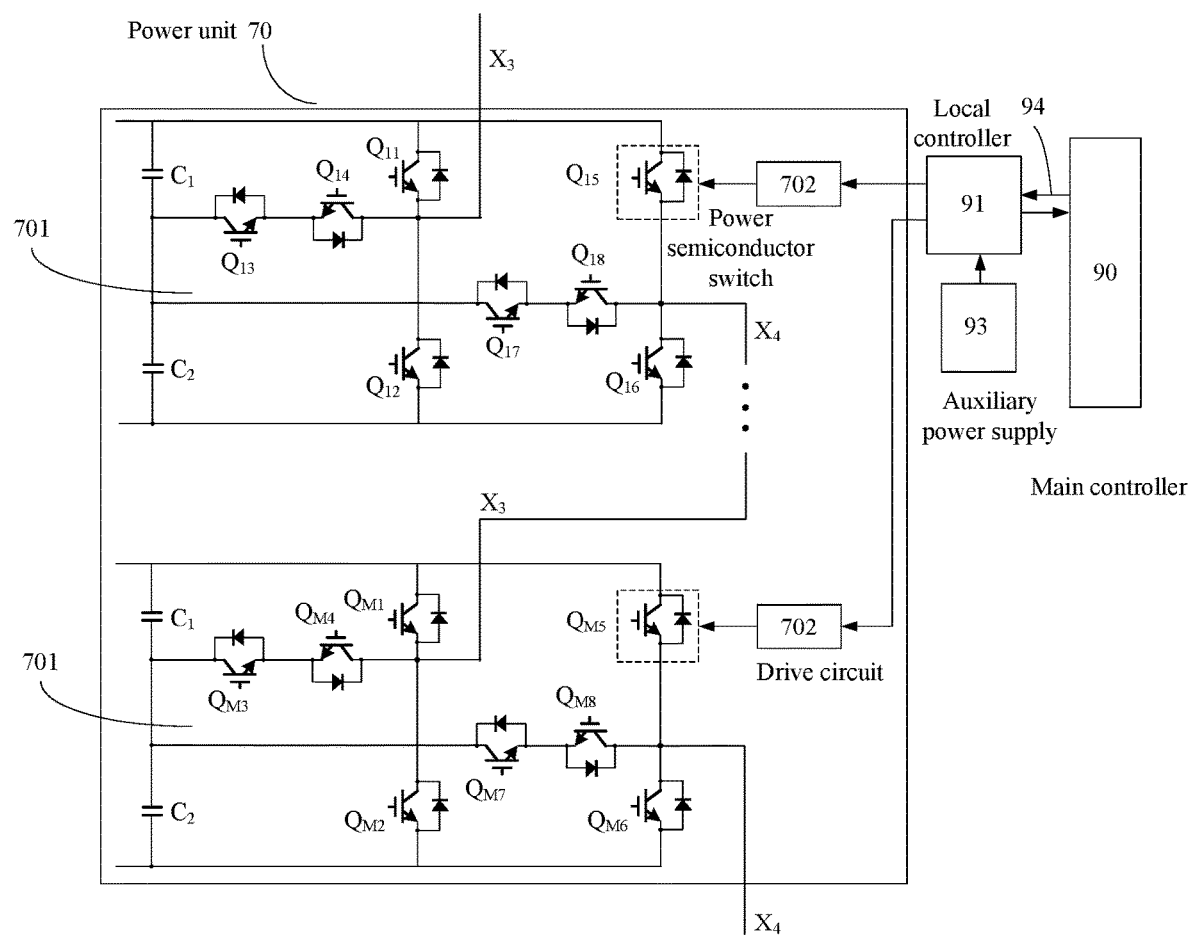
FIG. 10 is a block diagram of a modular power supply system in accordance with another embodiment of the present disclosure.

FIG. 10 is a block diagram of a modular power supply system in accordance with another embodiment of the present disclosure. As shown in FIG. 10, the topology structures of all of the M power converters 701 of each power unit 70 in the modular power supply system of the present embodiment employ neutral point clamped three-level converters. Each of the neutral point clamped three-level converters 701 includes eight power semiconductor switches and two DC bus capacitors, the connection relationship of which is shown in FIG. 10. Taking the first power converter 701 as an example, one end of the power semiconductor switch $Q_{11}$ is connected to one end of the DC bus capacitor $C_1$ and one end of the power semiconductor switch $Q_{15}$, the other end of the DC bus capacitor $C_1$ is connected to one end of the DC bus capacitor $C_2$, and the other end of the power semiconductor switch $Q_{11}$ is connected to one end of the power semiconductor switch $Q_{12}$. A connection point of the power semiconductor switch $Q_{11}$ and the power semiconductor switch $Q_{12}$ is the third end $X_3$ of the first power converter 701. The other end of the power semiconductor switch $Q_{15}$ is connected to one end of the power semiconductor switch $Q_{16}$. The other end of the power semiconductor switch $Q_{12}$ is connected to the other end of the DC bus capacitor $C_2$ and the other end of the power semiconductor switch $Q_{16}$. A connection point of the power semiconductor switch $Q_{15}$ and the power semiconductor switch $Q_{16}$ is the fourth end $X_4$ of the first power converter 701. One end of the power semiconductor switch $Q_{13}$ is connected to the said the other end of the DC bus capacitor $C_1$, the other end of the power semiconductor switch $Q_{13}$ is connected to one end of the power semiconductor switch $Q_{14}$, and the other end of the power semiconductor switch $Q_{14}$ is connected to the said the other end of the power semiconductor switch $Q_{11}$. One end of the power semiconductor switch $Q_{13}$ is connected to the said the other end of the DC bus capacitor $C_1$, the other end of the power semiconductor switch $Q_{17}$ is connected to one end of the power semiconductor switch $Q_{18}$, and the other end of the power semiconductor switch $Q_{18}$ is connected to the said the other end of the power semiconductor switch $Q_{15}$.

In this embodiment, the third end $X_3$ of the first neutral point clamped three-level converter in each power unit 70 is connected to the first end $X_1$ of the power unit 70, the fourth end $X_4$ of first neutral point clamped three-level converter is connected to the third end $X_3$ of the second neutral point clamped three-level converter, and so on, the fourth end $X_4$ of the (M−1)-th neutral point clamped three-level converter is connected to the third end $X_3$ of the M-th neutral point clamped three-level converter, and the fourth end $X_4$ of the M-th neutral point clamped three-level converter is connected to the second end $X_2$ of the power unit 70.

In this embodiment, the local controller 91 corresponding to each power unit may output 8*M local control signals, for controlling the turn-on and turn-off of the power semiconductor switches $Q_{11}$-$Q_{M8}$ in the neutral point clamped three-level converter 701. That is, each of the power semiconductor switches $Q_{11}$-$Q_{M8}$ needs a local control signal.

As shown in FIG. 10, each power unit 70 further includes M drive circuits 702. The drive circuits 702 are in one-to-one correspondence with the M neutral point clamped three-level converters 701. Each drive circuit 702 receives a corresponding local control signal and outputs at least one driving signal to respectively control the turn-on and turn-off of the corresponding power semiconductor switches. Specifically, each drive circuit 702 receives the corresponding eight local control signals, and outputs eight driving signals to respectively control the turn-on and turn-off of the corresponding power semiconductor switches. Taking the drive circuit 702 corresponding to the first neutral point clamped three-level converter 701 as an example, the drive circuit outputs eight driving signals for controlling the turn-on and turn-off of the power semiconductor switches $Q_{11}$-$Q_{18}$ respectively.

In other embodiments, each power unit 70 includes a plurality of drive circuits. The number of the drive circuits is equal to 8*M. Each drive circuit is connected to a corresponding one of the power semiconductor switches, and receives a corresponding local control signal to output a driving signal to control the turn-on and turn-off of the corresponding power semiconductor switch. Taking the eight drive circuits corresponding to the first neutral point clamped three-level converter 701 as an example, the eight drive circuits are respectively connected to the power semiconductor switches $Q_{11}$-$Q_{18}$ and each drive circuit outputs a driving signal to control the turn-on and turn-off of the corresponding one of the power semiconductor switches $Q_{11}$-$Q_{18}$.

Figure 11:
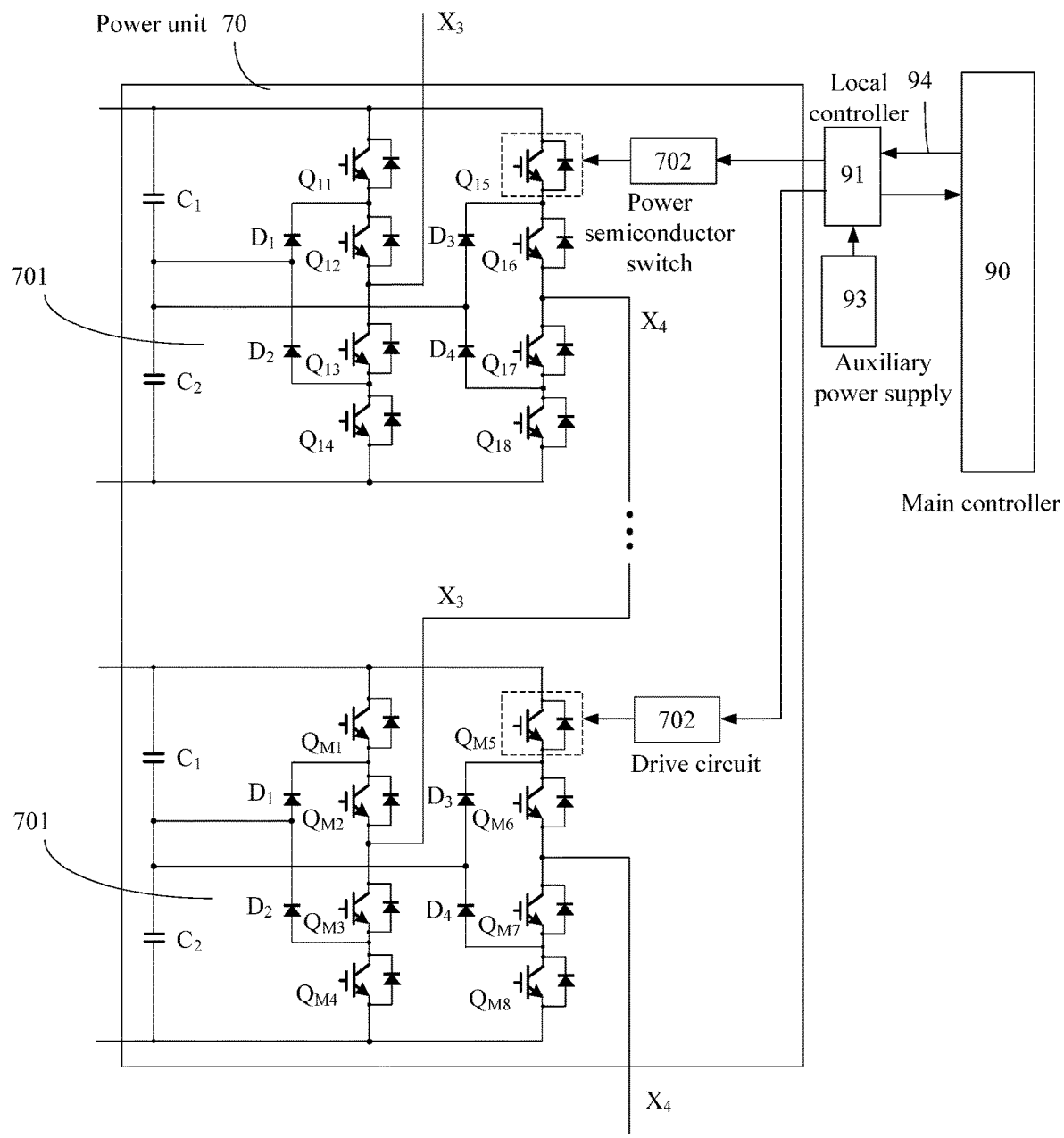
FIG. 11 is a block diagram of a modular power supply system in accordance with another embodiment of the present disclosure.

FIG. 11 is a block diagram of a modular power supply system in accordance with another embodiment of the present disclosure. As shown in FIG. 11, the topology structures of all of the M power converters 701 of each power unit 70 in the modular power supply system of the present embodiment employ diode clamping three-level converters. Each of the diode clamping three-level converters 701 includes eight power semiconductor switches, four clamping diodes and two DC bus capacitors, the connection relationship of which is shown in FIG. 11. Taking the first power converter 701 as an example, one end of the power semiconductor switch $Q_{11}$ is connected to one end of the DC bus capacitor $C_1$ and one end of the power semiconductor switch $Q_{15}$, the other end of the power semiconductor switch $Q_{11}$ is connected to one end of the power semiconductor switch $Q_{12}$ and a cathode of the clamping diode $D_1$, the other end of the power semiconductor switch $Q_{12}$ is connected to one end of the power semiconductor switch $Q_{13}$, the other end of the power semiconductor switch $Q_{13}$ is connected to one end of the power semiconductor switch $Q_{14}$ and an anode of the clamping diode $D_2$, the other end of the DC bus capacitor $C_1$ is connected to one end of the DC bus capacitor $C_2$, the other end of the power semiconductor switch $Q_{14}$ is connected to the other end of the DC bus capacitor $C_2$, and an anode of the clamping diode $D_1$ is connected to a cathode of the clamping diode $D_2$ and the said the other end of the DC bus capacitor $C_1$. A connection point of the power semiconductor switch $Q_{12}$ and the power semiconductor switch $Q_{13}$ is the third end $X_3$ of the first power converter 701. The other end of the power semiconductor switch $Q_{15}$ is connected to one end of the power semiconductor switch $Q_{16}$ and a cathode of the clamping diode $D_3$, the other end of the power semiconductor switch $Q_{16}$ is connected to one end of the power semiconductor switch $Q_{17}$. The other end of the semiconductor switch $Q_{17}$ is connected to one end of the power semiconductor switch $Q_{18}$ and an anode of the clamping diode $D_4$, the other end of the power semiconductor switch $Q_{18}$ is connected to the said the other end of the DC bus capacitor $C_2$, and an anode of the clamping diode $D_3$ is connected to a cathode of the clamping diode $D_4$ and the said the other end of the DC bus capacitor $C_1$. A connection point of the power semiconductor switch $Q_{16}$ and the power semiconductor switch $Q_{17}$ is the fourth end $X_4$ of the first power converter 701.

In this embodiment, the third end $X_3$ of the first diode clamping three-level converter in each power unit 70 is connected to the first end $X_1$ of the power unit 70, the fourth end $X_4$ of first diode clamping three-level converter is connected to the third end $X_3$ of the second diode clamping three-level converter, and so on, the fourth end $X_4$ of the (M−1)-th diode clamping three-level converter is connected to the third end $X_3$ of the M-th diode clamping three-level converter, and the fourth end $X_4$ of the M-th diode clamping three-level converter is connected to the second end $X_2$ of the power unit 70.

In this embodiment, the local controller 91 corresponding to each power unit may output 8*M local control signals, for controlling the turn-on and turn-off of the power semiconductor switches $Q_{11}$-$Q_M$S in the neutral point controllable three-level converter 701. That is, each of the power semiconductor switches $Q_{11}$-$Q_{M8}$ is needs a local control signal.

As shown in FIG. 11, each power unit 70 further includes M drive circuits 702. The drive circuits 702 are in one-to-one correspondence with the M diode clamping three-level converters 701. Each drive circuit 702 receives a corresponding local control signal and outputs at least one driving signal to respectively control the turn-on and turn-off of the corresponding power semiconductor switches. Specifically, each drive circuit 702 receives the corresponding eight local control signals, and outputs eight driving signals to respectively control the turn-on and turn-off of the corresponding power semiconductor switches. Taking the drive circuit 702 corresponding to the first diode clamping three-level converter 701 as an example, the drive circuit outputs eight driving signals for controlling the turn-on and turn-off of the power semiconductor switches $Q_{11}$-$Q_{18}$ respectively.

In other embodiments, each power unit 70 includes a plurality of drive circuits. The number of the drive circuits is equal to 8*M. Each drive circuit is connected to a corresponding one of the power semiconductor switches, and receives a corresponding local control signal for outputting a driving signal to control the turn-on and turn-off of the corresponding power semiconductor switch. Taking the eight drive circuits corresponding to the first diode clamping three-level converter 701 as an example, the eight drive circuits are respectively connected to the power semiconductor switches $Q_{11}$-$Q_{18}$ and each drive circuit outputs a driving signal to control the turn-on and turn-off of the corresponding one of the power semiconductor switches $Q_{11}$-$Q_{18}$.

Figure 12:
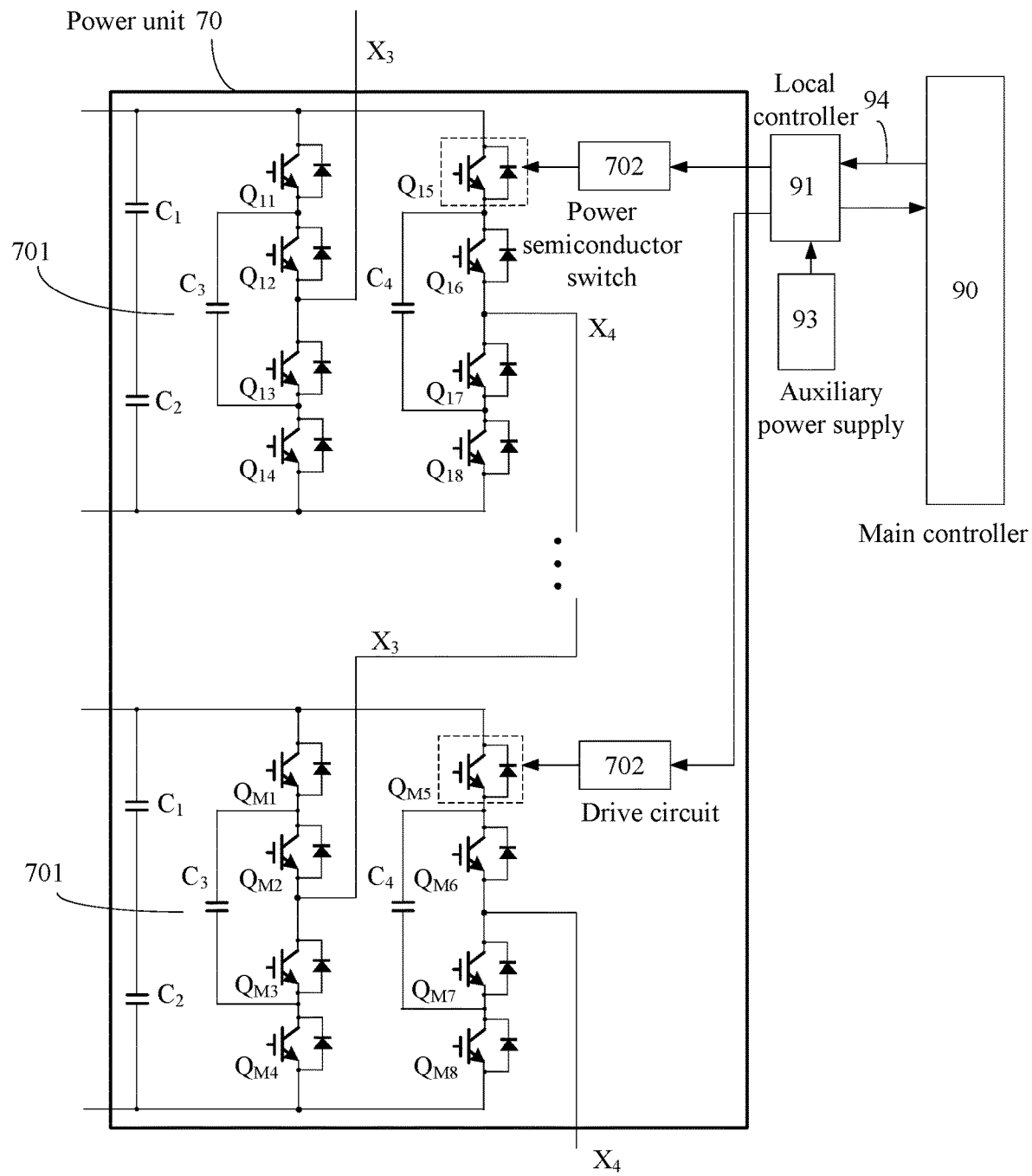
FIG. 12 is a block diagram of a modular power supply system in accordance with another embodiment of the present disclosure.

FIG. 12 is a block diagram of a modular power supply system in accordance with another embodiment of the present disclosure. As shown in FIG. 12, the topology structures of all of the M power converters 701 of each power unit 70 in the modular power supply system of the present embodiment employ flying capacitor three-level converters. Each of the flying capacitor three-level converters 701 includes eight power semiconductor switches, two DC bus capacitors and two flying capacitors, the connection relationship of which is shown in FIG. 12. Taking the first power converter 701 as an example, one end of the power semiconductor switch $Q_{11}$ is connected to one end of the DC bus capacitor $C_1$ and one end of the power semiconductor switch $Q_{18}$, the other end of the power semiconductor switch $Q_{11}$ is connected to one end of the power semiconductor switch $Q_{12}$ and one end of the flying capacitor $C_3$, the other end of the power semiconductor switch $Q_{12}$ is connected to one end of the power semiconductor switch $Q_{13}$, the other end of the power semiconductor switch $Q_{13}$ is connected to one end of the power semiconductor switch $Q_{14}$ and the other end of the flying capacitor $C_3$, the other end of the DC bus capacitor $C_1$ is connected to one end of the of DC bus capacitor $C_2$, and the other end of the power semiconductor switch $Q_{14}$ is connected to the other end of the DC bus capacitor $C_2$. A connection point of the power semiconductor switch $Q_{12}$ and the power semiconductor switch $Q_{13}$ is the third end $X_3$ of the first power converter 701. The other end of the power semiconductor switch $Q_{15}$ is connected to one end of the power semiconductor switch $Q_{16}$ and one end of the flying capacitor $C_B$, the other end of the power semiconductor switch $Q_{16}$ is connected to one end of the power semiconductor switch $Q_{17}$, the other end of the power semiconductor switch $Q_{17}$ is connected to one end of the power semiconductor switch $Q_{18}$ and the other end of the flying capacitor $C_4$, and the other end of the power semiconductor switch $Q_{18}$ is connected to the other end of the DC bus capacitor $C_2$. A connection point of the power semiconductor switches $Q_{16}$ and the power semiconductor switch $Q_{17}$ is a fourth end $X_4$ of the first power converter 701.

In this embodiment, the third end $X_3$ of the first flying capacitor three-level converter in each power unit 70 is connected to the first end $X_1$ of the power unit 70, the fourth end $X_4$ of first flying capacitor three-level converter is connected to the third end $X_3$ of the second flying capacitor three-level converter, and so on, the fourth end $X_4$ of the (M−1)-th flying capacitor three-level converter is connected to the third end $X_3$ of the M-th flying capacitor three-level converter, and the fourth end $X_4$ of the M-th flying capacitor three-level converter is connected to the second end $X_2$ of the power unit 70.

In this embodiment, the local controller 91 corresponding to each power unit may output 8*M local control signals, for controlling the turn-on and turn-off of the power semiconductor switches $Q_{11}$-$Q_{M8}$ in the flying capacitor three-level converter 701. That is, each of the power semiconductor switches $Q_{11}$-$Q_{M8}$ needs a local control signal.

As shown in FIG. 12, each power unit 70 further includes M drive circuits 702. The drive circuits 702 are in one-to-one correspondence with the M flying capacitor three-level converters 701. Each drive circuit 702 receives a corresponding local control signal and outputs at least one driving signal to respectively control the turn-on and turn-off of the corresponding power semiconductor switches. Specifically, each drive circuit 702 receives the corresponding eight local control signals, and outputs eight driving signals to respectively control the turn-on and turn-off of the corresponding power semiconductor switches. Taking the drive circuit 702 corresponding to the first flying capacitor three-level converter 701 as an example, the drive circuit outputs eight driving signals for controlling the turn-on and turn-off of the power semiconductor switches $Q_{11}$-$Q_{18}$ respectively.

In other embodiments, each power unit 70 includes a plurality of drive circuits. The number of the drive circuits is equal to 8*M. Each drive circuit receives a corresponding local control signal and outputs a driving signal to control the turn-on and turn-off of the corresponding power semiconductor switch. Taking the eight drive circuits corresponding to the first flying capacitor three-level converter 701 as an example, the eight drive circuits are respectively connected to the power semiconductor switches $Q_{11}$-$Q_{18}$, and each drive circuit outputs a driving signal to control the turn-on and turn-off of the corresponding one of the power semiconductor switches $Q_{11}$-$Q_{18}$.

The M power converters 701 in the modular power supply system of FIGS. 8-12 may be AC/DC converters or DC/AC converters, but not limited thereto, and may be converters of other topology structures as well.

Figure 13:
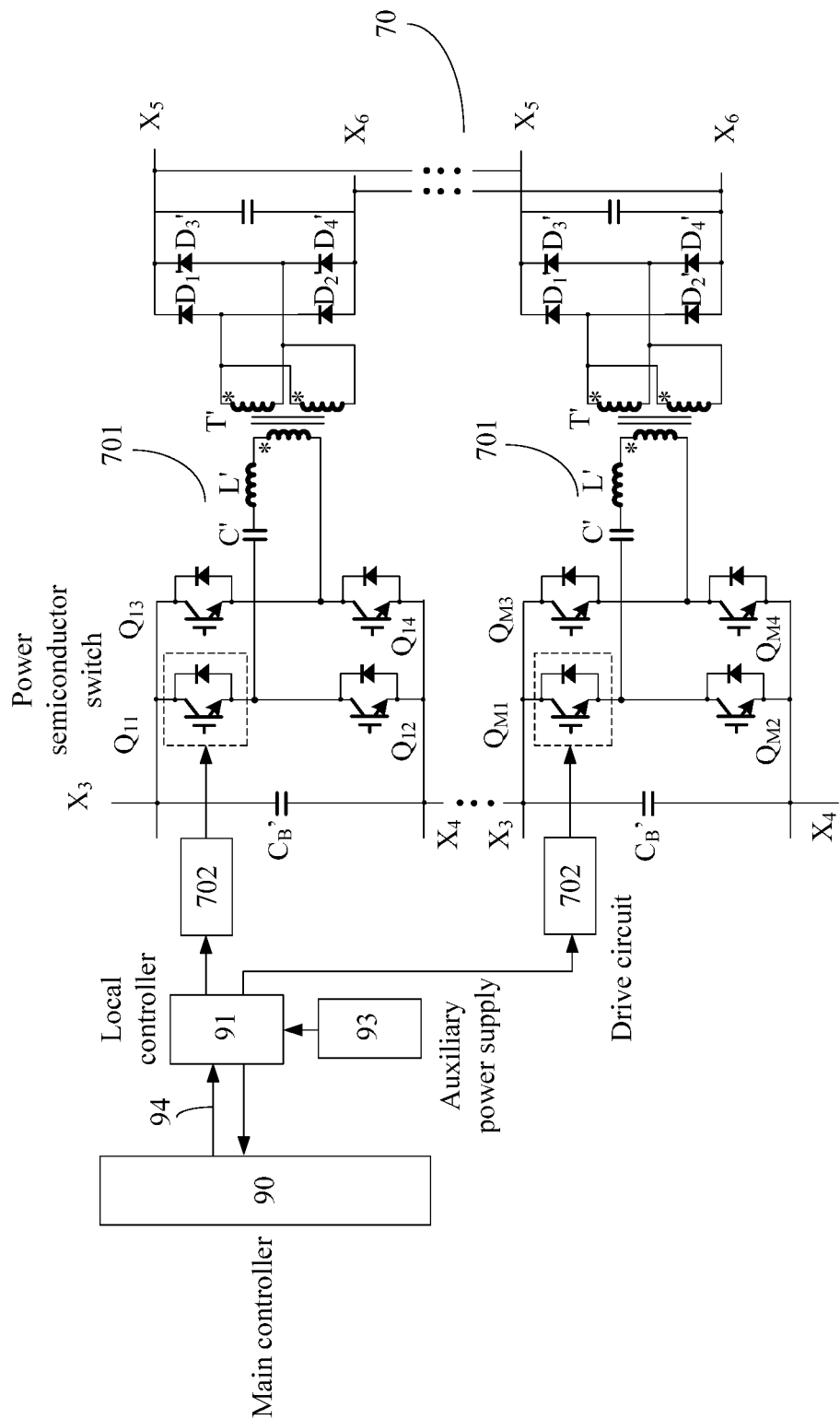
FIG. 13 is a block diagram of a modular power supply system in accordance with another embodiment of the present disclosure.

FIG. 13 is a block diagram of a modular power supply system in accordance with another embodiment of the present disclosure. As shown in FIG. 13, the topology structures of all of the M power converters 701 of each power unit 70 in the modular power supply system of the present embodiment employ full-bridge resonant converters. Each of the full-bridge resonant converters 701 includes a full-bridge circuit, a resonant circuit, a transformer and a rectifier bridge, the connection relationship of which is as shown in FIG. 13. Taking the first full-bridge resonant converter 701 as an example, the full-bridge circuit includes four power semiconductor switches and one DC bus capacitor C. One end of the power semiconductor switch $Q_{11}$ is connected to one end of the DC bus capacitor $C_B'$ and one end of the power semiconductor switch $Q_{13}$, the other end of the power semiconductor switch $Q_{11}$ is connected to one end of the power semiconductor switch $Q_{12}$, the other end of the power semiconductor switch $Q_{13}$ is connected to one end of the power semiconductor switch $Q_{14}$, and the other end of the power semiconductor switch $Q_{12}$ is connected to the other end of the DC bus capacitor $C_B'$ and the other end of the power semiconductor switch $Q_{14}$. A connection point of the power semiconductor switch $Q_{11}$ and the power semiconductor switch $Q_{12}$ is connected to one end of a resonant circuit formed by a capacitor C' and an inductor L', and the other end of the resonant circuit is connected to one end of a primary winding of the transformer T', and the other end of the primary winding of the transformer T' is connected to the connection point of the power semiconductor switch $Q_{13}$ and the power semiconductor switch $Q_{14}$. The said one end of the DC bus capacitor $C_B'$ is the third end $X_3$ of the first power converter, and the other end of the DC bus capacitor $C_B'$ is the fourth end $X_4$ of the first power converter. The rectifier bridge includes four rectifier diodes, one end of the rectifier diode $D_1'$ is connected to one end of the rectifier diode $D_3'$, the other end of the rectifier diode $D_1'$ is connected to one end of the rectifier diode $D_2'$, the other end of the rectifier diode $D_3'$ is connected to one end of the rectifier diode $D_4'$, and the other end of the rectifier diode $D_1'$ is connected to the other end of the rectifier diode $D_4'$. The said one end of the rectifier diode $D_1'$ is the fifth end $X_5$ of the converter, and the said the other end of the rectifier diode $D_2'$ is the sixth end $X_6$ of the converter. The output end of the transformer T' is respectively connected to the connection point of the rectifier diode $D_1'$ and the rectifier diode $D_2'$ and the connection point of the rectifier diode $D_3'$ and the rectifier diode $D_4'$. The transformer T' may be a center tap transformer having two secondary windings connected in parallel, or the transformer T' may have one single secondary winding.

In this embodiment, the third end $X_3$ of the first full-bridge resonant converter in each power unit 70 is connected to the first end $X_1$ of the power unit 70, the fourth end $X_4$ of first full-bridge resonant converter is connected to the third end $X_3$ of the second full-bridge resonant converter, and so on, the fourth end $X_4$ of the (M–1)-th full-bridge resonant converter is connected to the third end $X_3$ of the M-th full-bridge resonant converter, and the fourth end $X_4$ of the M-th full-bridge resonant converter is connected to the second end $X_2$ of the power unit 70. The fifth ends $X_5$ of all of the full-bridge resonant converters in each power unit 70 are connected together, and the sixth ends $X_6$ of all of the full-bridge resonant converters are connected together.

In this embodiment, the local controller 91 corresponding to each power unit may output 4*M local control signals, for controlling the turn-on and turn-off of the power semiconductor switches $Q_{11}$-$Q_{M4}$ in the full-bridge resonant converter 701. That is, each of the power semiconductor switches $Q_{11}$-$Q_{M4}$ needs a local control signal.

As shown in FIG. 13, each power unit 70 further includes M drive circuits 702. The drive circuits 702 are in one-to-one correspondence with the M full-bridge resonant converters 701. Each drive circuit 702 receives a corresponding local control signal and outputs at least one driving signal to respectively control the turn-on and turn-off of the corresponding power semiconductor switches. Specifically, each drive circuit 702 receives the corresponding four local control signals, and outputs four driving signals to respectively control the turn-on and turn-off of the corresponding power semiconductor switches. Taking the drive circuit 702 corresponding to the first full-bridge resonant converter 701 as an example, the drive circuit outputs four driving signals for controlling the turn-on and turn-off of the power semiconductor switches $Q_{11}$-$Q_{14}$ respectively.

In other embodiments, each power unit 70 includes a plurality of drive circuits. The number of the drive circuits is equal to 4*M. Each drive circuit is connected to a corresponding one of the power semiconductor switches, and receives a corresponding local control signal to output a driving signal to control the turn-on and turn-off of the corresponding power semiconductor switch. Taking the four drive circuits corresponding to the first full-bridge resonant converter 701 as an example, the four drive circuits are respectively connected to the power semiconductor switches $Q_{11}$-$Q_{14}$ and each drive circuit outputs a driving signal to control the turn-on and turn-off of the corresponding one of the power semiconductor switches $Q_{11}$-$Q_{14}$.

Figure 14:
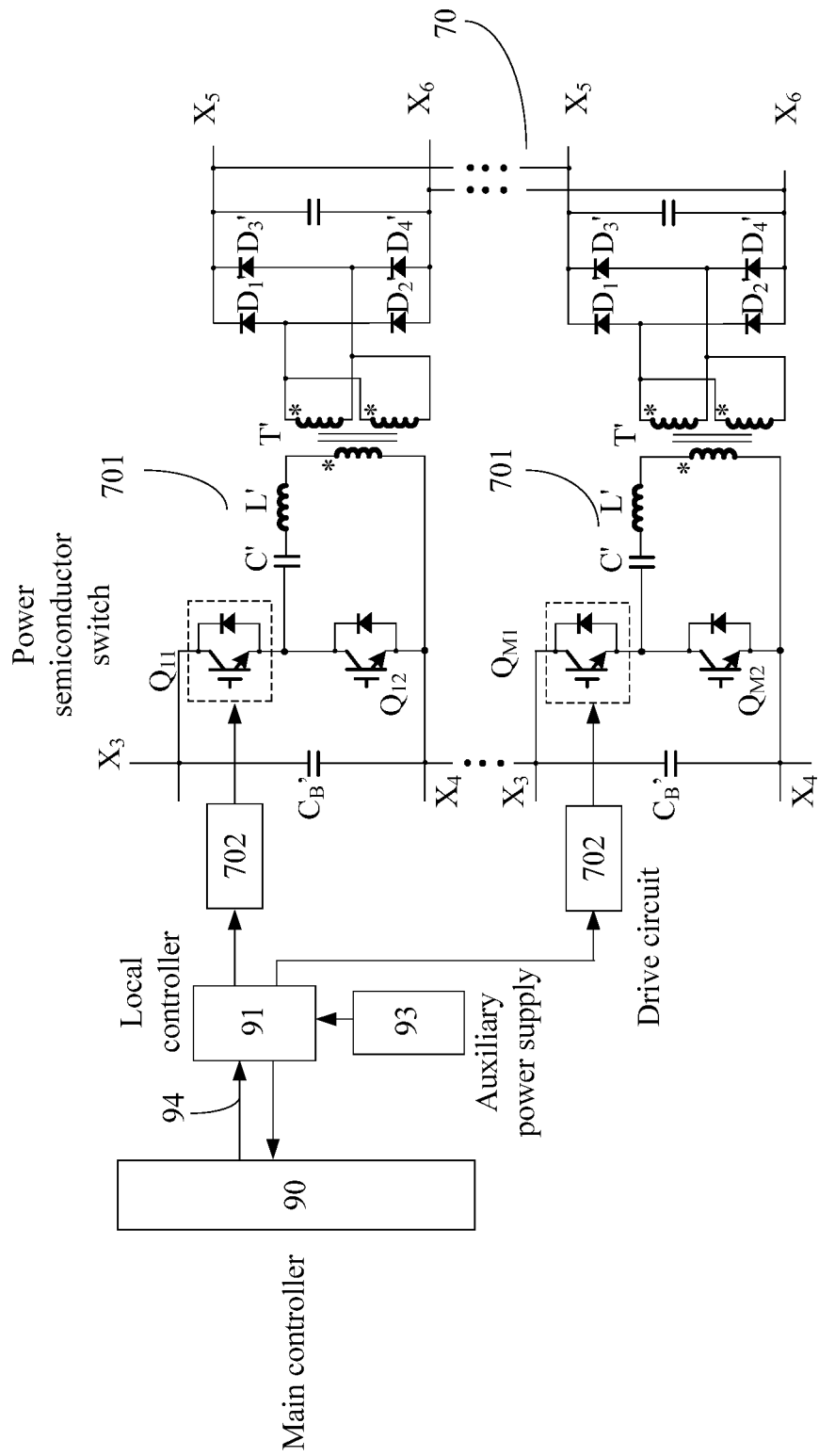
FIG. 14 is a block diagram of a modular power supply system in accordance with another embodiment of the present disclosure.

FIG. 14 is a block diagram of a modular power supply system in accordance with another embodiment of the present disclosure. As shown in FIG. 14, the topology structures of all of the M power converters 701 of each power unit 70 in the modular power supply system of the present embodiment employ half-bridge resonant converters. Each of the half-bridge resonant converters 701 includes a half-bridge circuit, a resonant circuit, a transformer and a rectifier bridge, the connection relationship of which is as shown in FIG. 14. Taking the first half-bridge resonant converter 701 as an example, the half-bridge circuit includes two power semiconductor switches and one DC bus capacitor $C_B'$. One end of the power semiconductor switch $Q_{11}$ is connected to one end of the DC bus capacitor $C_B'$, the other end of the power semiconductor switch $Q_{11}$ is connected to one end of the power semiconductor switch $Q_{12}$, and the other end of the power semiconductor switch $Q_{12}$ is connected to the other end of the DC bus capacitor $C_B'$. A connection point of the power semiconductor switch $Q_{11}$ and the power semiconductor switch $Q_{12}$ is connected to one end of a resonant circuit formed by a capacitor C' and an inductor L', the other end of the resonant circuit is connected to one end of a primary winding of the transformer T', and the other end of the primary winding of the transformer T' is connected to the said the other end of the power semiconductor switch $Q_{12}$. The said one end of the DC bus capacitor $C_B'$ is the third end $X_3$ of the first power converter, and the said the other end of the DC bus capacitor $C_B'$ is the fourth end $X_4$ of the first power converter. The rectifier bridge includes four rectifier diodes, one end of the rectifier diode $D_1'$ is connected to one end of the rectifier diode $D_3'$, the other end of the rectifier diode $D_1'$ is connected to one end of the rectifier diode $D_2'$, the other end of the rectifier diode $D_3'$ is connected to one end of the rectifier diode $D_4'$, and the other end of the rectifier diode $D_2'$ is connected to the other end of the rectifier diode $D_4'$. The said one end of the rectifier diode $D_1'$ is the fifth end $X_5$ of the converter, and the said the other end of the rectifier diode $D_2'$ is the sixth end $X_6$ of the converter. The output end of the transformer T' is respectively connected to the connection point of the rectifier diode $D_1'$ and the rectifier diode $D_2'$ and the connection point of the rectifier diode $D_3'$ and the rectifier diode $D_4'$. The transformer T' may be a center tap transformer having two secondary windings connected in parallel, or the transformer T' may have one single secondary winding as well.

In this embodiment, the third end $X_3$ of the first half-bridge resonant converter in each power unit 70 is connected to the first end $X_1$ of the power unit 70, the fourth end $X_4$ of first half-bridge resonant converter is connected to the third end $X_3$ of the second half-bridge resonant converter, and so on, the fourth end $X_4$ of the (M−1)-th half-bridge resonant converter is connected to the third end $X_3$ of the M-th half-bridge resonant converter, and the fourth end $X_4$ of the M-th half-bridge resonant converter is the second end $X_2$ of the power unit 70. The fifth ends $X_5$ of all of the half-bridge resonant converters in each power unit 70 are connected together, and the sixth ends $X_6$ of all of the half-bridge resonant converters are connected together.

In this embodiment, the local controller 91 corresponding to each power unit may output 2*M local control signals, for controlling the turn-on and turn-off of the power semiconductor switches $Q_{11}$-$Q_{M2}$ in the half-bridge resonant converter 701. That is, each of the power semiconductor switches $Q_{11}$-$Q_{M2}$ needs a local control signal.

As shown in FIG. 14, each power unit 70 further includes M drive circuits 702. The drive circuits 702 are in one-to-one correspondence with the M half-bridge resonant converters 701. Each drive circuit 702 receives a corresponding local control signal and outputs at least one driving signal to respectively control the turn-on and turn-off of the corresponding power semiconductor switches. Specifically, each drive circuit 702 receives the corresponding two local control signals, and outputs two driving signals to respectively control the turn-on and turn-off of the corresponding power semiconductor switches. Taking the drive circuit 702 corresponding to the first half-bridge resonant converter 701 as an example, the drive circuit outputs two driving signals for controlling the turn-on and turn-off of the power semiconductor switches $Q_{11}$-$Q_{12}$ respectively.

In other embodiments, each power unit 70 includes a plurality of drive circuits. The number of the drive circuits is equal to 2*M. Each drive circuit is connected to a corresponding one of the power semiconductor switches, and receives a corresponding local control signal and outputs a driving signal to control the turn-on and turn-off of the corresponding power semiconductor switch. Taking the two drive circuits corresponding to the first half-bridge resonant converter 701 as an example, the two drive circuits are respectively connected to the power semiconductor switches $Q_{11}$-$Q_{12}$ and each drive circuit outputs a driving signal to control the turn-on and turn-off of the corresponding one of the power semiconductor switches $Q_{11}$-$Q_{12}$.

The M power converters 701 in the modular power supply system of FIG. 13 and FIG. 14 may be DC/DC converters, but not limited thereto, and may be converters of other topology structures as well.

Figure 15:
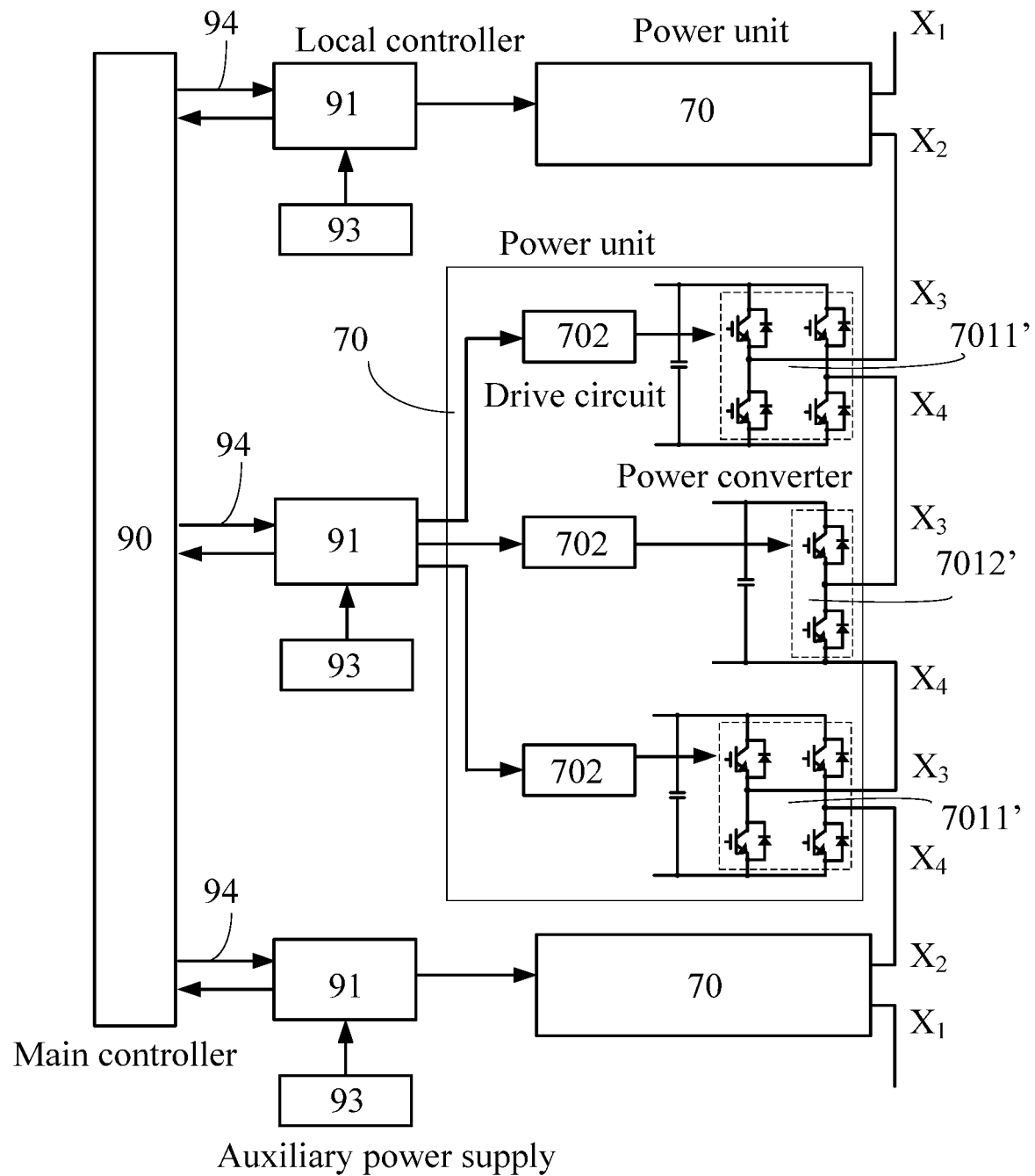
FIG. 15 is a block diagram of a modular power supply system in accordance with another embodiment of the present disclosure.

FIG. 15 is a block diagram of a modular power supply system in accordance with another embodiment of the present disclosure. As shown in FIG. 15, the topology structures of the M power converters of each power unit 70 in the modular power supply system of the present embodiment employ a combination of a full-bridge converter and a half-bridge converter. Each power converter 7011' of full-bridge converter includes four power semiconductor switches, and each half-bridge converter 7012' includes two power semiconductor switches, the connection relationship of which is as shown in FIG. 15. In this embodiment, the specific connection relationship of the full-bridge converter is as shown in FIG. 8, and the specific connection relationship of the half-bridge converter is shown in FIG. 9, so details are not described repeatedly herein again. Similarly, the fourth end $X_4$ of one of the adjacent two power converters 701 is connected to the third end $X_3$ of the other one of the adjacent two power converters 701, where M is a natural number greater than one. Thus, the third end $X_3$ of the first power converter 701 is connected to the first end $X_1$ of the power unit 70, the fourth end $X_4$ of the first power converter 701 is connected to the third end $X_3$ of the second power converter 701, and so on, the fourth end $X_4$ of the (M−1)-th power converter 701 is connected to the third end $X_3$ of the M-th power converter 701, and the fourth end $X_4$ of the M-th power converter 701 is connected to the second end $X_1$ of the power unit 70.

In this embodiment, the number of local control signals output by the local controller 91 corresponding to each power unit 70 is equal to the number of power semiconductor switches in the power unit 70. These local control signals respectively control turn-on and turn-off of the power semiconductor switches in the full-bridge converter and the half-bridge converter 701 (i.e., the power converters 7011' and 7012'. That is, each power semiconductor switch needs a local control signal.

As shown in FIG. 15, each power unit 70 further includes M drive circuits 702. The drive circuits 702 are in one-to-one correspondence with the M power converters 7011' and 7012'. Each drive circuit 702 receives a corresponding local control signal and outputs at least one driving signal to respectively control the turn-on and turn-off of the corresponding power semiconductor switches. Specifically, the drive circuit 702 corresponding to the power converter 7011' receives the corresponding four local control signals, and outputs four driving signals to respectively control the turn-on and turn-off of the corresponding power semiconductor switches. The drive circuit 702 corresponding to the power converters 7012' receives the corresponding two local control signals, and outputs two driving signals to respectively control the turn-on and turn-off of the corresponding power semiconductor switches.

In other embodiments, each power unit 70 includes a plurality of drive circuits. The number of drive circuits in the power unit is equal to the number of power semiconductor switches in the corresponding power unit. Each drive circuit is connected to a corresponding one of the power semiconductor switches, and receives a corresponding local control signal to output a driving signal to control the turn-on and turn-off of the corresponding power semiconductor switch. Taking the four drive circuits corresponding to the power converter 7011' as an example, the four drive circuits are respectively connected to the corresponding power semiconductor switches and each of the drive circuits outputs a driving signal to control the turn-on and turn-off of the corresponding one of the power semiconductor switches. Taking the two drive circuits corresponding to the power converter 7012' as an example, the two drive circuits are respectively connected to the corresponding power semiconductor switches and each of the drive circuits outputs a driving signal to control the turn-on and turn-off of the corresponding one of the power semiconductor switches.

Although FIG. 15 only shows that the topology structures of the M power converters 701 of each power unit 70 in the modular power supply system of the present embodiment employ a combination of full-bridge converters and half-bridge converters, but the present disclosure is not limited thereto. As described above, the topology structures of the M power converters 701 of each power unit 70 in the modular power supply system of the present embodiment may be a combination of two or more kinds of full-bridge converters, half-bridge converters, neutral point clamped three-level converters, diode clamping three-level converters, flying capacitor three-level converters, full-bridge resonant converters and half-bridge resonant converters.

In each of the power units 70 of the present embodiment, the power converter 701 employing the same topology structure may employ "shared driving". The so-called "shared driving" refers to that the power semiconductor switches at the same position of each power converter 701 (or 7011' or 7012') with the same topology structure may be controlled by using the same one local control signal. The so-called "same position" means the position of the logically-corresponding power semiconductor switch in respective power converters 701 (or 7011' or 7012') of the same topology structure in the circuit diagram. For example, in the power converters 701 of the same topology in FIGS. 6-15, the power semiconductor switches $Q_{11}, Q_{21} \ldots Q_{M1}$ have the same position, $Q_{12}, Q_{22} \ldots Q_{M2}$ have the same position, and so on, till $Q_{18}, Q_{28} \ldots Q_{M8}$ have the same position. Therefore, all the M power converters 701 in each power unit 70 in FIG. 8 to FIG. 15 may employ "shared driving". Based on the same principle, the power converters 7011' in each of the power units 70 in FIG. 15 have the same topology, and thus these power converters 7011' may employ "shared driving", while the power converters 7012' in each of the power units 70 have the same topology, and thus these power converters 7012' may employ "shared driving".

By adopting a driving mode of "shared driving" of the present disclosure, the number of local control signals may be greatly reduced, and the circuit design of the local control may be simplified. FIG. 16 to FIG. 23 will further describe the driving mode of "shared driving" of the present disclosure.

Figure 16:
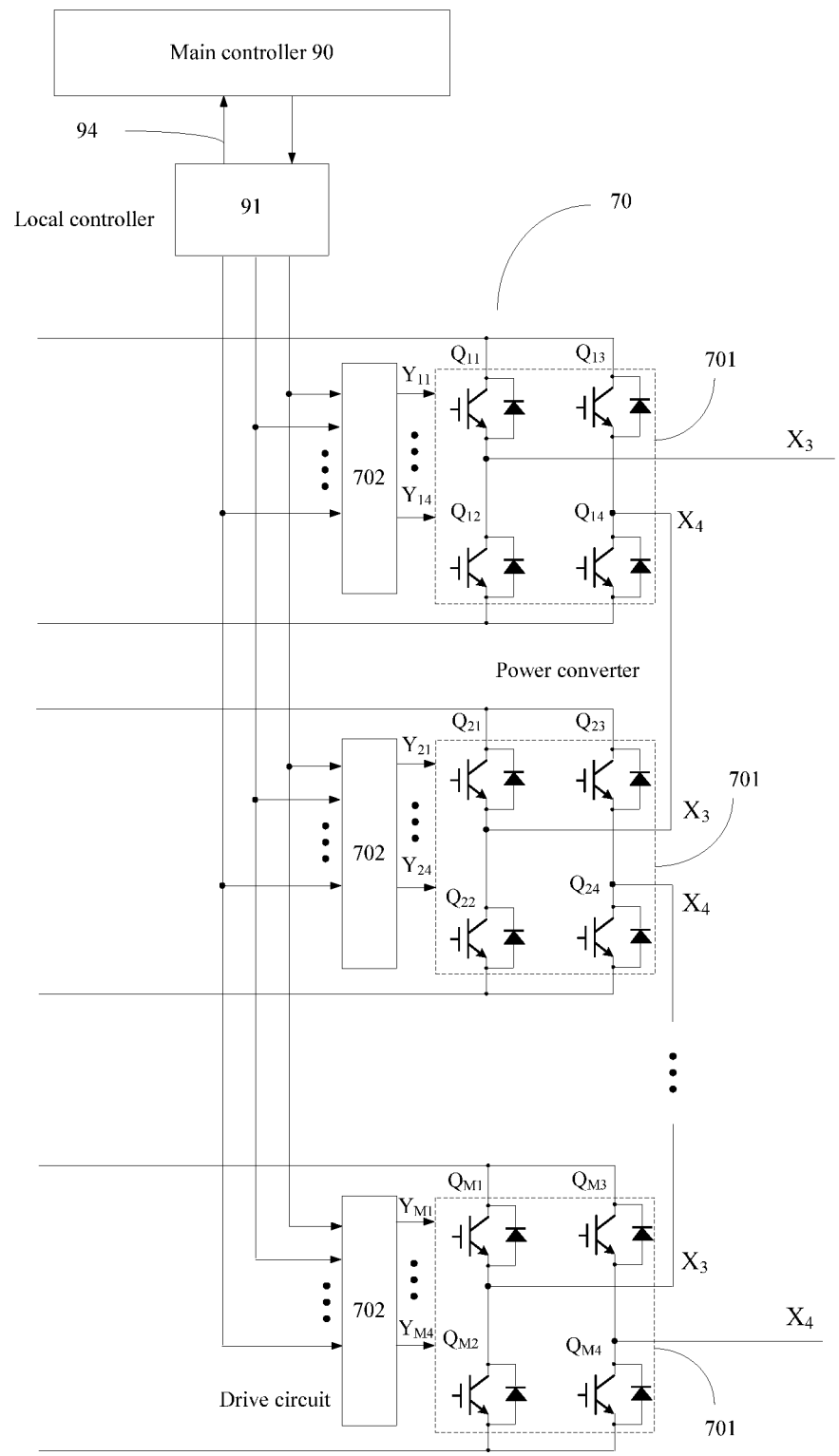
FIG. 16 is a block diagram of a modular power supply system in accordance with another embodiment of the present disclosure.

FIG. 16 is a block diagram of a modular power supply system in accordance with another embodiment of the present disclosure. FIG. 16 is based on FIG. 8 and corresponds to an illustration of one power unit 70 in FIG. 8. As shown in FIG. 16, the topology structure of all power converters 701 of the same power unit 70 are a full-bridge converter, such as an H-bridge circuit. Taking the M-th H-bridge circuit as an example, the H-bridge circuit includes two bridge arms. For example, one bridge arm of the M-th H-bridge circuit includes an upper power semiconductor switch $Q_{M1}$ and a lower power semiconductor switch $Q_{M2}$, and the other bridge arm includes an upper power semiconductor switch $Q_{M3}$ and a lower power semiconductor switch $Q_{M4}$. A connection point of the upper power semiconductor switch $Q_{M3}$ and the lower power semiconductor switch $Q_{M2}$ is a third output end $X_3$ of the M-th power converter 701. A connection point of the upper power semiconductor switch $Q_{M3}$ and the lower power semiconductor switch $Q_{M4}$ is a fourth end $X_4$ of the M-th power converter 701.

In the present embodiment, the third output end $X_3$ of one of adjacent two power converters 701 is sequentially connected to the fourth output end $X_4$ of the other one of the adjacent two power converters 701. Specifically, the third output end $X_3$ of the first H-bridge circuit (i.e., the first power converter 701) is connected to the first end $X_1$ of the power unit 70, the fourth output end $X_4$ of the first H-bridge circuit is connected to the third output end $X_3$ of the second H-bridge circuit, and so on, the fourth output end $X_4$ of the (M−1)-th H-bridge circuit is connected to the third output end $X_3$ of the M-th H-bridge circuit, and the fourth output end $X_4$ of the M-th H-bridge circuit is connected to the second end $X_2$ of the power unit 70.

In the present embodiment, the local controller 91 outputs four local control signals. Each H-bridge circuit corresponds to one drive circuit 702. Each of the drive circuits 702 is coupled to the local controller 91, and is connected to the control ends of the corresponding upper power semiconductor switches and lower power semiconductor switches, for receiving the above four local control signals output by the local controller 91 and processing the local control signals to generate respective four driving signals. For example, the generated four driving signals $Y_{M1}, Y_{M2}, Y_{M3}$, and $Y_{M4}$ are output to the control ends of the upper power semiconductor switches $Q_{M1}$ and $Q_{M3}$ and the lower power semiconductor switches $Q_{M2}$ and $Q_{M4}$ of the M-th H-bridge circuit, for controlling turn-on and turn-off of the upper power semiconductor switches $Q_{M1}$ and $Q_{M3}$ and the lower power semiconductor switches $Q_{M2}$ and $Q_{M4}$.

In this embodiment, the local control signals corresponding to the power semiconductor switches of the same position of all H-bridge circuits are the same one. For example, the local control signals corresponding to the upper power semiconductor switch $Q_{11}$ of the first H-bridge circuit, the upper power semiconductor switch $Q_{21}$ of the second H-bridge circuits, and so on, till the upper power semiconductor switch $Q_{M1}$ of the M-th H-bridge circuit are the same one. That is, the corresponding driving signals Y11, Y21 . . . YM1 output by the drive circuit 702 are the same, so that the upper power semiconductor switches $Q_{11}$, $Q_{21} \ldots Q_{M1}$ are simultaneously turned on and off. Since the topology structure of each power converter 701 in the power unit 70 in this embodiment uses an H-bridge circuit, one power unit 70 only requires a set of local controller 91, optical fiber 94 and auxiliary power supply 93. In this embodiment, the power semiconductor switches at the same position of each H-bridge circuit use the same local control signal, so that only four local control signals are required in one power unit 70.

Figure 17:
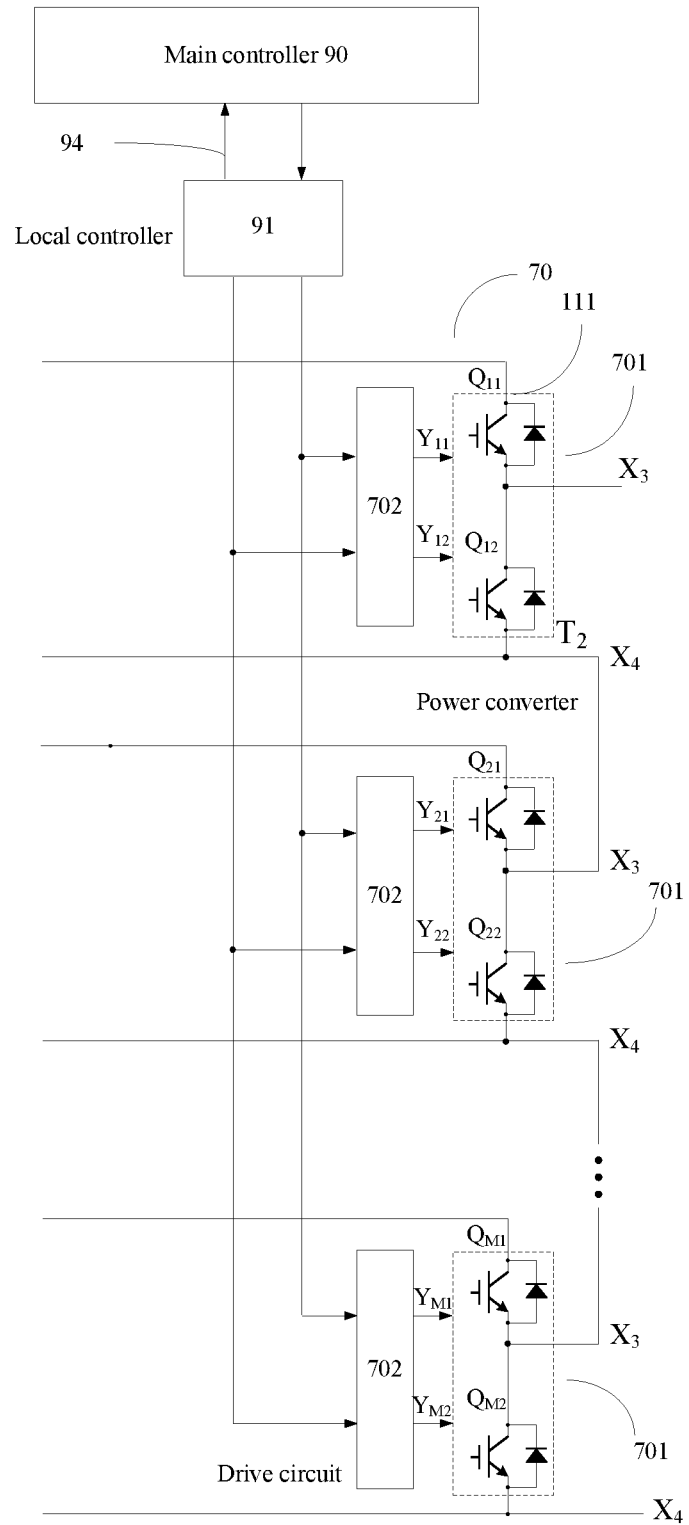
FIG. 17 is a block diagram of a modular power supply system in accordance with another embodiment of the present disclosure.

FIG. 17 is a block diagram of a modular power supply system in accordance with another embodiment of the present disclosure. FIG. 17 is based on FIG. 9 and corresponds to an illustration of one power unit 70 in FIG. 9. As shown in FIG. 17, the topology structure of each power converter 701 of the same power unit 70 is a half-bridge converter. Taking the M-th half-bridge converter as an example, the half-bridge converter includes one bridge arms 111. For example, the bridge arm 111 of the M-th half-bridge converter includes an upper power semiconductor switch $Q_{M1}$ and a lower power semiconductor switch $Q_{M2}$. A connection point of the upper power semiconductor switch $Q_{M1}$ and one end of the lower power semiconductor switch $Q_{M2}$ is a third output end $X_3$ of the M-th power converter 701. The other end of the lower power semiconductor switch $Q_{M2}$ is a fourth output end $X_4$ of the M-th power converter 701.

In the present embodiment, the third output end $X_3$ of one of adjacent two power converters 701 is sequentially connected to the fourth output end $X_4$ of the other one of the adjacent two power converters 701. Specifically, the third output end $X_3$ of the first half-bridge converter (i.e., the first power converter 701) is connected to the first end $X_1$ of the power unit 70, the fourth output end $X_4$ of the first half-bridge converter is connected to the third output end $X_3$ of the second half-bridge converter, and so on, the fourth output end $X_4$ of the (M−1)-th half-bridge converter is connected to the third output end $X_3$ of the M-th half-bridge converter, and the fourth output end $X_4$ of the M-th half-bridge converter is connected to the second end $X_1$ of the power unit 70.

In the present embodiment, the local controller 91 outputs two local control signals. Each half-bridge converter corresponds to one drive circuit 702. Each of the drive circuits 702 is coupled to the local controller 91, and is connected to the control ends of the corresponding upper power semiconductor switch and the lower power semiconductor switch for receiving the above two local control signals output by the local controller 91 and processing the local control signals to generate respective two driving signals. For example, the generated two driving signals $Y_{M1}$ and $Y_{M2}$ are output to the control ends of the upper power semiconductor switch $Q_{M1}$ and the lower power semiconductor switch $Q_{M2}$ of the M-th half-bridge converter, for controlling turn-on and turn-off of the upper power semiconductor switch $Q_{M1}$ and the lower power semiconductor switch $Q_{M2}$.

In this embodiment, the local control signals corresponding to the power semiconductor switches of the same position of all half-bridge converters are the same one, that is, the local control signals are the same one. For example, the local control signals corresponding to the upper power semiconductor switch $Q_{11}$ of the first half-bridge converter, the upper power semiconductor switch $Q_{21}$ of the second half-bridge converters, and so on, till the upper power semiconductor switch $Q_{M1}$ of the M-th half-bridge converter are the same one. That is, the corresponding driving signals $Y_{11}, Y_{21} \ldots Y_{M1}$ output by the drive circuit 702 are the same, so that the upper power semiconductor switches $Q_{11}$, $Q_{21} \ldots Q_{M1}$ are simultaneously turned on and off Since the topology structure of each power converter 701 in the power unit 70 in this embodiment uses a half-bridge converter, one power unit 70 only requires a set of local controller 91, optical fiber 94 and auxiliary power supply 93. In this embodiment, the power semiconductor switches at the same position of each half-bridge converter use the same local control signal, so that only two local control signals are required in one power unit 70.

Figure 18:
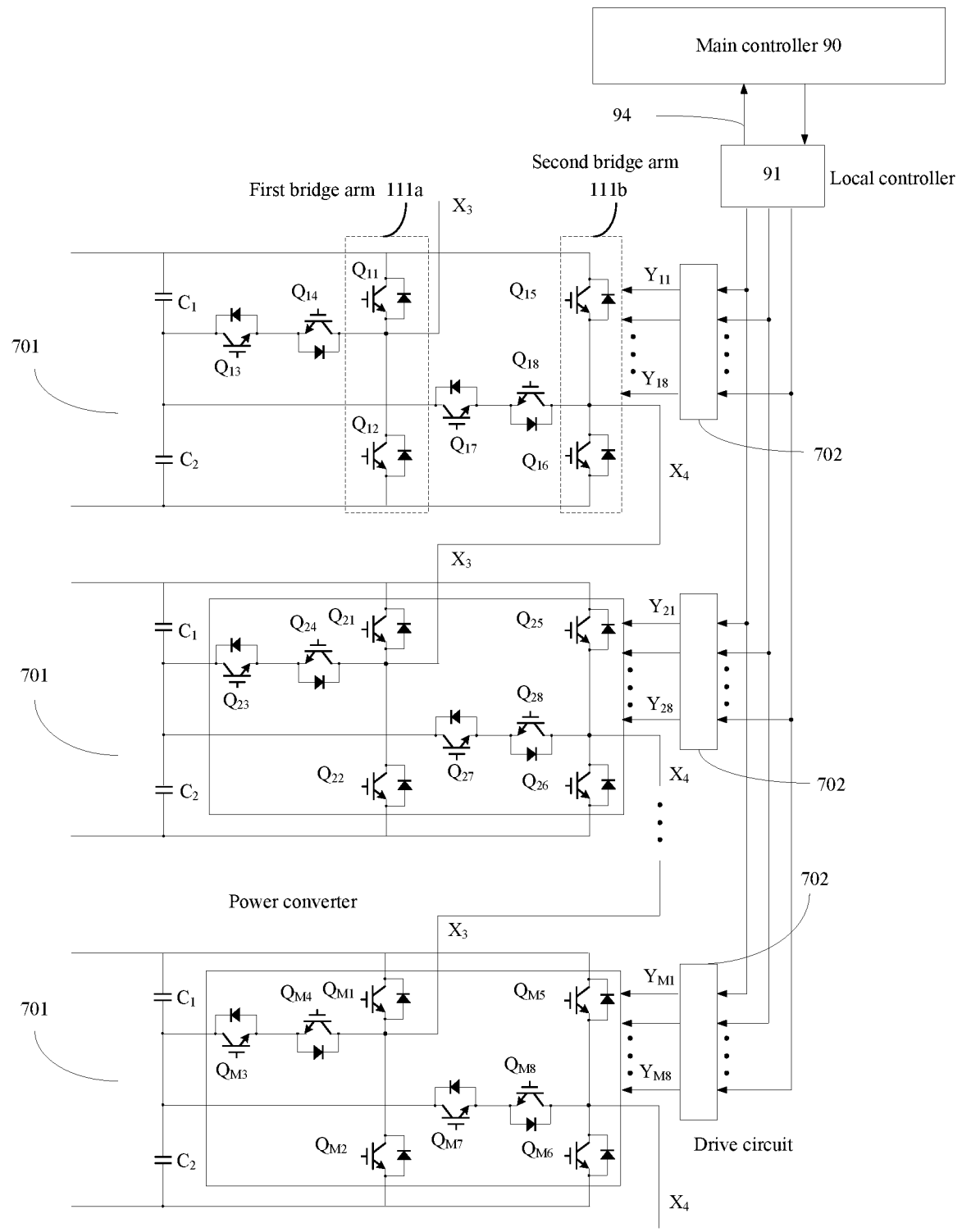
FIG. 18 is a block diagram of a modular power supply system in accordance with another embodiment of the present disclosure.

FIG. 18 is a block diagram of a modular power supply system in accordance with another embodiment of the present disclosure. FIG. 18 is based on FIG. 10 and corresponds to an illustration of one power unit 70 in FIG. 10. As shown in FIG. 18, the topology structure of each power converter 701 of the same power unit 70 is a neutral point clamped three-level converter. Taking the first neutral point clamped three-level converter (i.e., the first power converter 701) as an example, the neutral point clamped three-level converter includes a first bridge arm 111a and a second bridge arm 111b. Each of the first bridge arm 111a and the second bridge arm 111b includes an upper power semiconductor switch (such as $Q_{11}$, $Q_{15}$) and a lower power semiconductor switch (such as $Q_{12}$, $Q_{16}$). The neutral point clamped three-level converter further includes a first DC bus capacitor $C_1$, a second DC bus capacitor $C_2$, a first switch group (such as $Q_{13}$, $Q_{14}$) and a second switch group (such as $Q_{17}$, $Q_{18}$). The first DC bus capacitor $C_1$ and the second DC bus capacitor $C_2$ are connected in series and then connected in parallel with the first bridge arm 111a and the second bridge arm 111b. A connection point of the upper power semiconductor switch $Q_{11}$ and the lower power semiconductor switch $Q_2$ of the first bridge arm 111a is a third output end $X_3$ of the first power converter 701. A connection point of the upper power semiconductor switch $Q_{15}$ and the lower power semiconductor switch $Q_{16}$ of the second bridge arm Ill b is a fourth output end $X_4$ of the first power converter 701. The first switch group (such as $Q_{13}$, $Q_{14}$) is connected between the connection point of the upper power semiconductor switch $Q_{11}$ and the lower power semiconductor switch $Q_{12}$ of the first bridge arm 111a and the connection point of the first DC bus capacitor $C_1$ and the second DC bus capacitor $C_2$. The second switch group (such as $Q_{17}$, $Q_{18}$) is connected between the connection point of the upper power semiconductor switch $Q_{15}$ and the lower power semiconductor switch $Q_{16}$ of the second bridge arm 111b and the connection point of the first DC bus capacitor $C_1$ and the second DC bus capacitor $C_2$. In this embodiment, each of the first switch group and the second switch group is formed by connecting two power semiconductor switches in series. For example, the two power semiconductor switches may be bidirectional controllable switches.

In the present embodiment, the third output end $X_3$ of one of adjacent two power converters 701 is sequentially connected to the fourth output end $X_4$ of the other one of the adjacent two power converters 701. Specifically, the third output end $X_3$ of the first neutral point clamped three-level converter is connected to the first end $X_1$ of the power unit 70, the fourth output end $X_4$ of the first neutral point clamped three-level converter is connected to the third output end $X_3$ of the second neutral point clamped three-level converter, and so on, the fourth output end $X_4$ of the (M-1)-th neutral point clamped three-level converter is connected to the third output end $X_3$ of the M-th neutral point clamped three-level converter, and the fourth output end $X_4$ of the M-th neutral point clamped three-level converter is connected to the second end $X_2$ of the power unit 70.

In this embodiment, the local controller 91 outputs eight local control signals, each of which is used to control one of the corresponding upper power semiconductor switch (such as $Q_{11}$, $Q_{15}$), lower power semiconductor switch (such as $Q_{12}$, $Q_{16}$), first switch group (such as $Q_{13}$, $Q_{14}$) and second switch group (such as $Q_{17}$, $Q_{18}$). The local control signals corresponding to the power semiconductor switches of the same position of all neutral point controllable three-level converters are the same one, that is, the local control signals are the same one. Taking the first power semiconductor switch of the neutral point clamped three-level converter in the power unit as an example, the local control signals corresponding to the first power semiconductor switch $Q_{11}$ of the first neutral point clamped three-level converter, the first power semiconductor switch $Q_{21}$ of the second neutral point clamped three-level converter, and so on, till the first power semiconductor switch $Q_{M1}$ of the M-th neutral point clamped three-level converter are the same one, that is, the local control signals are the same one. That is, corresponding driving signals $Y_{11}, Y_{21} \ldots Y_{M1}$ output by the drive circuit 702 are the same, so that the first power semiconductor switches $Q_{11}, Q_{21} \ldots Q_{M1}$, are simultaneously turned on and off. Since the topology structure of each power converter 701 in the power unit 70 in this embodiment uses a neutral point clamped three-level converter, one power unit 70 only requires a set of local controller 91, optical fiber 94 and auxiliary power supply 93. In this embodiment, the power semiconductor switches at the same position of each neutral point clamped three-level converter use the same local control signal, so that one power unit 70 only needs eight local control signals.

Figure 19:
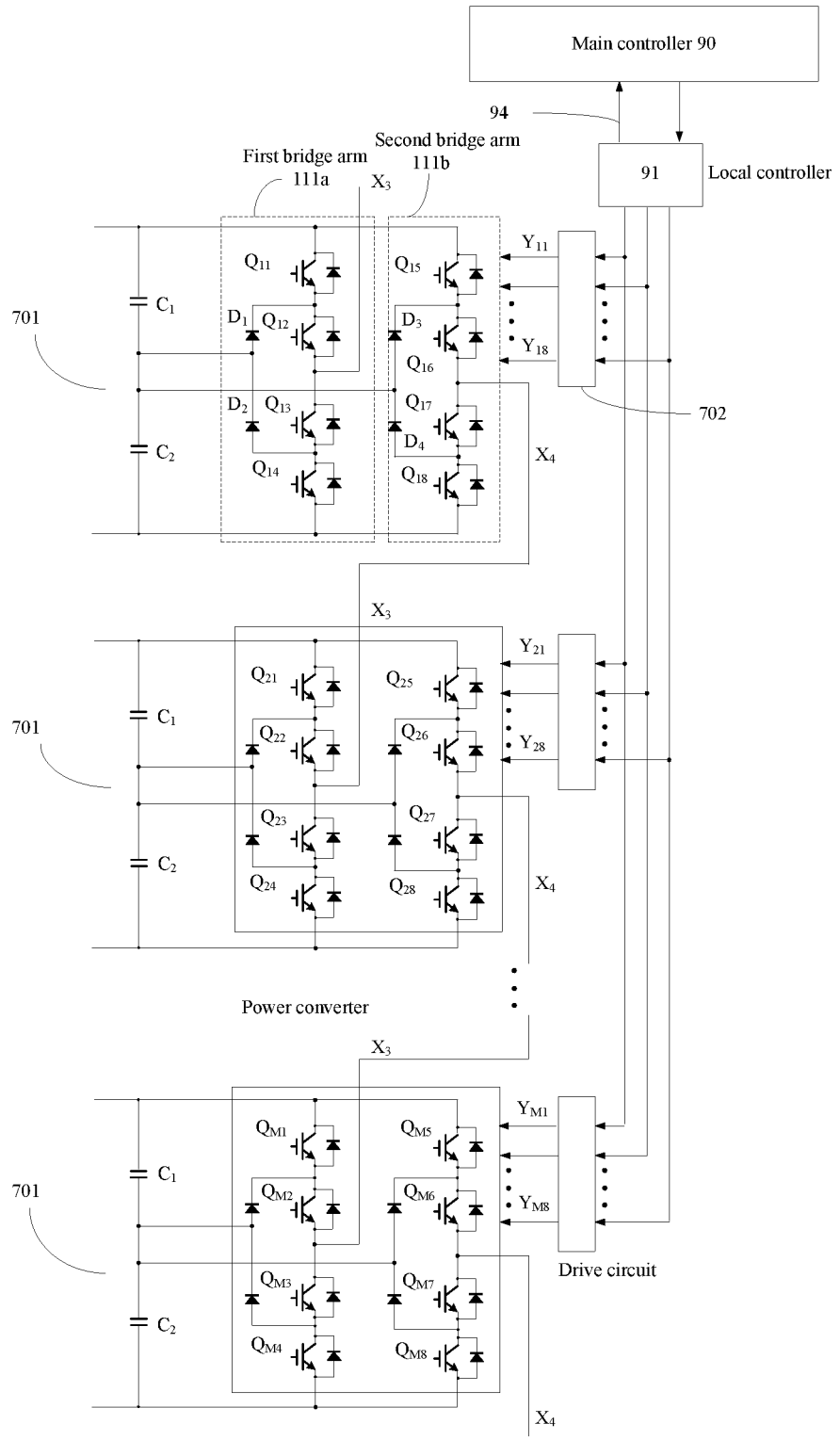
FIG. 19 is a block diagram of a modular power supply system in accordance with another embodiment of the present disclosure.

FIG. 19 is a block diagram of a modular power supply system in accordance with another embodiment of the present disclosure. FIG. 19 is based on FIG. 11 and corresponds to an illustration of one power unit 70 in FIG. 11. As shown in FIG. 19, the topology structure of each power converter 701 of the same power unit 70 is a diode clamping three-level converter. Taking the first diode clamping three-level converter (i.e., the first power converter 701) as an example, the diode clamping three-level converter includes a first bridge arm 111a and a second bridge arm 111b. Each of the first bridge arm 111a and the second bridge arm 111b includes a first power semiconductor switch (such as $Q_{11}$, $Q_{15}$), a second power semiconductor switch (such as $Q_{12}$, $Q_{16}$), a third power semiconductor switch (such as $Q_{13}$, $Q_{17}$) and a fourth power semiconductor switch (such as $Q_{14}$, $Q_{15}$). The diode clamping three-level converter further includes a first DC bus capacitor $C_1$, a second DC bus capacitor $C_2$, a first diode $D_1$, a second diode $D_2$, a third diode $D_3$ and a fourth diode $D_4$. The first DC bus capacitor $C_1$ and the second DC bus capacitor $C_2$ are connected in series and then connected in parallel with the first bridge arm 111a and the second bridge arm 111b. The first power semiconductor switch $Q_{11}$, the second power semiconductor switch $Q_{12}$, the third power semiconductor switch $Q_{13}$, and the fourth power semiconductor switch $Q_{14}$ of the first bridge arm 111a are connected in series. A connection point of the second power semiconductor switch $Q_{12}$ and the third power semiconductor switch $Q_{13}$ is a third output end $X_3$ of the power converter 701. The first power semiconductor switch $Q_{15}$, the second power semiconductor switch $Q_{16}$, the third power semiconductor switch $Q_{17}$ and the fourth power semiconductor switch $Q_{18}$ of the second bridge arm 111b are connected in series. A connection point of the second power semiconductor switch $Q_{16}$ and the third power semiconductor switch $Q_{17}$ is a fourth output end $X_4$ of the power converter 701. The first diode $D_1$ and the second diode $D_2$ are connected in series and then connected between the connection point of the first power semiconductor switch $Q_{11}$ and the second power semiconductor switch $Q_{12}$ of the first bridge arm 111a and the connection point of the third power semiconductor switch $Q_{13}$ and the fourth power semiconductor switch $Q_{14}$ of the first bridge arm 111a. The third diode $D_3$ and the fourth diode $D_4$ are connected in series and then connected between the connection point of the first power semiconductor switch $Q_{16}$ and the second power semiconductor switch $Q_{17}$ of the second bridge arm 111b and the connection point of the third power semiconductor switch $Q_{17}$ and the fourth power semiconductor switch $Q_{18}$ of the second bridge arm 111b. A connection point of the first diode $D_1$ and the second diode $D_2$ is connected to a connection point of the first DC bus capacitor $C_1$ and the second DC bus capacitor $C_2$. A connection point of the third diode $D_3$ and the fourth diode $D_4$ is connected to the connection point of the first DC bus capacitor $C_1$ and the second DC bus capacitor $C_2$ as well. In this embodiment, the first diode $D_1$ and the second diode $D_2$ function as clamping diodes, and the first power semiconductor switch, the second power semiconductor switch, the third power semiconductor switch and the fourth power semiconductor switch are IGBTs or IGCTs.

In the present embodiment, the third output end $X_3$ of one of adjacent two power converters 701 is sequentially connected to the fourth output end $X_4$ of the other one of the adjacent two power converters 701. Specifically, the third output end $X_3$ of the first diode clamping three-level converter is connected to the first end $X_1$ of the power unit 70, the fourth output end $X_4$ of the first diode clamping three-level converter is connected to the third output end $X_3$ of the second diode clamping three-level converter, and so on, the fourth output end $X_4$ of the (M−1)-th diode clamping three-level converter is connected to the third output end $X_3$ of the M-th diode clamping three-level converter, and the fourth output end $X_4$ of the M-th diode clamping three-level converter is connected to the second end $X_2$ of the power unit 70.

In this embodiment, the local controller 91 outputs eight local control signals, each of which is used to control one of the corresponding first power semiconductor switch (such as $Q_{11}$, $Q_{15}$), second power semiconductor switch (such as $Q_{12}$, $Q_{16}$), third power semiconductor switch (such as $Q_{13}$, $Q_{17}$) and fourth power semiconductor switch (such as $Q_{14}$, $Q_{18}$). The local control signals corresponding to the power semiconductor switches of the same position of all diode clamping three-level converters are the same one. For example, taking the first power semiconductor switch of the diode clamping three-level converter in the power unit as an example, the local control signals corresponding to the first power semiconductor switch $Q_{11}$ of the first diode clamping three-level converter, the first power semiconductor switch $Q_{21}$ of the second diode clamping three-level converter, and so on, till the first power semiconductor switch $Q_{M1}$ of the M-th diode clamping three-level converter are the same one, that is, the local control signals are the same one. That is, corresponding driving signals $Y_{11}, Y_{21} \ldots Y_{M1}$ output by the drive circuit 702 are the same, so that the first power semiconductor switches $Q_{11}, Q_{21} \ldots Q_{M1}$ are simultaneously turned on and off. Since the topology structure of each power converter 701 in the power unit 70 in this embodiment uses a diode clamping three-level converter, one power unit 70 only requires a set of local controller 91, optical fiber 94 and auxiliary power supply 93. In this embodiment, the power semiconductor switches at the same position of each diode clamping three-level converter use the same local control signal, so that one power unit 70 only needs eight local control signals.

Figure 20:
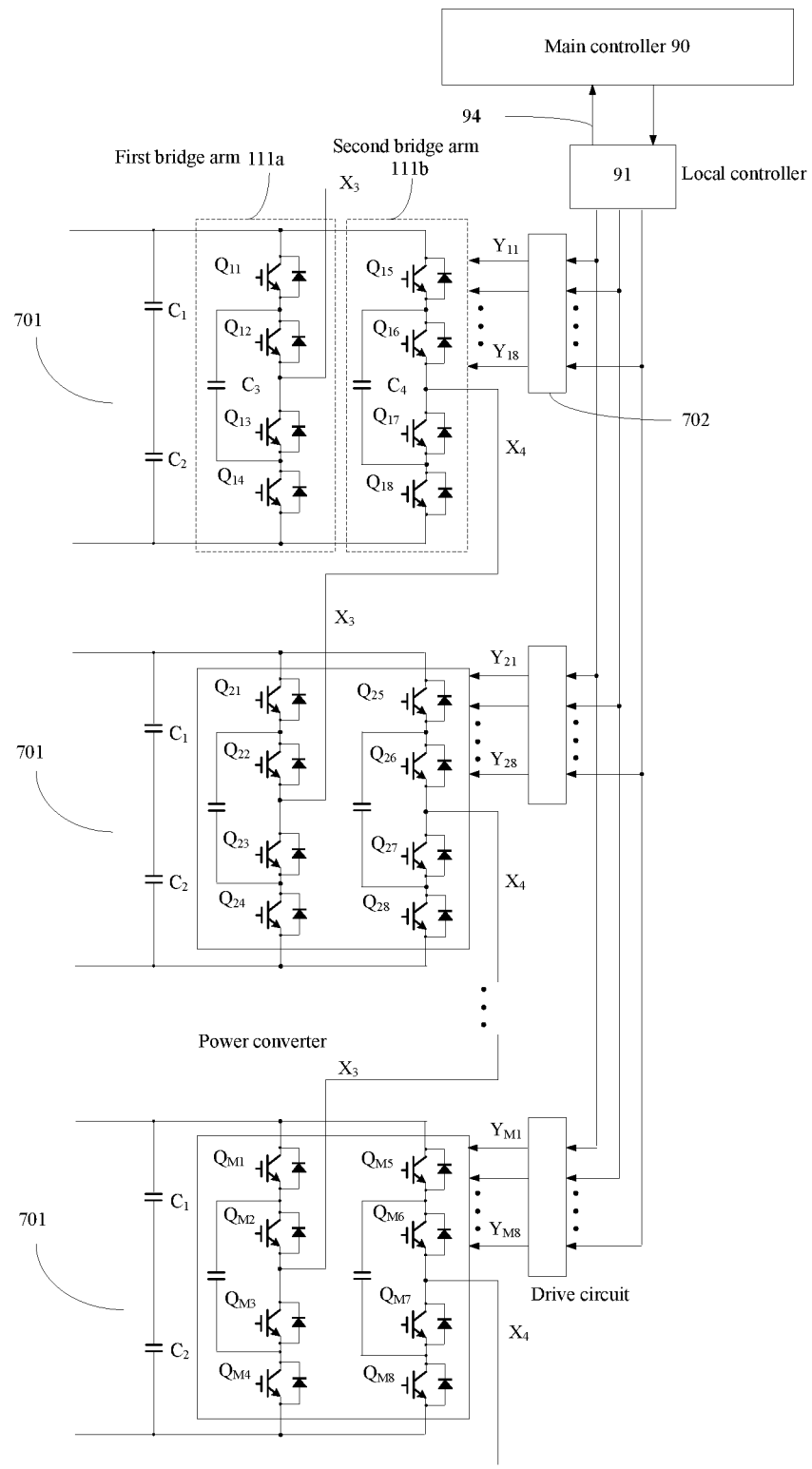
FIG. 20 is a block diagram of a modular power supply system in accordance with another embodiment of the present disclosure.

FIG. 20 is a block diagram of a modular power supply system in accordance with another embodiment of the present disclosure. FIG. 20 is based on FIG. 12 and corresponds to an illustration of one power unit 70 in FIG. 12. As shown in FIG. 20, the topology structure of each power converter 701 of the same power unit 70 is a flying capacitor three-level converter. Taking the first flying capacitor three-level converter as an example, the flying capacitor three-level converter includes a first bridge arm 111a and a second bridge arm 111b. Each of the first bridge arm 111a and the second bridge arm 111b includes a first power semiconductor switch (such as $Q_{11}$, $Q_{15}$), a second power semiconductor switch (such as $Q_{12}$, $Q_{16}$), a third power semiconductor switch (such as $Q_{13}$, $Q_{17}$) and a fourth power semiconductor switch (such as $Q_{14}$, $Q_{18}$). The flying capacitor three-level converter further includes a first DC bus capacitor $C_1$ a second DC bus capacitor $C_2$, a first capacitor $C_3$ and a second capacitor $C_4$. The first DC bus capacitor $C_1$ and the second DC bus capacitor $C_2$ are connected in series and then connected in parallel with the first bridge arm 111a and the second bridge arm 111b. The first power semiconductor switch $Q_{11}$, the second power semiconductor switch $Q_{12}$, the third power semiconductor switch $Q_{13}$ and the fourth power semiconductor switch $Q_{14}$ of the first bridge arm 111a are connected in series. A connection point of the second power semiconductor switch $Q_{12}$ and the third power semiconductor switch $Q_{13}$ is a third output end $X_3$ of the power converter 701. The first power semiconductor switch $Q_{15}$, the second power semiconductor switch $Q_{16}$, the third power semiconductor switch $Q_{17}$ and the fourth power semiconductor switch $Q_{18}$ of the second bridge arm 111b are connected in series. A connection point of the second power semiconductor switch $Q_{16}$ and the third power semiconductor switch $Q_{17}$ is a fourth output end $X_4$ of the power converter 701. The first capacitor $C_3$ is connected between the connection point of the first power semiconductor switch $Q_{11}$ and the second power semiconductor switch $Q_{12}$ of the first bridge arm 11a and the connection point of the third power semiconductor switch $Q_{13}$ and the fourth power semiconductor switch $Q_{14}$ of the first bridge arm 111a. The second capacitor $C_4$ is connected between the connection point of the first power semiconductor switch $Q_{15}$ and the second power semiconductor switch $Q_{16}$ of the second bridge arm 111b and the connection point of the third power semiconductor switch $Q_{17}$, and the fourth power semiconductor switch $Q_{18}$ of the second bridge arm 111b.

In the present embodiment, the third output end $X_3$ of one of adjacent two power converters 701 is sequentially connected to the fourth output end $X_4$ of the other one of the adjacent two power converters 701. Specifically, the third output end $X_3$ of the first flying capacitor three-level converter (i.e., the first power converter 701) is connected to the first end $X_1$ of the power unit 70, the fourth output end $X_4$ of the first flying capacitor three-level converter is connected to the third output end $X_3$ of the second flying capacitor three-level converter, and so on, the fourth output end $X_4$ of the (M−1)-th flying capacitor three-level converter is connected to the third output end $X_3$ of the M-th flying capacitor three-level converter, and the fourth output end $X_4$ of the M-th flying capacitor three-level converter is connected to the second end $X_2$ of the power unit 70.

In this embodiment, the local controller 91 outputs eight local control signals, each of which is used to control one of the corresponding first power semiconductor switch (such as $Q_{11}, Q_{18}$), second power semiconductor switch (such as $Q_{12}, Q_{16}$), third power semiconductor switch (such as $Q_{13}, Q_{17}$) and fourth power semiconductor switch (such as $Q_{14}, Q_{18}$). The local control signals corresponding to the power semiconductor switches of the same position of all flying capacitor three-level converters are the same one. For example, taking the first power semiconductor switch of the flying capacitor three-level converter in the power unit as an example, the local control signals corresponding to the first power semiconductor switch $Q_{11}$ of the first flying capacitor three-level converter, the first power semiconductor switch $Q_{21}$ of the second flying capacitor three-level converter, and so on, till the first power semiconductor switch $Q_{M1}$ of the M-th flying capacitor three-level converter are the same one. That is, corresponding driving signals $Y_{11}, Y_{21} \ldots Y_{M1}$ output by the drive circuit 702 are the same, so that the first power semiconductor switches $Q_{11}, Q_{21} \ldots Q_{M1}$ are simultaneously turned on and off. Since the topology structure of each power converter 701 in the power unit 70 in this embodiment uses a flying capacitor three-level converter, one power unit 70 only requires a set of local controller 91, optical fiber 94 and auxiliary power supply 93. In this embodiment, the power semiconductor switches at the same position of each flying capacitor three-level converter use the same local control signal, so that one power unit 70 only needs eight local control signals.

Figure 21:
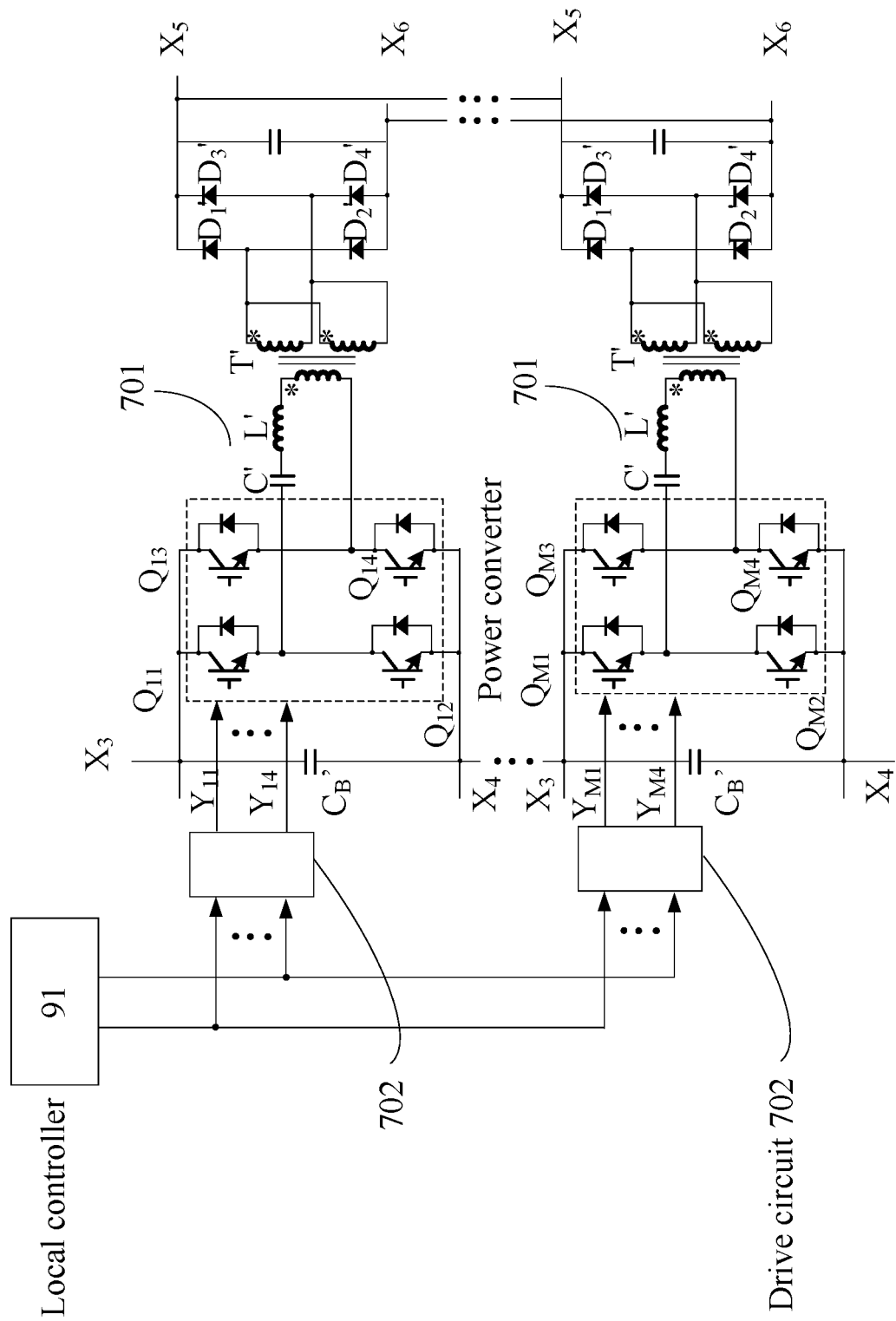
FIG. 21 is a block diagram of a modular power supply system in accordance with another embodiment of the present disclosure.

FIG. 21 is a block diagram of a modular power supply system in accordance with another embodiment of the present disclosure. FIG. 21 is based on FIG. 13 and corresponds to an illustration of one power unit 70 in FIG. 13. As shown in FIG. 21, the topology structure of each power converter 701 in the same power unit 70 employs a full-bridge resonant converter. The full-bridge resonant converter 701 includes a full-bridge circuit, a resonant circuit, a transformer and a rectifier bridge, the connection relationship of which is as shown in FIG. 21. Taking the first full-bridge resonant converter 701 as an example, the full-bridge circuit includes four power semiconductor switches and one DC bus capacitor. One end of the power semiconductor switch $Q_{11}$ is connected to one end of the DC bus capacitor $C_B'$ and one end of the power semiconductor switch $Q_{13}$, the other end of the power semiconductor switch $Q_{11}$ is connected to one end of the power semiconductor switch $Q_{12}$, the other end of the power semiconductor switch $Q_{13}$ is connected to one end of the power semiconductor switch $Q_{14}$, and the other end of the power semiconductor switch $Q_{12}$ is connected to the other end of the DC bus capacitor $C_B'$ and the other end of the power semiconductor switch $Q_{14}$. A connection point of the power semiconductor switch $Q_{11}$ and the power semiconductor switch $Q_{12}$ is connected to one end of a resonant circuit formed by a capacitor C' and an inductor L', and the other end of the resonant circuit is connected to one end of a primary winding of the transformer T', and the other end of the primary winding of the transformer T' is connected to a connection point of the power semiconductor switch $Q_{13}$ and the power semiconductor switch $Q_{14}$. One end of the DC bus capacitor $C_B'$ is the third end $X_3$ of the first power converter, and the other end of the DC bus capacitor $C_B'$ is the fourth end $X_4$ of the first power converter. The rectifier bridge includes four rectifier diodes, one end of the rectifier diode $D_1'$ is connected to one end of the rectifier diode $D_3'$, the other end of the rectifier diode $D_1'$ is connected to one end of the rectifier diode $D_2'$, the other end of the rectifier diode $D_3'$ is connected to one end of the rectifier diode $D_4'$, and the other end of the rectifier diode $D_2'$ is connected to the other end of the rectifier diode $D_4'$. The said one end of the rectifier diode $D_1'$ is the fifth end $X_5$ of the converter T', and the said the other end of the rectifier diode $D_2'$ is the sixth end $X_6$ of the converter. The output end of the transformer is respectively connected to the connection point of the rectifier diode $D_1'$ and the rectifier diode $D_2'$ and the connection point of the rectifier diode $D_3'$ and the rectifier diode $D_4'$. The transformer T' may be a center tap transformer having two secondary windings connected in parallel, or the transformer T' may have one single secondary winding.

In the present embodiment, the third end $X_3$ of the first full-bridge resonant converter in each power unit 70 is connected to the first end $X_1$ of the power unit 70, the fourth end $X_4$ of first full-bridge resonant converter (i.e. the first power converter 701) is connected to the third end $X_3$ of the second full-bridge resonant converter, and so on, the fourth end $X_4$ of the (M−1)-th full bridge resonant converter is connected to the third end $X_3$ of the M-th full-bridge resonant converter, and the fourth end $X_4$ of the M-th full-bridge resonant converter is connected to the second end $X_2$ of the power unit 70. The fifth ends X. of all bridge resonant converters in each power unit 70 are connected together, and the sixth ends $X_6$ of each full-bridge resonant converter are connected together.

In this embodiment, the local control signals corresponding to the power semiconductor switches of the same position of the full-bridge circuit in all full-bridge resonant converters are the same one, that is, the local control signals are the same one. For example, the local control signals corresponding to the power semiconductor switch $Q_{11}$ of the first full bridge circuit, the power semiconductor switch $Q_{21}$ of the second full-bridge circuit, and so on, till the power semiconductor switch $Q_{M1}$ of the M-th full-bridge circuit are the same one, that is, the local control signals are the same one. That is, the corresponding driving signals $Y_{11}, Y_{21} \ldots Y_{M1}$ output by the drive circuit 702 are the same, so that the upper power semiconductor switches $Q_{11}, Q_{21} \ldots Q_{M1}$ are simultaneously turned on and off. Since the topology structure of each power converter 701 in the power unit 70 in this embodiment uses a full-bridge resonant converter, one power unit 70 only requires a set of local controller 91, optical fiber 94 and auxiliary power supply 93. In this embodiment, the power semiconductor switches at the same position of the full-bridge resonant converters use the same local control signal, so that one power unit 70 only needs four local control signals.

Figure 22:
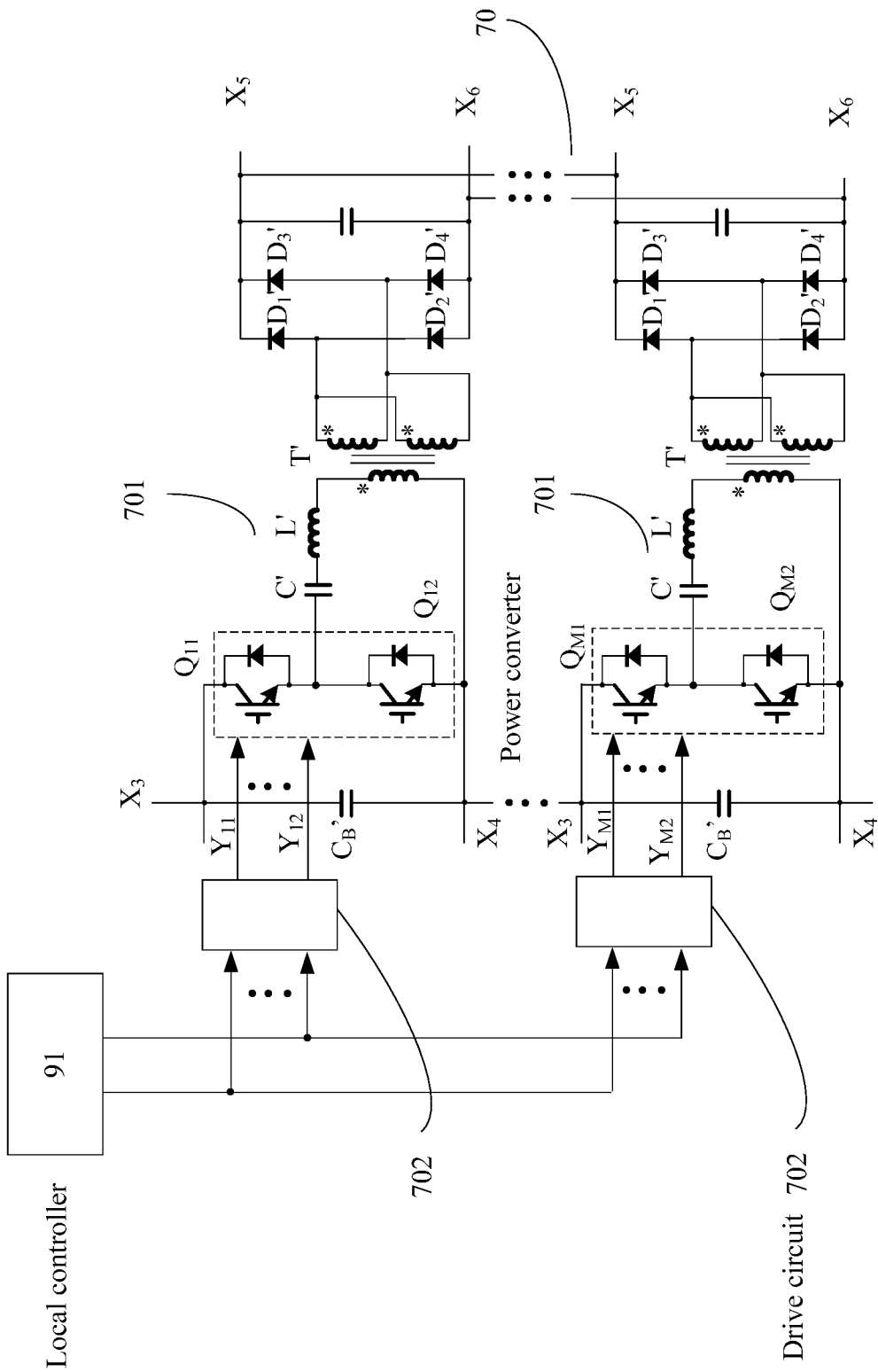
FIG. 22 is a block diagram of a modular power supply system in accordance with another embodiment of the present disclosure.

FIG. 22 is a block diagram of a modular power supply system in accordance with another embodiment of the present disclosure. FIG. 22 is based on FIG. 14 and corresponds to an illustration of one power unit 70 in FIG. 14. As shown in FIG. 22, the topology structure of each power converter 701 in the same power unit 70 employs a half-bridge resonant converter. The half-bridge resonant converters 701 includes a half-bridge circuit, a resonant circuit, a transformer and a rectifier bridge, the connection relationship of which is as shown in FIG. 22. Taking the first half-bridge resonant converter 701 as an example, the half-bridge circuit includes two power semiconductor switches and one DC bus capacitor. One end of the power semiconductor switch $Q_{11}$ is connected to one end of the DC bus capacitor $C_B'$, the other end of the power semiconductor switch $Q_{11}$ is connected to one end of the power semiconductor switch $Q_{12}$, and the other end of the power semiconductor switch $Q_{12}$ is connected to the other end of the DC bus capacitor $C_B'$. A connection point of the power semiconductor switch $Q_{11}$ and the power semiconductor switch $Q_{12}$ is connected to one end of a resonant circuit formed by a capacitor C' and an inductor L', the other end of the resonant circuit is connected to one end of a primary winding of the transformer T', and the other end of the primary winding of the transformer T' is connected to the said the other end of the power semiconductor switch $Q_{12}$. The said one end of the DC bus capacitor $C_B'$ is the third end $X_3$ of the first power converter, and the said the other end of the DC bus capacitor $C_B'$ is the fourth end $X_4$ of the first power converter. The rectifier bridge includes four rectifier diodes, one end of the rectifier diode $D_1'$ is connected to one end of the rectifier diode $D_3'$, the other end of the rectifier diode $D_1'$ is connected to one end of the rectifier diode $D_2'$, the other end of the rectifier diode $D_3'$ is connected to one end of the rectifier diode $D_4'$, and the other end of the rectifier diode $D_2'$ is connected to the other end of the rectifier diode $D_4'$. The said one end of the rectifier diode $D_1'$ is the fifth end $X_5$ of the power converter, and the said the other end of the rectifier diode $D_2'$ is the sixth end $X_6$ of the power converter. The output end of the transformer is respectively connected to the connection point of the rectifier diode $D_1'$ and the rectifier diode $D_2'$ and the connection point of the rectifier diode $D_3'$ and the rectifier diode $D_4'$. The transformer may be a center tap transformer having two secondary windings connected in parallel, or the transformer may have one single secondary winding as well.

In this embodiment, the third end $X_3$ of the first half bridge resonant converter (i.e., the first power converter 701) in each power unit 70 is connected to the first end $X_1$ of the power unit 70, the fourth end $X_4$ of first half bridge resonant converter is connected to the third end $X_3$ of the second half-bridge resonant converter, and so on, the fourth end $X_4$ of the (M−1)-th half-bridge resonant converter is connected to the third end $X_3$ of the M-th half-bridge resonant converter, and the fourth end $X_4$ of the M-th half-bridge resonant converter is connected to the second end $X_2$ of the power unit 70. The fifth ends $X_5$ of all of the half-bridge resonant converters in each power unit 70 are connected together, and the sixth ends $X_6$ of all of the half-bridge resonant converters are connected together.

In this embodiment, the local control signals corresponding to the power semiconductor switches of the same position of the half-bridge circuit in all half-bridge resonant converters are the same one, that is, the local control signals are the same one. For example, the local control signals corresponding to the power semiconductor switch $Q_{11}$ of the first half-bridge circuit, the power semiconductor switch $Q_{21}$ of the second half-bridge circuit, and so on, till the power semiconductor switch $Q_{M1}$ of the M-th half-bridge circuit are the same one. That is, the corresponding driving signals $Y_{11}, Y_{21} \ldots Y_{M1}$ output by the drive circuit 702 are the same, so that the power semiconductor switches $Q_{11}, Q_{21} \ldots Q_{M1}$ are simultaneously turned on and off. Since the topology structure of each power converter 701 in the power unit 70 in this embodiment uses a half-bridge resonant converter, one power unit 70 only requires a set of local controller 91, optical fiber 94 and auxiliary power supply 93. In this embodiment, the power semiconductor switches at the same position of the half-bridge resonant converters use the same local control signal, so that one power unit 70 only needs two local control signals.

Figure 23:
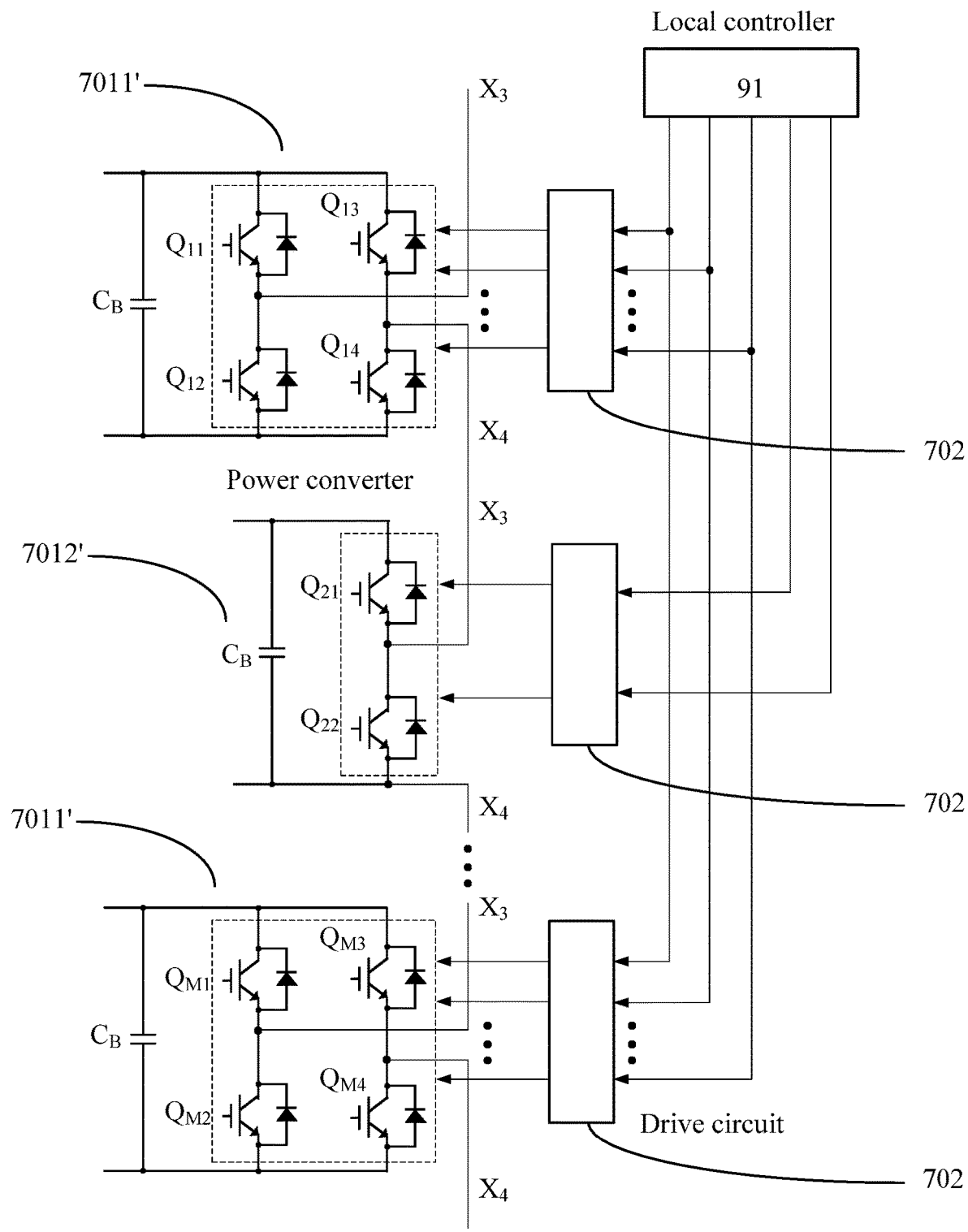
FIG. 23 is a block diagram of a modular power supply system in accordance with another embodiment of the present disclosure.

FIG. 23 is a block diagram of a modular power supply system in accordance with another embodiment of the present disclosure. FIG. 23 is based on FIG. 15 and corresponds to an illustration of one power unit 70 in FIG. 15. As shown in FIG. 23, the topology structures of the M power converters 701 in the same power unit 70 employ a combination of a full-bridge converter and a half-bridge converter, wherein M is a natural number greater than one. The power converter 7011' of the full-bridge converter includes four power semiconductor switches, and the half-bridge converter 7012' includes two power semiconductor switches. In this embodiment, the specific connection relationship of the full-bridge converter is as shown in FIG. 8, and the specific connection relationship of the half-bridge converter is shown in FIG. 9, the details of which are not repeatedly described herein again. Similarly, the fourth end $X_4$ of one of the adjacent two power converters 701 is connected to the third end $X_3$ of the other one of the adjacent two power converters 701. Thus, the third end $X_3$ of the first power converter 701 is connected to the first end $X_1$ of the power unit 70, the fourth end $X_4$ of the first power converter 701 is connected to the third end $X_3$ of the second power converter 701, and so on, the fourth end $X_4$ of the (M−1)-th power converter 701 is connected to the third end $X_3$ of the M-th power converter 701, and the fourth end $X_4$ of the M-th power converter 701 is connected to the second end $X_2$ of the power unit 70.

In this embodiment, the local control signals corresponding to the power semiconductor switches of the same position of all full-bridge converters are the same one. That is, the corresponding driving signals output by the drive circuit are the same, so that the power semiconductor switches at the same position are simultaneously turned on and off. The local control signals corresponding to the power semiconductor switches of the same position of all half-bridge converters are the same one, that is, the local control signals are the same one. That is, the corresponding driving signals output by the drive circuit are the same, so that the power semiconductor switches at the same position are simultaneously turned on and off. Since the topology structures of the M power converters 701 in the power unit 70 in this embodiment employ a combination of a full-bridge converter and a half-bridge converter, one power unit 70 only requires a set of local controller 91, optical fiber 94 and auxiliary power supply 93. In this embodiment, the power semiconductor switches at the same position of respective full-bridge resonant converters use the same local control signal, and the power semiconductor switches at the same position of respective half-bridge resonant converters use the same local control signal, so that one power unit 70 only needs six local control signals.

In other embodiments, the topology structures of the M power converters 701 of each power unit 70 in the modular power supply system use a combination of two or more kinds of full-bridge converters, half-bridge converters, neutral point clamped three-level converters, diode clamping three-level converters, flying capacitor three-level converters, full-bridge resonant converters and half-bridge resonant converters. The local control signals corresponding to the power semiconductor switches of the same position with the same topology structure of the M power converters 701 are the same, that is, the corresponding driving signals output by the drive circuit are the same, so that the power semiconductor switches of the same position are simultaneously turned on and off.

As another embodiment, as shown in FIGS. 6-23, each power unit 70 in the modular power supply system may include: a plurality of drive circuits 702. The number of the drive circuits in the power unit is equal to that of the power semiconductor switches in the power unit. Each of the drive circuits 702 is configured to be connected to a corresponding power semiconductor switch of the corresponding power converter 701, receive a local control signal output by the corresponding local controller 91, to output a driving signal to control the corresponding power semiconductor switch to be turned on and off.

Figure 24:
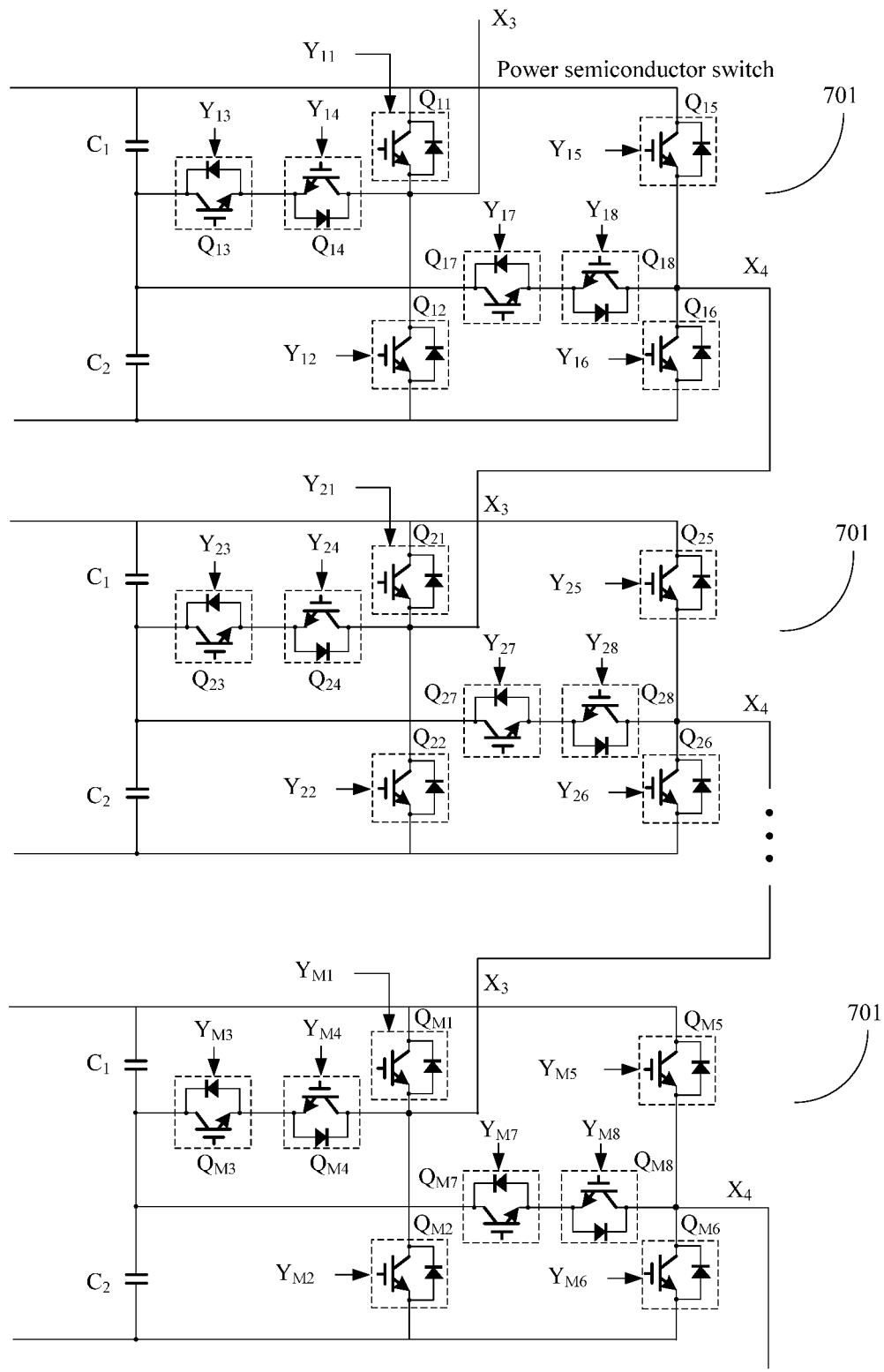
FIG. 24 is a block diagram of a modular power supply system in accordance with another embodiment of the present disclosure.

FIG. 24 is a block diagram of a modular power supply system in accordance with another embodiment of the present disclosure. FIG. 24 is based on FIG. 10 and is a partial schematic view of FIG. 10. As shown in FIG. 24, all of the M power converters 701 in the same power unit 70 are neutral point clamped three-level converters. The power unit 70 may include 8*M drive circuits, each of which is configured to be electrically connected to a corresponding one of the power semiconductor switches $Q_{11}, Q_{12} \ldots Q_{18} \ldots Q_{M1}, Q_{M2} \ldots Q_{M8}$ of the power converters 701. Each of the drive circuits receives local control signals output by the corresponding local controller 91, to output a corresponding one of the driving signals $Y_{11}, Y_{12} \ldots Y_{18} \ldots Y_{M1}, Y_{M2} \ldots Y_{M8}$ to control the corresponding power semiconductor switches to be turned on and off.

That is to say, in the embodiments in FIG. 6 to FIG. 24, the number of drive circuits included in one power unit may equal to that of power semiconductor switches in the power unit. Each drive circuit is configured to be connected to a corresponding one of the power semiconductor switches of the power converters. Each drive circuit receives a corresponding local control signal output by the corresponding local controller 91, to output a driving signal to control the corresponding power semiconductor switch to be turned on and off.

Each of the drive circuits 702 of the modular power supply system of the present disclosure may be directly electrically connected to the corresponding local controller 91, or connected to the corresponding local controller 91 by a magnetic isolation device or an optical isolation device.

The respective drive circuits 702 in the modular power supply system of the present disclosure may be identical to each other or different from each other.

As shown in FIGS. 6 to 24, the respective drive circuits 702 in the modular power supply system of the present embodiment are identical to each other.

Figure 25:
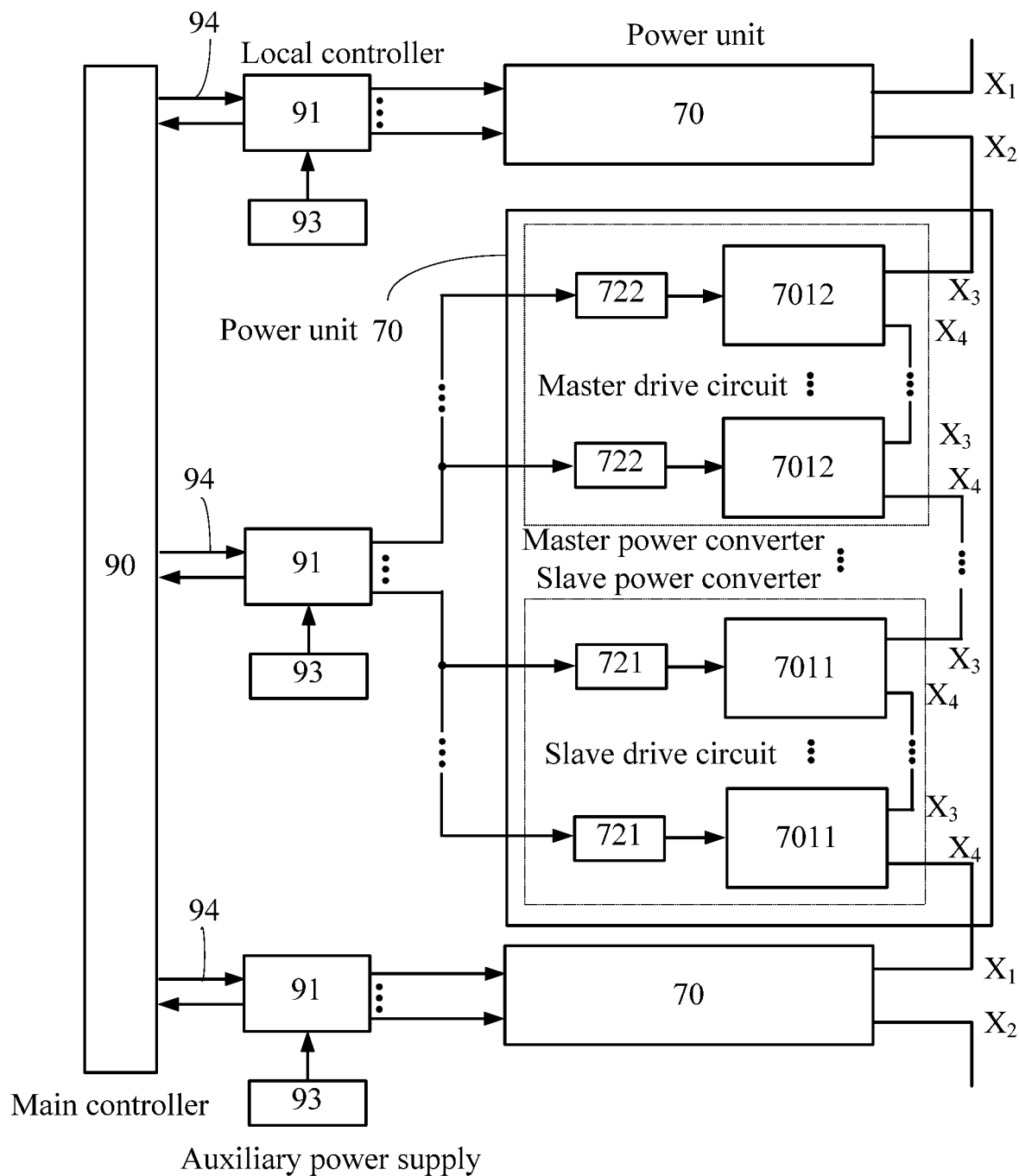
FIG. 25 is a block diagram of a modular power supply system in accordance with another embodiment of the present disclosure.

FIG. 25 is a block diagram of a modular power supply system in accordance with another embodiment of the present disclosure. As shown in FIG. 25, at least one of the M power converters 701 in each power unit 70 in the modular power supply system of the present embodiment is a master power converter 7012, and at least one of the M power converters 701 in each power unit 70 in the modular power supply system of the present embodiment is a slave power converter 7011. In the embodiment, the master power converter 7012 and the slave power converters 7011 have the same topology structure, both of which may use one of the power converters described in FIGS. 15-22. Alternatively, the master power converter 7012 and the slave power converters 7011 have different topology structures, and the master power converter may adopt one of the power converters described in FIG. 15 to FIG. 22, while the slave power converter may adopt another one of the power converters described in FIG. 15 to FIG. 22. Correspondingly, at least one of the M drive circuits is a master drive circuit 722, and at least one the M drive circuits is a slave drive circuit 721. The master drive circuit 722 is configured to control the power semiconductor switches in the corresponding master power converter 7012 to be turned on and off, and each slave drive circuit 721 is configured to control the power semiconductor switches in the corresponding slave power converter 7011 to be turned on and off.

As an embodiment, in the modular power supply system as shown in FIG. 25, the master drive circuit 722 is different from the slave drive circuit 721.

In the present embodiment, when the topology structures of the master power converter 7012 and the slave power converter 7011 are the same, the main drive circuit 722 and the slave drive circuits 721 may be different from each other, all the slave drive circuits 721 are the same, and the local control signals corresponding to the power semiconductor switches at the same position of the master power converter 7012 and all slave power converter 7011 may be the same to each other, for example, be the same local control signal. In other embodiments, the main drive circuit 722 and the slave drive circuit 721 may be different from each other, and the local control signals corresponding to the power semiconductor switches at the same position of the master power converter 7012 and the slave power converter 7011 may be different from each other, but the local control signals corresponding to the power semiconductor switches at the same position of all slave power converter 7011 may be the same.

Figure 26:
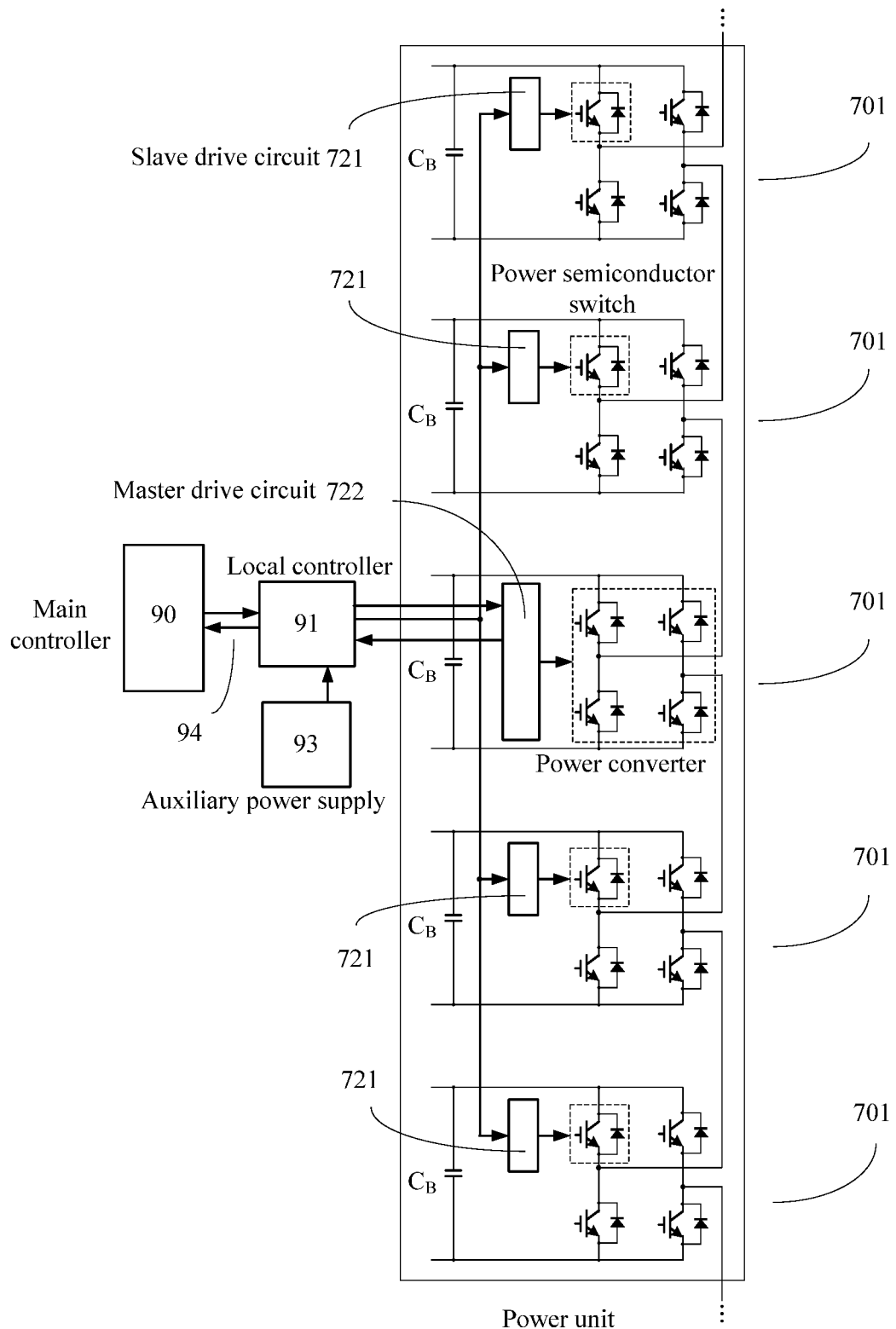
FIG. 26 is a block diagram of a modular power supply system in accordance with another embodiment of the present disclosure.

FIG. 26 is a block diagram of a modular power supply system in accordance with another embodiment of the present disclosure. As shown in FIG. 26, each power unit 70 in the modular power supply system of the present embodiment includes one master power converter 7012 and M−1 slave power converters 7011. The M−1 slave power converters 7011 are evenly distributed at two sides of the master power converter 7012. The topology structure of the master power converter 7012 may be one of FIG. 15 to FIG. 22, and the topology structure of the slave power converter 7011 may be one of FIG. 15 to FIG. 22. The master power converter 7012 and the slave power converters 7011 in FIG. 26 may be driven in different manners. The respective slave power converters may adopt the aforementioned "shared driving", while the master power converter 7012 adopts a separate control mode.

Figure 27:
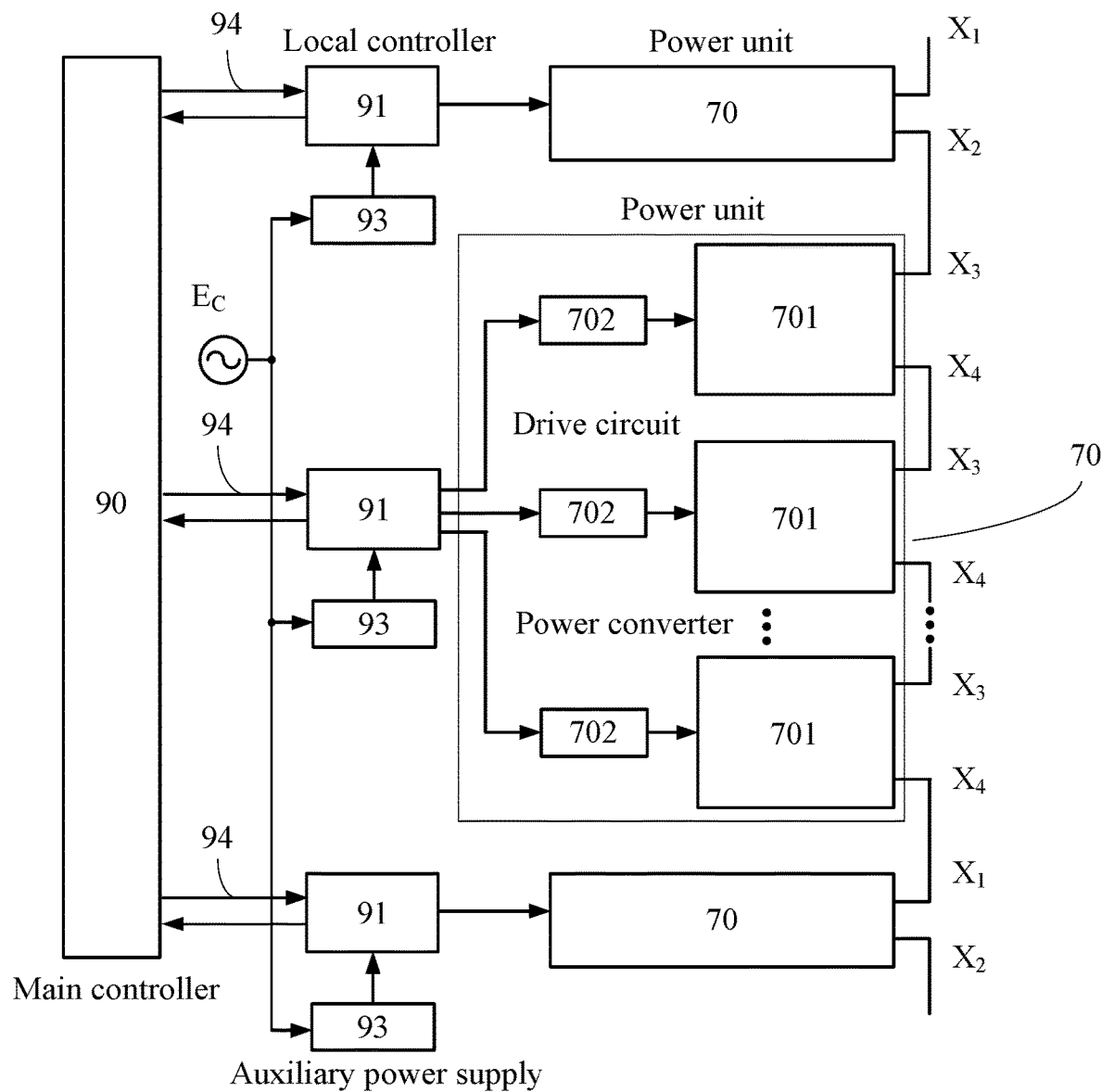
FIG. 27 is a block diagram of a modular power supply system in accordance with another embodiment of the present disclosure.

FIG. 27 is a block diagram of a modular power supply system in accordance with another embodiment of the present disclosure. As shown in FIG. 27, each of the auxiliary power supplies 93 in the modular power supply system of the present embodiment may be configured to take power from an external power source, such as from a commercial power source, or from other circuits. Here, each of the auxiliary power supplies 93 is connected to the external power source $E_C$.

Figure 28:
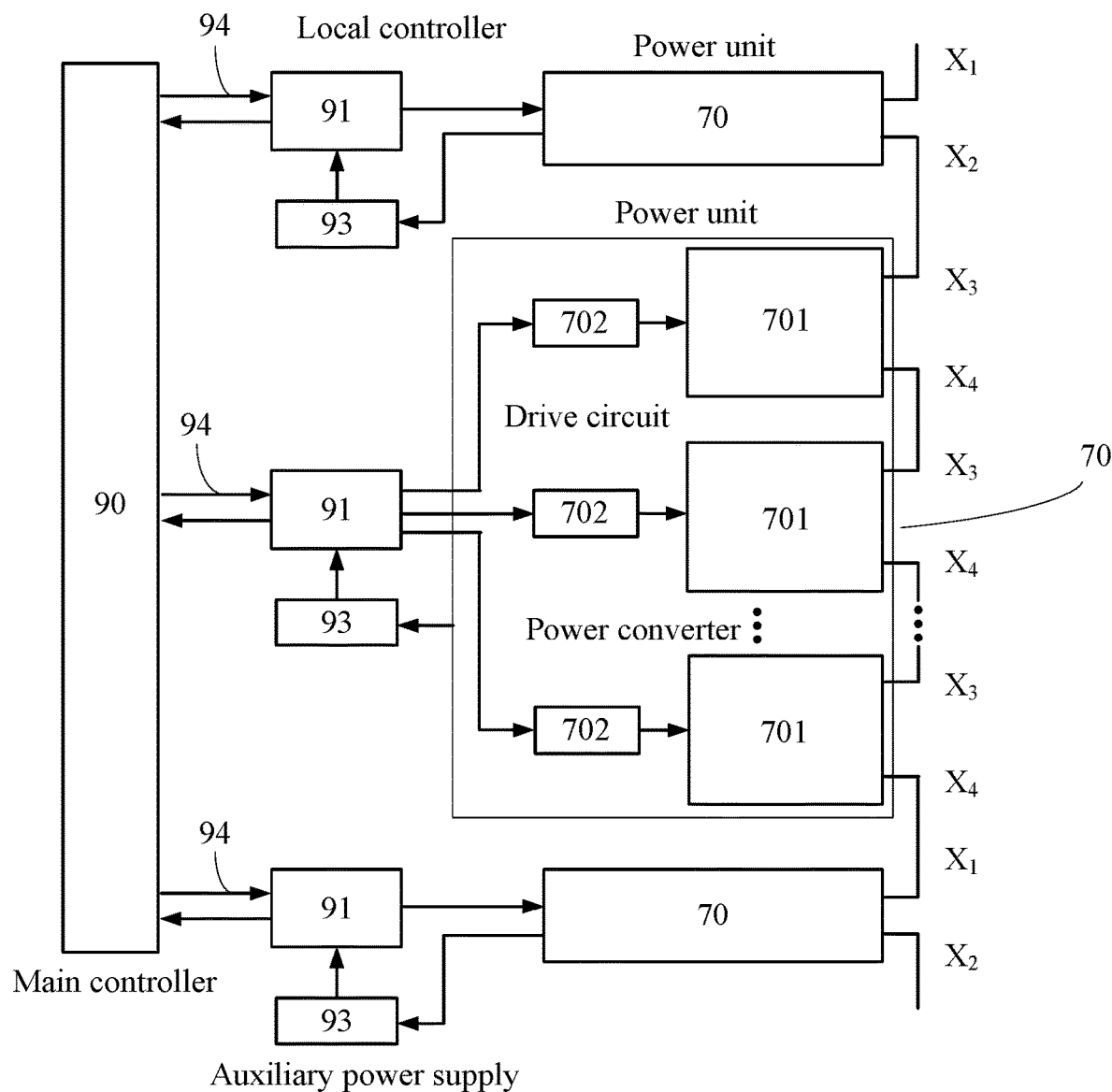
FIG. 28 is a block diagram of a modular power supply system in accordance with another embodiment of the present disclosure.

FIG. 28 is a block diagram of a modular power supply system in accordance with another embodiment of the present disclosure. As shown in FIG. 28, the N auxiliary power supplies 93 in the modular power supply system of the present embodiment are in one-to-one correspondence with the aforementioned N power units 70. Each of the auxiliary power supplies 93 may be configured to take power from the corresponding power unit 70, for example, from the DC bus capacitor of one or more power converters in the corresponding power unit 70.

Figure 29:
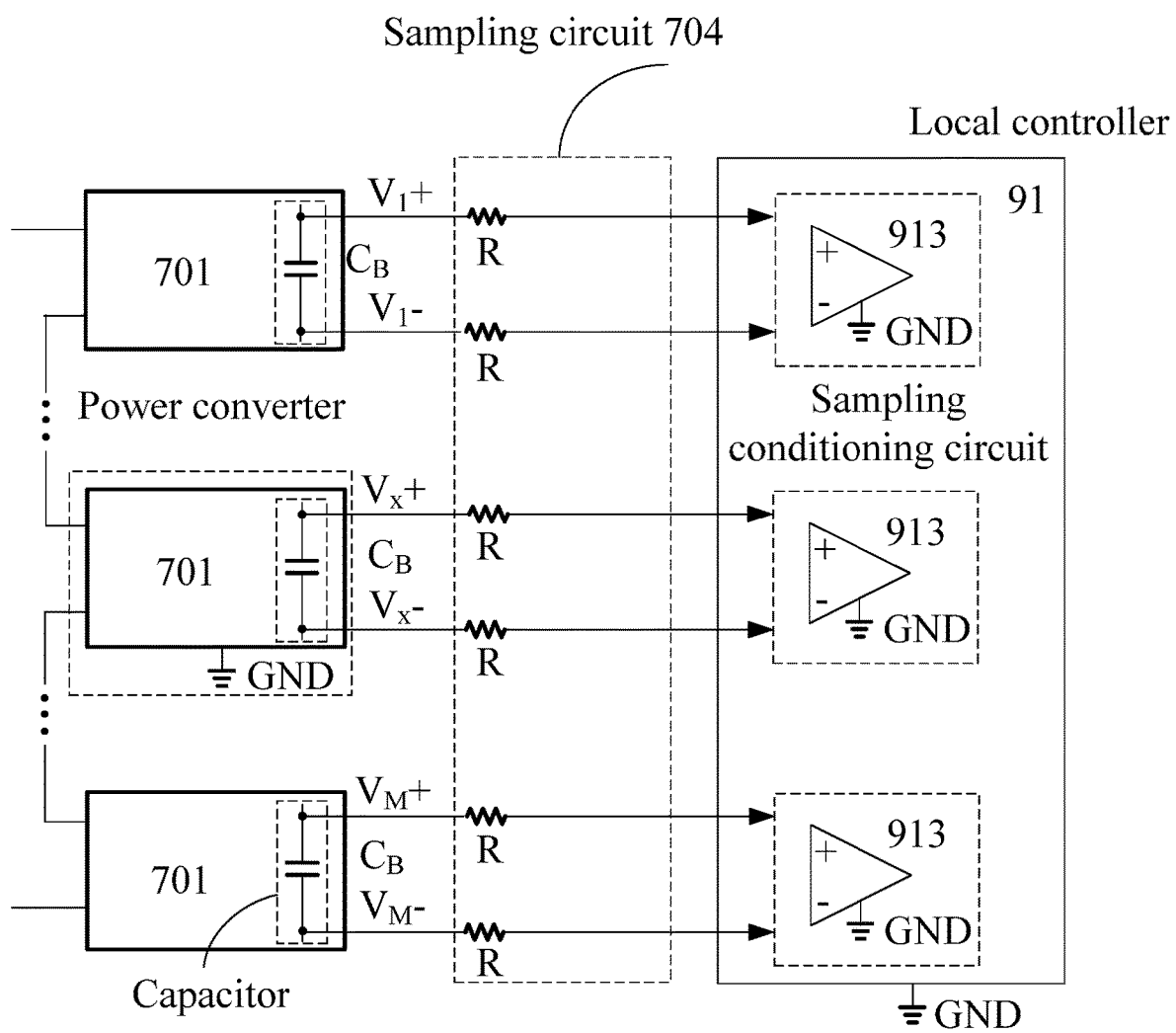
FIG. 29 is a block diagram of a modular power supply system in accordance with another embodiment of the present disclosure.

FIG. 29 is a block diagram of a modular power supply system in accordance with another embodiment of the present disclosure. Based on FIGS. 8-22, as shown in FIG. 29, each of the power units 70 in the modular power supply system of any of FIGS. 8-22 further includes: M sampling circuits 704, in one-to-one correspondence with the M power converters and each sampling circuit is configured to sample the positive DC bus voltages and the negative DC bus voltages of the corresponding power converters 701. The corresponding local controller 91 is configured to contain M sampling conditioning circuits 913, in one-to-one correspondence with the sampling circuits 704 and each sampling conditioning circuit is configured to convert the sampled positive DC bus voltages and negative DC bus voltages of the power converters 701 into digital signals.

The M sampling circuits 704 include: M DC bus positive terminal samplers and M DC bus negative terminal samplers.

The M DC bus positive terminal samplers, that is, resistors R, are in one-to-one correspondence with M power converters 701 and M sampling conditioning circuits 913. The M DC bus positive terminal samplers are respectively configured as that: one end of each DC bus positive terminal sampler is connected to the positive terminal (for example, $V_1+$, $V_x+$, or $V_M+$) of the DC bus capacitor $C_B$ of the corresponding power converter 701, and the other end of the DC bus positive terminal sampler is connected to a first end of the corresponding sampling conditioning circuit 913. The first end of the sampling conditioning circuit 913 receives the positive DC bus voltage of the power converter 701.

The M DC bus negative terminal samplers, that is, corresponding resistors R, are in one-to-one correspondence with the M power converters 701 and the M sampling conditioning circuits 913. The M DC bus negative terminal samplers are respectively configured as that: one end of each DC bus negative terminal sampler is connected to the negative terminal (for example, $V_1-$, $V_x-$, or $V_M-$) of the DC bus capacitor $C_B$ of the corresponding power converter 701, and the other end of the DC bus negative terminal sampler is connected to a second end of the corresponding sampling conditioning circuit 913. The second end of the sampling conditioning circuit 913 receives the negative DC bus voltage of the power converter. In this embodiment, the DC bus positive terminal sampler and the DC bus negative terminal sampler are described by taking resistors R as an example, but not limited thereto. The DC bus positive terminal sampler and the DC bus negative terminal sampler may be composed by a plurality of resistors connected in series, or a plurality of resistors connected in parallel, or a combination of resistors and other electronic components, or the like, as well.

The sampling conditioning circuit 913 may include a single operational amplifier.

The sampling conditioning circuit 913 further includes a sampling reference point or a sampling reference ground GND.

Figure 30:
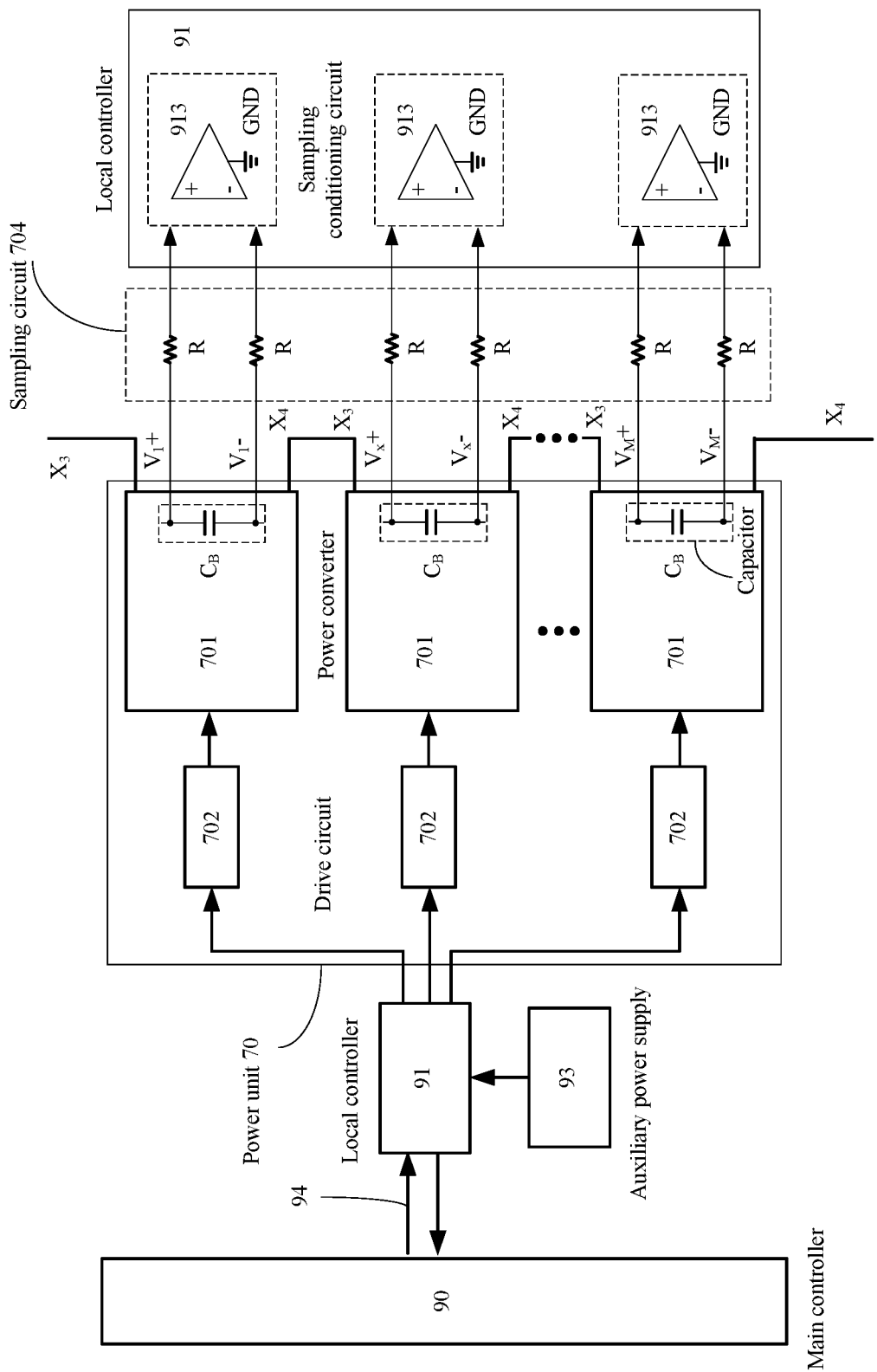
FIG. 30 is a block diagram of a modular power supply system in accordance with another embodiment of the present disclosure.

FIG. 30 is a block diagram of a modular power supply system in accordance with another embodiment of the present disclosure. FIG. 30 is a specific embodiment of FIG. 29. As shown in FIG. 30, each of the power converters 701 of FIG. 30 performs sampling separately and employs the aforementioned separate driving mode.

As shown in FIG. 30, the power unit 70 corresponds to one local controller 91. The number of local control signals output by the local controller 91 for controlling the turn-on and turn-off of the power semiconductor switches of the M power converters 701 in the corresponding power unit 70 is the same as the number of the power semiconductor switches. That is, each power semiconductor switch needs to be controlled by a separate local control signal. The relevant contents of the sampling circuit and the sampling conditioning circuit 913 have been described in FIG. 29 and will not be repeatedly described again.

Figure 31:
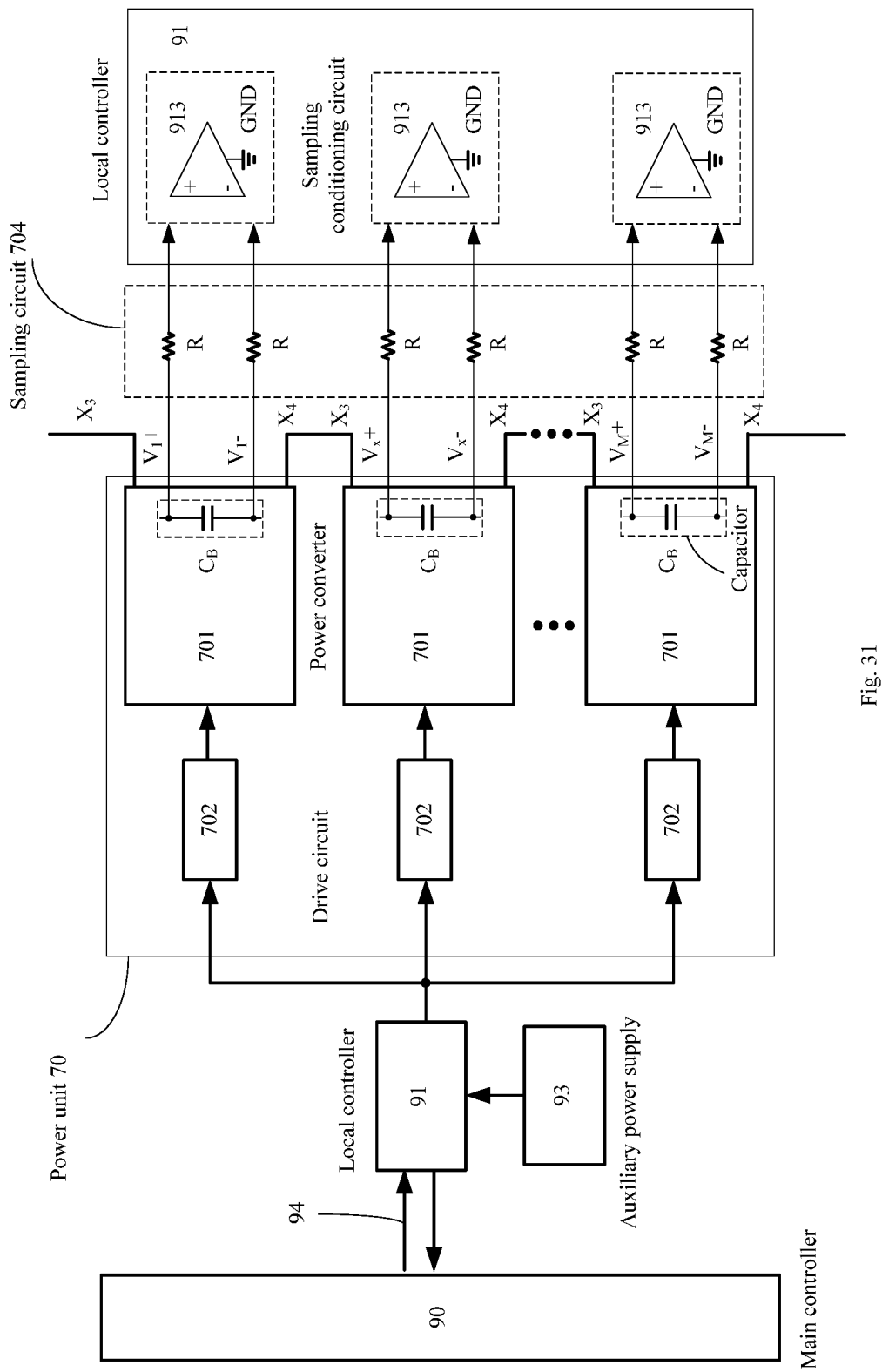
FIG. 31 is a block diagram of a modular power supply system in accordance with another embodiment of the present disclosure.

FIG. 31 is a block diagram of a modular power supply system in accordance with another embodiment of the present disclosure. FIG. 31 is a specific embodiment of FIG. 29. As shown in FIG. 31, each of the power converters 701 of FIG. 31 performs sampling separately and employs the aforementioned shared driving mode.

As shown in FIG. 31, the power unit 70 corresponds to one local controller 91. The local control signals output by the local controller 91 for controlling the turn-on and turn-off of the power semiconductor switches at the same positions of the M power converters 701 in the corresponding power unit 70 are the same one. The relevant contents of the sampling circuit and the sampling conditioning circuit 913 have been described in FIG. 29 and will not be repeatedly described again.

Figure 32:
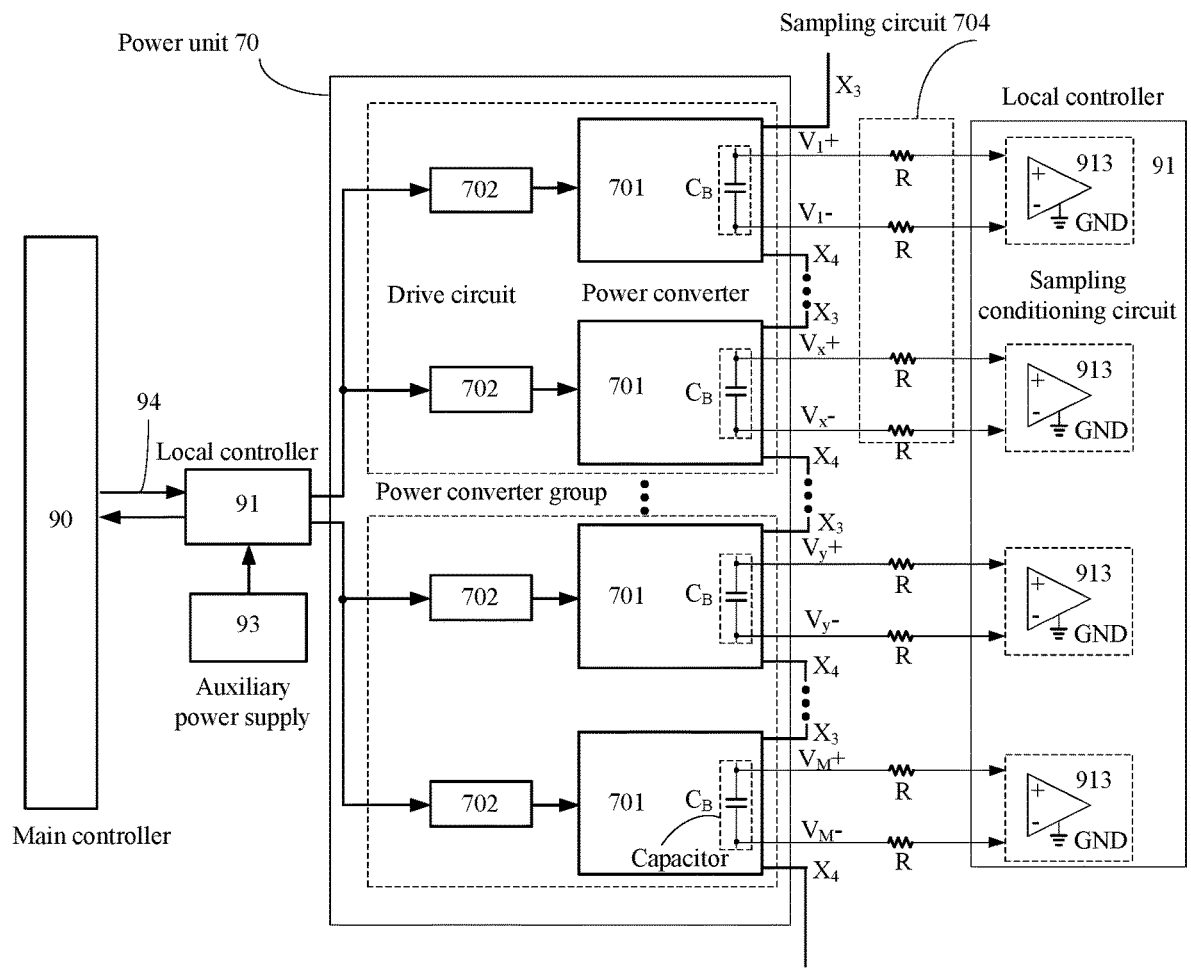
FIG. 32 is a block diagram of a modular power supply system in accordance with another embodiment of the present disclosure.

FIG. 32 is a block diagram of a modular power supply system in accordance with another embodiment of the present disclosure. FIG. 32 is a specific embodiment of FIG. 29. As shown in FIG. 32, each of the power converters 701 of FIG. 32 performs sampling separately, while a part of the power converters 701 employ the aforementioned separate driving mode, and a part of the power converters 701 employ the aforementioned shared driving mode.

Figure 33:
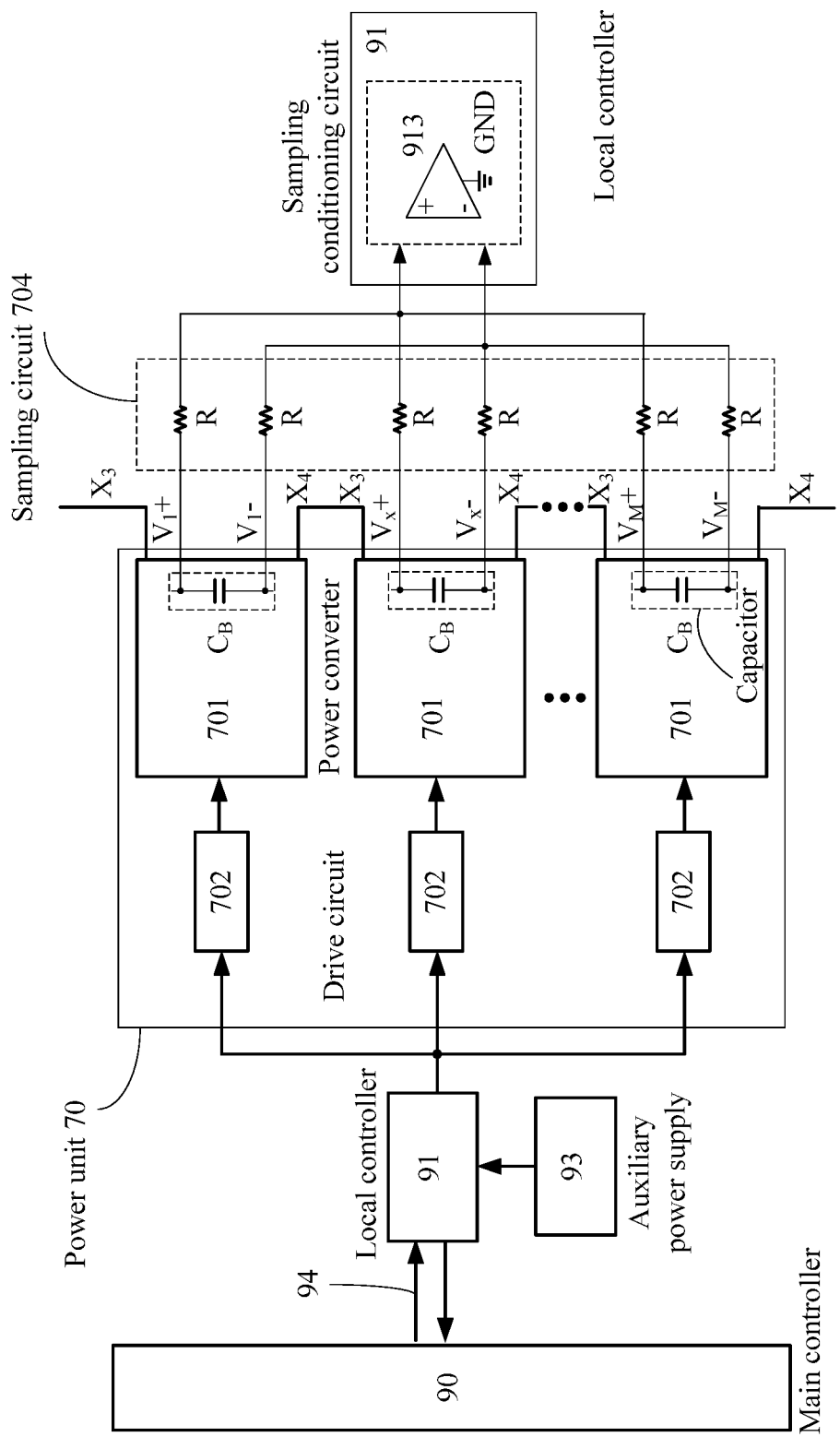
FIG. 33 is a block diagram of a modular power supply system in accordance with another embodiment of the present disclosure.

FIG. 33 is a block diagram of a modular power supply system in accordance with another embodiment of the present disclosure. Based on FIGS. 15-22, as shown in FIG. 33, each of the power units 70 in the modular power supply system of any of FIGS. 15-22 further includes: a sampling circuit 704, configured to sample a sum of positive DC bus voltages and a sum of negative DC bus voltages of the M power converters 701 respectively. The corresponding local controller 91 is configured to include: a sampling conditioning circuit 913, configured to convert the sampled sum of positive DC bus voltages and sum of negative DC bus voltages of the M power converters 701 into digital signals.

As shown in FIG. 33, the sampling circuit 704 in the modular power supply system of the present embodiment is configured to include: M DC bus positive terminal samplers, i.e., resistors R, in one-to-one correspondence with the above M power converters 701, wherein the M DC bus positive terminal samplers are respectively configured as that: one end of each DC bus positive terminal sampler is connected to the positive terminal (for example, one of $V_1+$ to $V_M+$) of the DC bus of the corresponding power converter 701, the other ends of the DC bus positive terminal samplers are connected together and connected to a first end of the sampling conditioning circuit 913, and the first end of the sampling conditioning circuit receives the sum of positive DC bus voltages of the M power converters 701: and M DC bus negative terminal samplers, i.e., resistors R, in one-to-one correspondence with the above M power converters 701, wherein the M DC bus negative terminal samplers are respectively configured as that: one end of each DC bus negative terminal sampler is connected to the negative terminal (for example, one of $V_1-$ to $V_M-$) of the DC bus of the corresponding power converter 701, the other ends of the DC bus negative terminal samplers are connected together and connected to a second end of the sampling conditioning circuit 913, and the second end of the sampling conditioning circuit receives the sum of negative DC bus voltages of the M power converters 701.

In an embodiment, the sampling circuit is not limited to include a resistor, but may be other circuits as well.

As shown in FIG. 33, in order to reduce a common mode voltage in the sampling circuit with regard to the DC bus, the sampling circuit in the modular power supply system of the present embodiment sums the positive DC bus voltages and negative bus voltages of the M power converters 701 respectively by the DC bus positive terminal samplers and the DC bus negative terminal samplers, and then input the summed positive DC bus voltages and negative bus voltages to the sampling conditioning circuit 913. The sampling conditioning circuit 913 includes an operational amplifier. In an embodiment, the DC bus positive terminal sampler and the DC bus negative terminal sampler may be a single resistor or a plurality of resistors connected in series, a plurality of resistors connected in parallel or a combination of resistors connected in series and in parallel.

Figure 34:
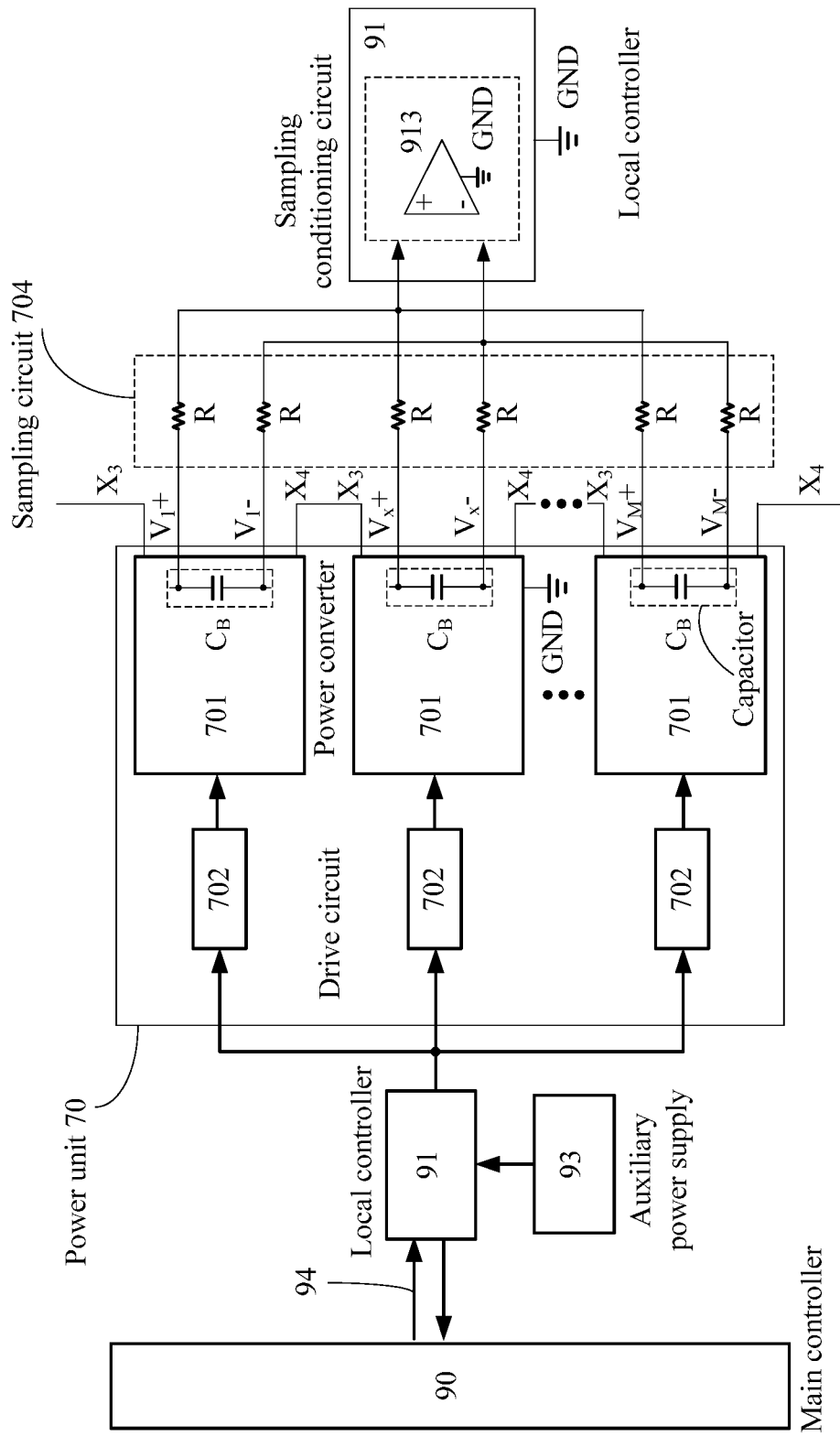
FIG. 34 is a block diagram of a modular power supply system in accordance with another embodiment of the present disclosure.

FIG. 34 is a block diagram of a modular power supply system in accordance with another embodiment of the present disclosure. As shown in FIG. 34, in the present disclosure, the sampling reference point GND of the local controller 91 and the sampling conditioning circuit 913 is set at the most centrally-located power converter 701 among the M power converters 701 to the greatest extent. For example, the sampling reference point GND is set at the positive terminal of the DC bus capacitor $C_B$ or the negative terminal of the DC bus capacitor Ca of the most centrally-located power converter 701, so that the common mode voltage of the sampling voltage may be minimized, thereby the sampling accuracy may be improved and the common mode interference may be reduced.

As shown in FIG. 34, the sampling circuit 704 in the modular power supply system of the present embodiment is configured to sample the sum of the positive DC bus voltages and the sum of the negative DC bus voltages of the aforementioned M power converters respectively. When M is an odd number, the sampling reference point GND is set at the (M+1)/2-th power converter, so that the sampling reference point GND is set at the most centrally-located power converter 701 among the aforementioned M power converters 701. For example, the sampling reference point GND is set at the negative terminal $V_{(M+1)/2}-$ of the DC bus capacitor $C_B$ of the (M+)/2-th power converter 701. In other embodiments, the sampling reference point GND may be disposed at the positive terminal $V_{(M+1)/2}+$ of the DC bus capacitor $C_B$ of the (M+1)/2-th power converter 701.

Figure 35:
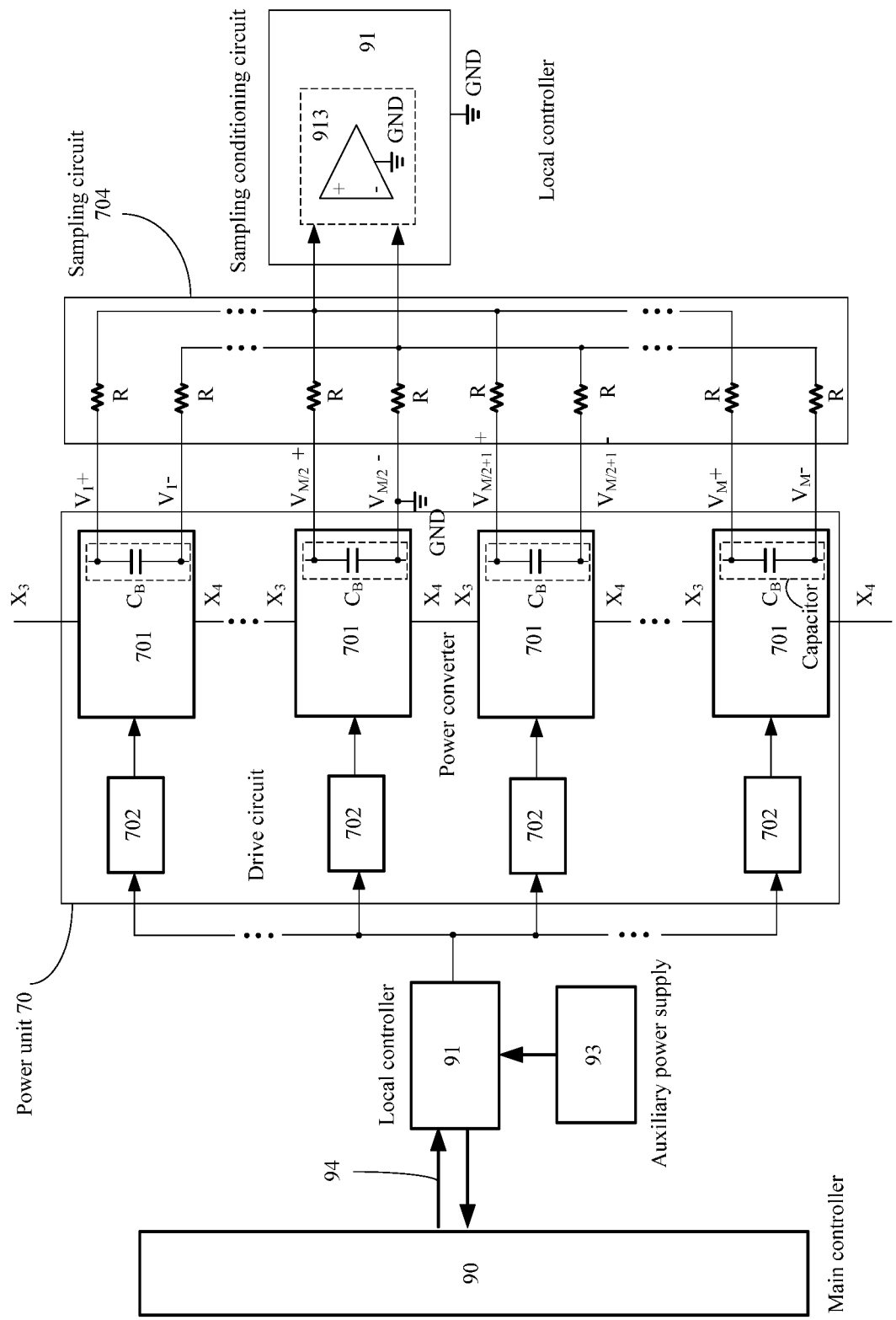
FIG. 35 is a block diagram of a modular power supply system in accordance with another embodiment of the present disclosure.

FIG. 35 is a block diagram of a modular power supply system in accordance with another embodiment of the present disclosure. As shown in FIG. 35, the sampling circuit 704 in the modular power supply system of the present embodiment is configured to sample the sum of the positive DC bus voltages and the sum of the negative DC bus voltages of the aforementioned M power converters respectively. When M is an even number, the sampling reference point is set at the M/2-th power converter, so that the sampling reference point GND is set at the relatively most centrally-located power converter 701 among the aforementioned M power converters 701. For example, the sampling reference point is set at the negative terminal $V_{M/2}-$ of the DC bus capacitor Ca of the M/2-th power converter. In other embodiments, the sampling reference point GND may be disposed at the positive terminal $V_{M/2}+$ of the DC bus capacitor $C_B$ of the M/2-th power converter.

Figure 36:
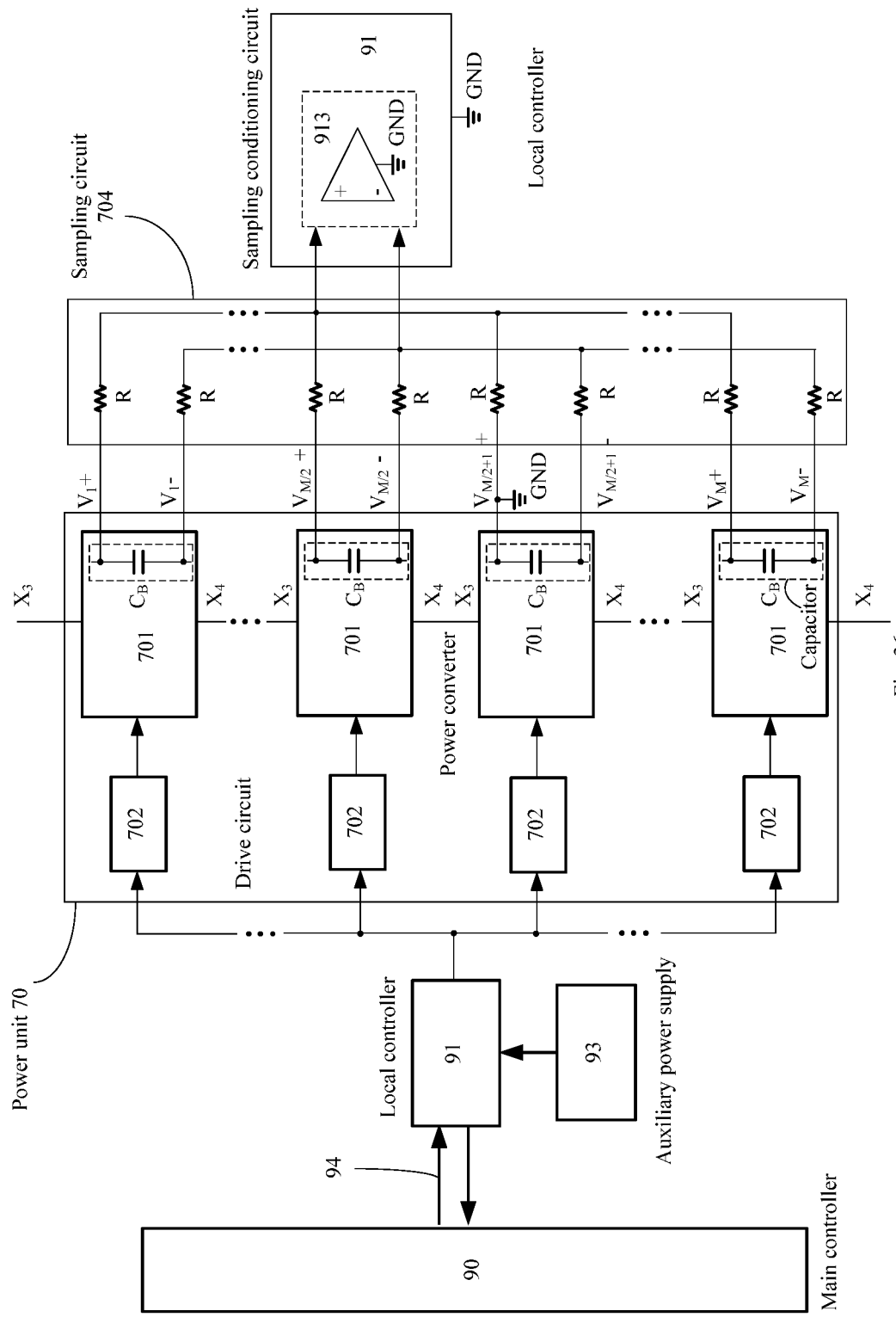
FIG. 36 is a block diagram of a modular power supply system in accordance with another embodiment of the present disclosure.

As shown in FIG. 36, the sampling circuit 704 in the modular power supply system of the present embodiment is configured to sample the sum of the positive DC bus voltages and the sum of the negative DC bus voltages of the aforementioned M power converters respectively. When M is an even number, the sampling reference point is set at the (M/2+1)-th power converter, so that the sampling reference point GND is set at the relatively most centrally-located power converter 701 among the aforementioned M power converters 701. For example, the sampling reference point GND is set at the positive terminal $V_{M/2+1}+$ of the DC bus capacitor $C_B$ of the (M/2+1)-th power converter. In other embodiments, the sampling reference point GND may be disposed at the negative terminal $V_{M/2+1}-$ of the DC bus capacitor Ca of the (M/2+1)-th power converter 701.

Figure 37:
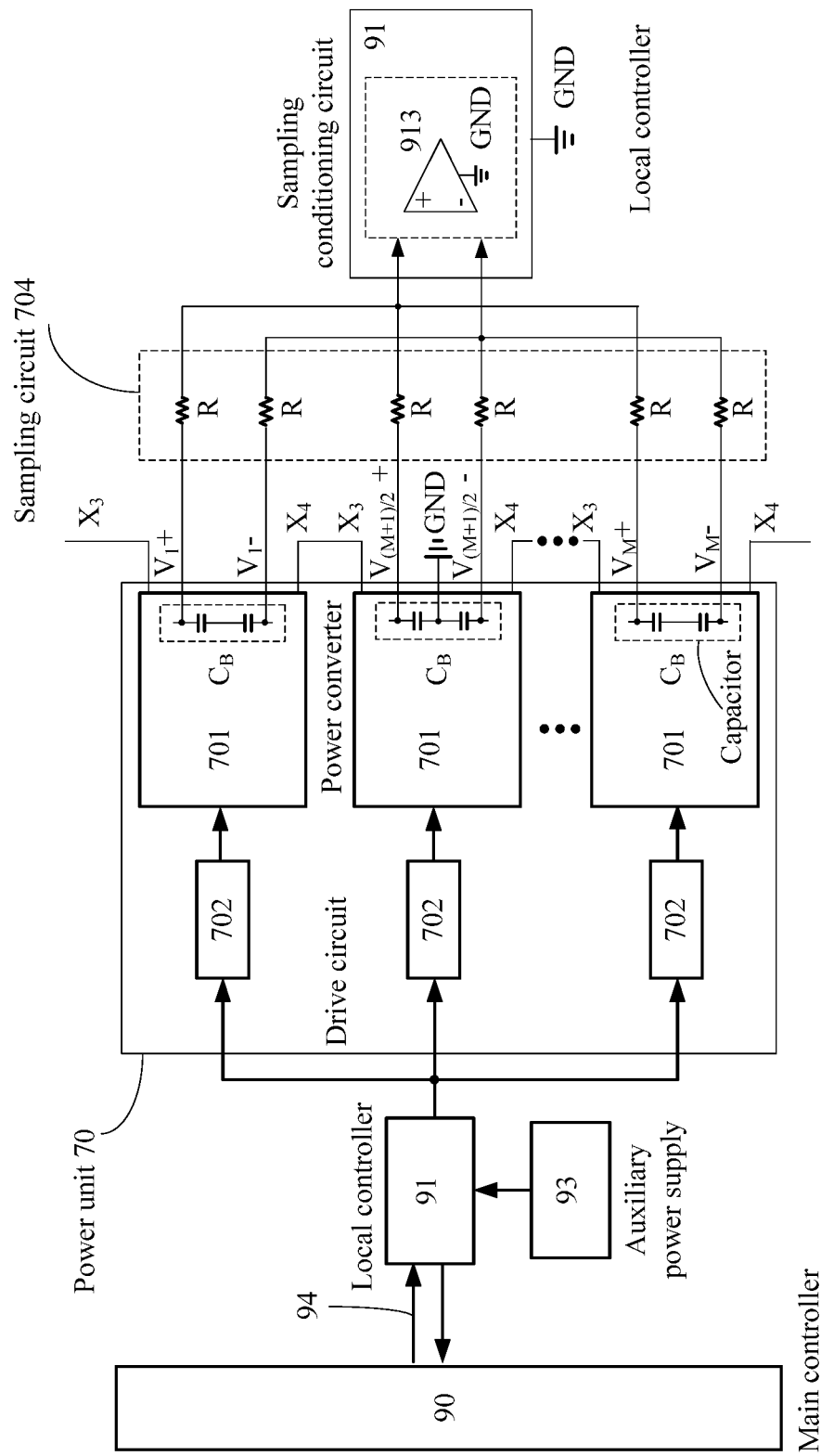
FIG. 37 is a block diagram of a modular power supply system in accordance with another embodiment of the present disclosure.

FIG. 37 is a block diagram of a modular power supply system in accordance with another embodiment of the present disclosure. As shown in FIG. 37, the DC bus capacitor $C_B$ of each power converter 701 is constituted by two capacitors connected in series, and a connection point of the two capacitors connected in series is the midpoint of the DC bus capacitor $C_B$. When M is an odd number, the sampling reference point GND may be set at the midpoint of the DC bus capacitor $C_B$ of the (M+1)/2-th power converter.

As an embodiment, when M is an even number, the sampling reference point GND may be set at the midpoint of the DC bus capacitor Ca of the M/2-th power converter, or the midpoint of the DC bus capacitor $C_B$ of the (M/2+1)-th power converter.

Figure 38:
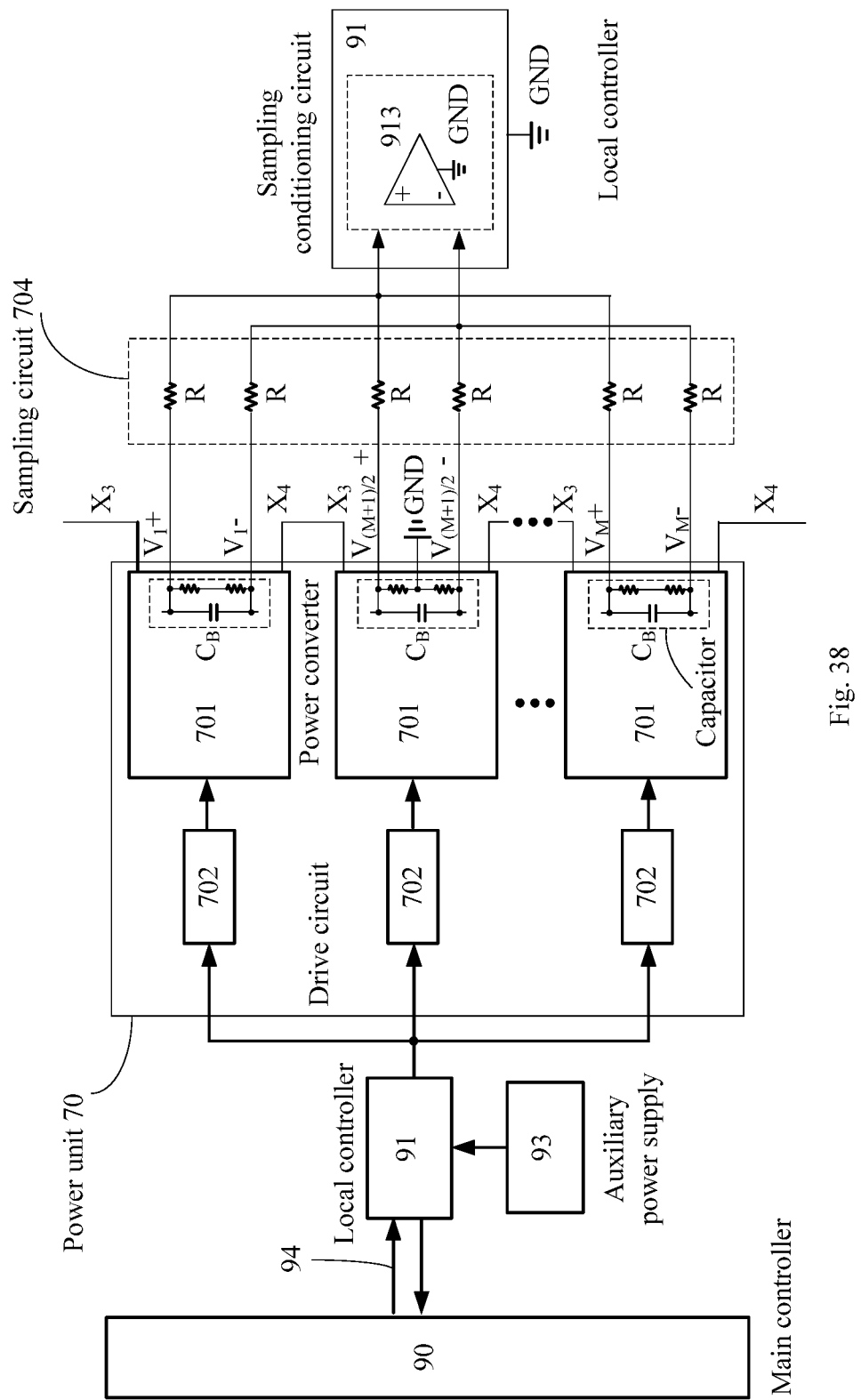
FIG. 38 is a block diagram of a modular power supply system in accordance with another embodiment of the present disclosure.

FIG. 38 is a block diagram of a modular power supply system in accordance with another embodiment of the present disclosure. As shown in FIG. 38, the DC bus capacitor $C_B$ of each power converter 701 includes only one capacitor, and there is no midpoint of the capacitor. Two resistors connected in series need to be connected in parallel with the DC bus capacitor $C_B$ of each power converter 701. When M is an odd number, the sampling reference point GND is set at the connection point of the two resistors of the (M+1)/2-th power converter.

As an embodiment, when M is an even number, the sampling reference point GND is set at the connection point of the two resistors of the M/2-th power converter, or the sampling reference point GND is set at the connection point of the two resistors of the (M/2+1)-th power converter.

As shown in FIG. 38, in each of the power converters 701 in the power unit 70 in the modular power supply system of the present embodiment, if the DC bus capacitor $C_B$ is single, it can be determined that the DC bus capacitor $C_B$ has no midpoint, then a voltage-equalizing resistor is connected in parallel with the DC bus capacitor $C_B$. The voltage-equalizing resistor is composed of two equivalent resistors connected in series, and the connection point between the two equivalent resistors is set to be the midpoint, then the sampling reference point GND is set to be the midpoint at the most centrally-located power converter 701 of the M power converters 701.

The sample conditioning circuit 913 shown in FIGS. 33-38 may include a single operational amplifier.

Figure 39:
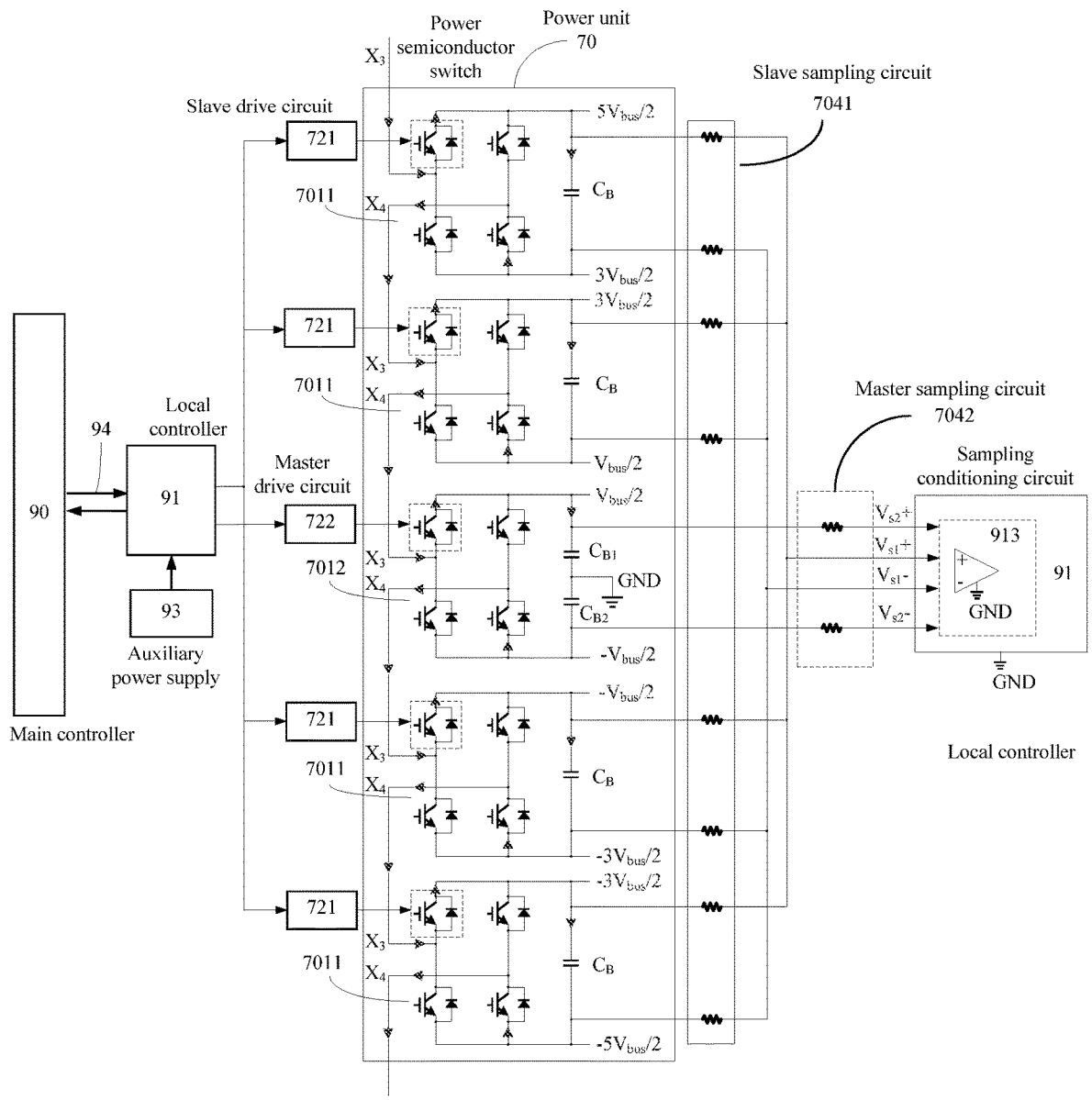
FIG. 39 is a block diagram of a modular power supply system in accordance with another embodiment of the present disclosure.

FIG. 39 is a block diagram of a modular power supply system in accordance with another embodiment of the present disclosure. As shown in FIG. 39, each power unit 70 in the modular power supply system of the present embodiment further includes: a master sampling circuit 7042, configured to sample the positive DC bus voltage and the negative DC bus voltage of the master power converter 7012, wherein the sampling reference point GND is set at the midpoint of the DC bus capacitor of the master power converter; and M−1 slave sampling circuits 7041, configured to sample the sum of the positive DC bus voltages and the sum of negative DC bus voltages of the M−1 slave power converters 7011. The M−1 slave power converters 7011 are equally distributed at two sides of the master power converter 7012 and centered on the master power converter 7012. The corresponding local controller 91 is configured to include: a sampling conditioning circuit 913, configured to convert the sampled positive DC bus voltage $V_{S2}+$ and negative DC bus voltage $V_{S2}-$ of the master power converter 7012, the sum of positive DC bus voltages $V_{S1}+$ of the slave power converters 7011 and the sum of negative bus voltages $V_{S1}-$ of the slave power converters 7011 into digital signals.

As shown in FIG. 39, in the modular power supply system of this embodiment, the master sampling circuit 7042 includes: a master DC bus positive terminal sampler, i.e., a resistor, corresponding to the master power converter 7012, wherein one end of the master DC bus positive terminal sampler is connected to the positive terminal of the DC bus of the master power converter, and the other end of the master DC bus positive terminal sampler is connected to a first end of the sampling conditioning circuit 913, and the first end of the sampling conditioning circuit 913 receives the positive DC bus voltage $V_{S2}+$ of the master power converter 7012; and one end of the master DC bus negative sampler is connected to the negative terminal of the DC bus of the master DC bus power converter 7012, the other end of the master DC bus negative sampler is connected to a second end of the sampling conditioning circuit 913, and the second end of the sampling conditioning circuit 913 receives the negative DC bus voltage $V_{S2}-$ of the master power converter 7012. The slave sampling circuit 7041 includes: M−1 slave DC bus positive terminal samplers, i.e., resistors, in one-to-one correspondence with the M−1 slave power converters 7011, wherein the M−1 slave DC bus positive terminal samplers are configured as that: one end of each slave DC bus positive terminal sampler is connected to a positive terminal of a DC bus of the corresponding slave power converter 7011, the other ends of the M−1 slave DC bus positive terminal samplers are connected together and connected to a third end of the sampling conditioning circuit 913, and the third end of the sampling conditioning circuit 913 receives a sum $V_{S1}+$ of positive DC bus voltages of the M−1 slave power converters 7011; and M−1 slave DC bus negative terminal samplers, i.e., resistors, in one-to-one correspondence with the M−1 slave power converters 7011, wherein the M−1 slave DC bus negative terminal samplers are respectively configured as that: one end of each slave DC bus negative terminal sampler is connected to the negative terminal of a DC bus of the corresponding slave power converter 7011, the other ends of the M−1 slave DC bus negative terminal samplers are connected together and connected to a fourth end of the sampling conditioning circuit 913, and the fourth end of the sampling conditioning circuit 913 receives a sum $V_{S1}-$ of negative DC bus voltages of the M−1 slave power converters 7011.

As an embodiment, the number M of power converters in FIG. 39 is 5, but the present disclosure is not limited thereto, but for example, applicable to the embodiments in the foregoing figures in which the power unit includes master and slave power converters.

As shown in FIG. 39, there are five H-bridge circuits in the power unit 70. The most centrally-located H-bridge circuit is the master power converter, and four H-bridge circuits distributed at two sides are slave power converters. The DC bus voltage of each H-bridge circuit is $V_{bus}$. If the sampling reference point GND is not set properly, for example, the sampling reference point GND is set at the DC bus negative terminal of the H-bridge circuit at the bottom, the DC bus positive terminal voltages and DC bus negative terminal voltages of the five H-bridge circuits shown from top to bottom are $(5V_{bus}, 4V_{bus})$, $(4V_{bus}, 3V_{bus})$, $(3V_{bus}, 2V_{bus})$, $(2V_{bus}, V_{bus})$ and $(V_{bus}, 0)$ respectively. Supposing that the sampling ratio of the sampling circuit is k, at this time, the sampling voltage is $V_{S_2}+=15*k*V_{bus}$, $V_{S_2}-=10*k*V_{bus}$, then in the sampling voltage, the differential mode voltage $V_{DM}=5$ kV and the common mode voltage $V_{CM}=12.5$ kV. However, in the present disclosure, the sampling reference point GND of the sampling conditioning circuit 913 and the local controller 91 is set to be the midpoint of the DC bus capacitor of the middlemost H-bridge circuit, and then the DC bus positive terminal voltages and DC bus negative terminal voltages of the five H-bridge circuits shown from top to bottom are $(2.5V_{bus}, 1.5V_{bus})$, $(1.5V_{bus}, 0.5V_{bus})$, $(0.5V_{bus}, -0.5V_{bus})$, $(-0.5V_{bus}, -1.5V_{bus})$, $(-1.5V_{bus}, -2.5V_{bus})$ respectively, at this time, the sampling voltage is $V_{S_2}+=2.5*k*V_{bus}$, $V_{S_2}-=-2.5*k*V_{bus}$, the differential mode component $V_{DM}=5$ kV and the common mode component $V_{CM}=0$. The common mode voltage is significantly reduced, and the sampling accuracy and the anti-interference ability are greatly improved.

Figure 40:
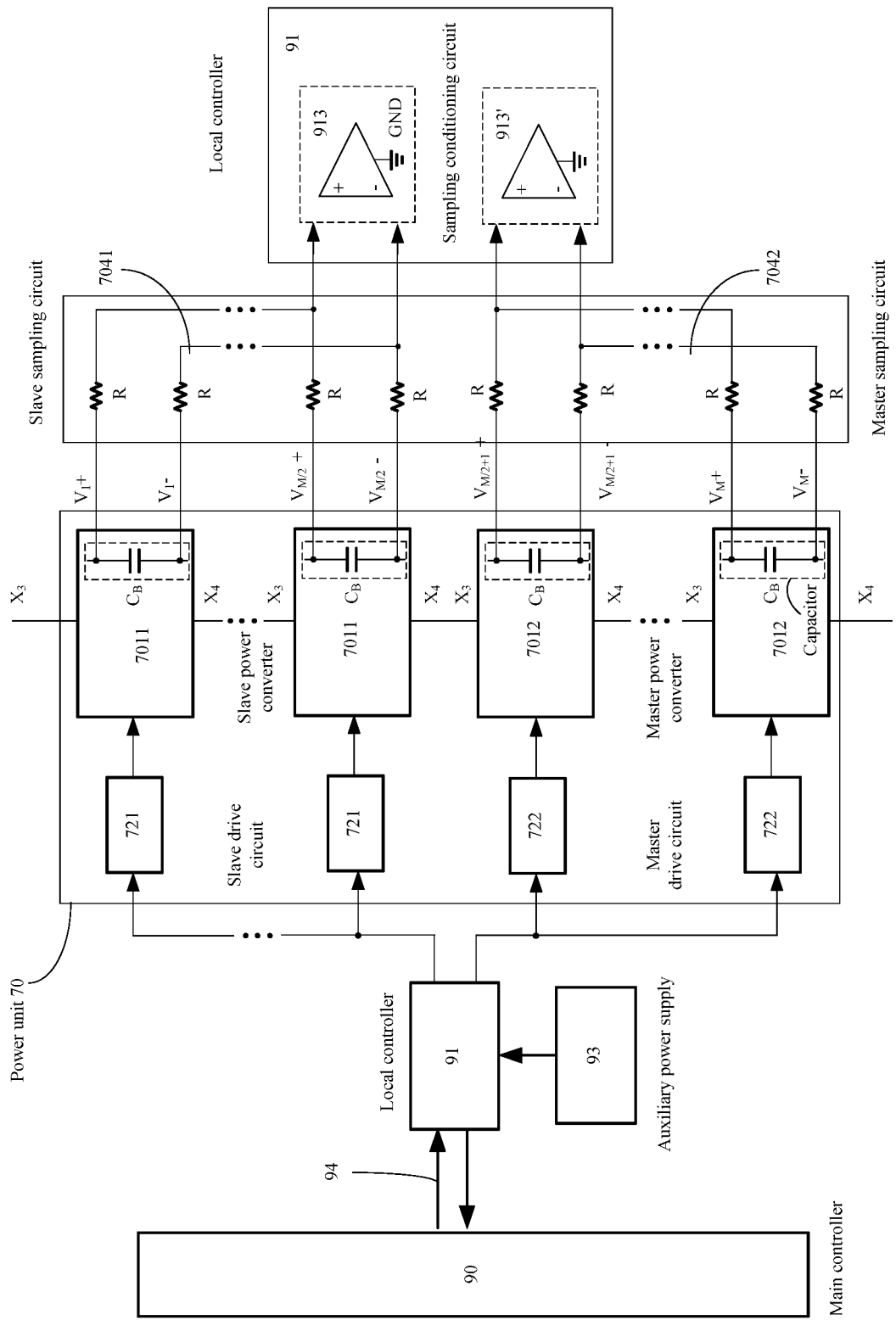
FIG. 40 is a block diagram of a modular power supply system in accordance with another embodiment of the present disclosure.

FIG. 40 is a block diagram of a modular power supply system in accordance with another embodiment of the present disclosure. As shown in FIG. 40, each power unit 70 in the modular power supply system of the present embodiment further includes: a plurality of (e.g., more than two) master sampling circuits 7042, respectively configured to sample a sum of positive DC bus voltages and a sum of negative DC bus voltages of the plurality of master power converters 7012; and a plurality of (e.g., more than two) slave sampling circuits 7041, respectively configured to sample a sum of positive DC bus voltages and a sum of negative DC bus voltages of the plurality of slave power converters 7011, wherein the plurality of slave power converters 7011 and the plurality of master power converters 7012 are divided into two groups. The corresponding local controller 91 is configured to include: sampling conditioning circuits 913' and 913. The sampling conditioning circuit 913 is configured to convert the sampled sum of positive DC bus voltages and sum of negative DC bus voltages of the master power converters 7012 into digital signals: and the sampling conditioning circuit 913' is configured to convert the sampled sum of positive DC bus voltages of the slave power converters 7011 and sum of negative DC bus voltages of the slave power converters 7011 into digital signals.

As shown in FIG. 40, in the modular power supply system of this embodiment, the master sampling circuit 7042 includes: a plurality of master DC bus positive terminal samplers, in one-to-one correspondence with the master power converters 7012, wherein one end of each of the master DC bus positive terminal samplers is connected to the master DC bus positive terminal of the master power converter, the other ends of the master DC bus positive terminal samplers are connected together and connected to a first end of the sampling conditioning circuit 913', and the first end of the sampling conditioning circuit 913' receives the sum of the positive DC bus voltages of the master power converters 7012; and one end of each of the master DC bus negative terminal samplers is connected to the master DC bus negative terminal of the master power converter 7012, the other ends of the master DC bus negative terminal samplers are connected together and connected to a second end of the sampling conditioning circuit 913', and the second end of the sampling conditioning circuit 913' receives the sum of negative DC bus voltages of the master power converters 7012. The slave sampling circuit 7041 includes: a plurality of slave DC bus positive terminal samplers, in one-to-one correspondence with the plurality of slave power converters 7011, wherein one end of each of the plurality of slave DC bus positive terminal samplers is connected to a slave DC bus positive terminal of the corresponding slave power converter 7011, the other ends of the plurality of slave DC bus positive terminal samplers are connected together and connected to a first end of the sampling conditioning circuit 913, and the first end of the sampling conditioning circuit 913 receives the sum of positive DC bus voltages of the plurality of slave power converters 7011: and a plurality of slave DC bus negative terminal samplers, in one-to-one correspondence with the plurality of slave power converters 7011, wherein one end of each of the plurality of slave DC bus negative terminal samplers is connected to a slave DC bus negative terminal of the corresponding slave power converter 7011, the other ends of the plurality of slave DC bus negative terminal samplers are configured to be connected together and connected to a second end of the sampling conditioning circuit 913, and the second end of the sampling conditioning circuit 913 receives the sum of negative DC bus voltages of the plurality of slave power converters 7011.

As an embodiment, the number M of power converters in FIG. 40 is four, but the present disclosure is not limited thereto, for example, applicable to the embodiments in the foregoing figures in which the power unit includes master and slave power converters.

The sampling conditioning circuit as shown in FIGS. 39 and 40 may include a dual operational amplifier.

In the present disclosure, by constituting a plurality of power converters as one power unit and adopting a set of local controller, optical fiber and auxiliary power supply to control the plurality of power converters, the number of local controllers, optical fibers and auxiliary power supplies may be reduced greatly, the structural design may be simplified, the cost may be reduced, and the reliability may be improved.

In the present disclosure, power semiconductor switches at the same position of each cascaded power converter in the power unit share one local control signal, which may simplify the control circuit.

The present disclosure may sample the bus voltage of the power converter through the sampling circuit and the sampling conditioning circuit, which improves the sampling accuracy of the DC bus voltage.

The present disclosure is applicable to all topology structures connected by AC/DC, DC/AC, DC/DC power converters, and may be widely used.

The exemplary embodiments of the present disclosure have been particularly shown and described as above. It shall be understood that the disclosure is not limited to the details of the specific structures, arrangements or implementations described herein: rather, the disclosure is intended to cover various modifications and equivalents within the spirit and scope of the claims. It should be further noted that the above embodiments are merely illustrative of the technical solutions of the present disclosure, and are not intended to be limiting; although the present disclosure has been described in detail with reference to the foregoing embodiments, those skilled in the art will understand that the technical solutions described in the foregoing embodiments may be modified, or some or all of the technical features may be equivalently replaced; but the substance of the modifications or substitutions do not depart from the scope of the technical solutions of the embodiments of the present disclosure.

What is claimed is:

1. A modular power supply system, configured to comprise:
    a main controller, configured to output a main control signal;
    N local controllers, wherein each of the local controllers is configured to receive the main control signal to output at least one local control signal; and
    N power units, in one-to-one correspondence with the N local controllers, wherein each of the power units comprises a first end and a second end, the second end of each of the power units is connected to the first end of an adjacent one of the power units, and each of the power units is configured to comprise M power converters, wherein each of the power converters comprises a third end and a fourth end, the fourth end of each of the power converters is connected to the third end of an adjacent one of the power converters, and the third end of the first one of the power converters is connected to the first end of the power unit, the fourth end of the M-th one of the power converters is connected to the second end of the power unit, and each of the power converters is configured to operate according to the local control signal output by a corresponding local controller, wherein both N and M are natural numbers greater than one,
    wherein at least one of the M power converters is a master power converter, at least one of the M power converters is a slave power converter, and the local control signals for controlling power semiconductor switches at the same position of the slave power converters to be turned on and off are the same,
    each of the power units further comprises:
        a master sampling circuit, configured to sample a positive DC bus voltage and a negative DC bus voltage of the master power converter respectively, or a sum of positive DC bus voltages and a sum of negative bus voltages of the master power converters; and
        a slave sampling circuit, configured to sample a sum of positive DC bus voltages and a sum of negative bus voltages of the slave power converters respectively, and
    the local controller corresponding to the power unit is configured to comprise: a sampling conditioning circuit, configured to convert the sampled positive DC bus voltage and negative DC bus voltage of the master power converter, or the sum of positive DC bus voltages and the sum of negative bus voltages of the master power converters, and the sum of positive DC bus voltages and the sum of negative bus voltages of the slave power converters into digital signals.

2. The modular power supply system according to claim 1, wherein, when a number of the master power converter is one and a number of the slave power converters is M−1, the slave power converters are distributed at two sides of the master power converter.

3. The modular power supply system according to claim 2, wherein the sampling conditioning circuit further comprises a sampling reference point set at the master power converter.

4. The modular power supply system according to claim 3, wherein the sampling reference point is set at a positive terminal of a DC bus capacitor of the master power converter or a negative terminal of the DC bus capacitor of the master power converter, or a midpoint of the DC bus capacitor of the master power converter.

5. The modular power supply system according to claim 1, wherein, when a number of the master power converter is one and a number of the slave power converters is M−1,
the master sampling circuit comprises:
a master DC bus positive terminal sampler, configured as that: one end of the master DC bus positive terminal sampler is connected to a positive terminal of a DC bus capacitor of the master power converter, the other end of the master DC bus positive terminal sampler is connected to a first end of the sampling conditioning circuit, and the first end of the sampling conditioning circuit receives a positive DC bus voltage of the master power converter; and
a master DC bus negative terminal sampler, configured as that: one end of the master DC bus negative terminal sampler is connected to a negative terminal of the DC bus capacitor of the master power converter, the other end of the master DC bus negative terminal sampler is connected to a second end of the sampling conditioning circuit, and the second end of the sampling conditioning circuit receives a negative DC bus voltage of the master power converter; and
the slave sampling circuit comprises:
M−1 slave DC bus positive terminal samplers, in one-to-one correspondence with the M−1 slave power converters, wherein the M−1 slave DC bus positive terminal samplers are respectively configured as that: one end of each slave DC bus positive terminal sampler is connected to a positive terminal of a DC bus capacitor of the corresponding slave power converter, the other ends of the M−1 slave DC bus positive terminal samplers are connected together and connected to a third end of the sampling conditioning circuit, and the third end of the sampling conditioning circuit receives a sum of positive DC bus voltages of the M−1 slave power converters; and
M−1 slave DC bus negative terminal samplers, in one-to-one correspondence with the M−1 slave power converters, wherein the M−1 slave DC bus negative terminal samplers are respectively configured as that: one end of each slave DC bus negative terminal sampler is connected to a negative terminal of a DC bus capacitor of the corresponding slave power converter, the other ends of the M−1 slave DC bus negative terminal samplers are connected together and connected to a fourth end of the sampling conditioning circuit, and the fourth end of the sampling conditioning circuit receives a sum of negative DC bus voltages of the M−1 slave power converters.

6. The modular power supply system according to claim 5, wherein the DC bus positive terminal sampler and the DC bus negative terminal sampler comprise resistors.

7. The modular power supply system according to claim 1, wherein, when a number of the master power converter is more than two and a number of the salve power converter is more than two, the local control signals for controlling power semiconductor switches at the same position of the master power converters to be turned on and off are the same.

8. The modular power supply system according to claim 7, wherein
the master sampling circuit comprises:
a plurality of master DC bus positive terminal samplers, in one-to-one correspondence with the more than two master power converters, wherein the plurality of master DC bus positive terminal samplers are respectively configured as that: one end of each master DC bus positive terminal sampler is connected to a positive terminal of a DC bus capacitor of the corresponding master power converter, the other ends of the master DC bus positive terminal samplers are connected together and connected to a first end of the sampling conditioning circuit, and the first end of the sampling conditioning circuit receives a sum of positive DC bus voltages of the more than two master power converters; and
a plurality of master DC bus negative terminal samplers, in one-to-one correspondence with the more than two master power converters, wherein the plurality of master DC bus negative terminal samplers are respectively configured as that: one end of each master DC bus negative terminal sampler is connected to a negative terminal of a DC bus capacitor of the corresponding master power converter, the other ends of the master DC bus negative terminal samplers are connected together and connected to a second end of the sampling conditioning circuit, and the second end of the sampling conditioning circuit receives a sum of negative DC bus voltages of the master power converters; and
the slave sampling circuit comprises:
a plurality of slave DC bus positive terminal samplers, in one-to-one correspondence with the more than two slave power converters, wherein the plurality of slave DC bus positive terminal samplers are respectively configured as that: one end of each slave DC bus positive terminal sampler is connected to a positive terminal of a DC bus capacitor of the corresponding slave power converter, the other ends of the slave DC bus positive terminal samplers are connected together and connected to a third end of the sampling conditioning circuit, and the third end of the sampling conditioning circuit receives a sum of positive DC bus voltages of the more than two slave power converters; and
a plurality of slave DC bus negative terminal samplers, in one-to-one correspondence with the more than two slave power converters, wherein the plurality of slave DC bus negative terminal samplers are respectively configured as that: one end of each slave DC bus negative terminal sampler is connected to a negative terminal of a DC bus capacitor of the corresponding slave power converter, the other ends of the slave DC bus negative terminal samplers are connected together and connected to a fourth end of the sampling conditioning circuit, and the fourth end of the sampling conditioning circuit receives a sum of negative DC bus voltages of the more than two slave power converters.

9. The modular power supply system according to claim 8, wherein the DC bus positive terminal sampler and the DC bus negative terminal sampler comprise resistors.

10. The modular power supply system according to claim 1, wherein the sampling conditioning circuit comprises a dual operational amplifier.

11. A modular power supply system, configured to comprise:
a main controller, configured to output a main control signal;
N local controllers, wherein each of the local controllers is configured to receive the main control signal to output at least one local control signal; and N power units, in one-to-one correspondence with the N local controllers, wherein each of the power units comprises a first end and a second end, the second end of each of the power units is connected to the first end of an adjacent one of the power units, and each of the power units is configured to comprise M power converters, wherein each of the power converters comprises a third end and a fourth end, the fourth end of each of the power converters is connected to the third end of an adjacent one of the power converters, and the third end of the first one of the power converters is connected to the first end of the power unit, the fourth end of the M-th one of the power converters is connected to the second end of the power unit, and each of the power converters is configured to operate according to the local control signal output by a corresponding local controller, wherein both N and M are natural numbers greater than one, wherein the local control signals for controlling power semiconductor switches at the same position of the M power converters to be turned on and off are the same, each of the power units further comprises: M sampling circuits, configured to sample a sum of positive DC bus voltages and a sum of negative DC bus voltages of the power converter respectively, and the local controller corresponding to the power unit is configured to comprises: a sampling conditioning circuit, configured to convert the sampled sum of positive DC bus voltages and sum of negative DC bus voltages of the power converter into digital signals.

12. The modular power supply system according to claim 11, wherein the sampling conditioning circuit further comprises a sampling reference point, wherein, when M is an odd number, the sampling reference point is set at the (M+1)/2-th power converter, and when M is an even number, the sampling reference point is set at the M/2-th or (M/2+1)-th power converter.

13. The modular power supply system according to claim 12, wherein, when M is an odd number, the sampling reference point is set at a positive terminal of a DC bus capacitor, or a negative terminal of the DC bus capacitor or a midpoint of the DC bus capacitor of the (M+1)/2-th power converter.

14. The modular power supply system according to claim 12, wherein, when M is an even number, the sampling reference point is set at a positive terminal of a DC bus capacitor, a negative terminal of the DC bus capacitor or a midpoint of the DC bus capacitor of the M/2-th power converter, or the sampling reference point is set at a positive terminal of a DC bus capacitor, a negative terminal of the DC bus capacitor or a midpoint of the DC bus capacitor of the (M/2+1)-th power converter.

15. The modular power supply system according to claim 12, wherein two resistors connected in series are connected in parallel with a DC bus capacitor of each of the power converters, and when M is an odd number, the sampling reference point is set at a connection point of the two resistors at the (M+1)/2-th power converter.

16. The modular power supply system according to claim 12, wherein two resistors connected in series are connected in parallel with a DC bus capacitor of each of the power converters, and when M is an even number, the sampling reference point is set at a connection point of the two resistors at the M-th power converter, or the sampling reference point is set at a connection point of the two resistors at the (M/2+1)-th power converter.

17. The modular power supply system according to claim 12, wherein the sampling circuit comprises:

M DC bus positive terminal samplers, in one-to-one correspondence with the M power converters, wherein the M DC bus positive terminal samplers are respectively configured as that: one end of each DC bus positive terminal sampler is connected to a positive terminal of a DC bus capacitor of the corresponding power converter, the other ends of the M DC bus positive terminal samplers are connected together and connected to a first end of the sampling conditioning circuit, and the first end of the sampling conditioning circuit receives a sum of positive DC bus voltages of the M power converters; and M DC bus negative terminal samplers, in one-to-one correspondence with the M power converters, wherein the M DC bus negative terminal samplers are respectively configured as that: one end of each DC bus negative terminal sampler is connected to a negative terminal of a DC bus capacitor of the corresponding power converter, the other ends of the M DC bus negative terminal samplers are connected together and connected to a second end of the sampling conditioning circuit, and the second end of the sampling conditioning circuit receives a sum of negative DC bus voltages of the M power converters.

18. The modular power supply system according to claim 17, wherein the DC bus positive terminal sampler and the DC bus negative terminal sampler comprise resistors.

19. The modular power supply system according to claim 11, wherein the sampling conditioning circuit comprises a single operational amplifier.

* * * * *